(12) United States Patent
Fukagawa et al.

(10) Patent No.: US 11,789,307 B2
(45) Date of Patent: Oct. 17, 2023

(54) COLORANT FILTER, BACKLIGHT UNIT, AND LIQUID CRYSTAL DISPLAY DEVICE

(71) Applicant: FUJIFILM Corporation, Tokyo (JP)

(72) Inventors: Nobutaka Fukagawa, Kanagawa (JP); Yu Naito, Kanagawa (JP); Daisuke Sasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 149 days.

(21) Appl. No.: 17/064,094

(22) Filed: Oct. 6, 2020

(65) Prior Publication Data
US 2021/0026199 A1    Jan. 28, 2021

Related U.S. Application Data

(63) Continuation of application No. PCT/JP2019/015272, filed on Apr. 8, 2019.

(30) Foreign Application Priority Data

Apr. 11, 2018    (JP) .................................. 2018-076358

(51) Int. Cl.
*G02B 5/22*    (2006.01)
*G02F 1/13357*    (2006.01)
(Continued)

(52) U.S. Cl.
CPC ...... *G02F 1/133603* (2013.01); *C09B 57/007* (2013.01); *G02B 5/22* (2013.01);
(Continued)

(58) Field of Classification Search
CPC ............ C09K 2323/00; C09K 2323/03; C09K 2323/031; C09B 57/007; G02F 1/133514;
(Continued)

(56) References Cited

U.S. PATENT DOCUMENTS

2006/0063864 A1    3/2006    Shimizu et al.
2016/0349573 A1    12/2016    Ohmuro et al.
(Continued)

FOREIGN PATENT DOCUMENTS

JP          63235370 A     9/1988
JP       2002-333517 A    11/2002
(Continued)

OTHER PUBLICATIONS

Office Action, issued by the Japanese Patent Office dated Mar. 23, 2021, in connection with Japanese Patent Application No. 2020-513250.
(Continued)

*Primary Examiner* — Ruiyun Zhang
(74) *Attorney, Agent, or Firm* — Edwards Neils LLC; Jean C. Edwards, Esq.

(57) ABSTRACT

Provided is a colorant filter including at least one colorant; and at least one binder, in which the colorant filter has an absorption spectrum having an absorption maximum in a wavelength region of 560 nm to 620 nm, and in the absorption spectrum, a difference D1 between two wavelengths which give 10% absorbance with respect to an absorbance at the absorption maximum and a difference D2 between two wavelengths which give 50% absorbance with respect to the absorbance at the absorption maximum satisfy Expressions (a) D1≤90 nm and (b) D1/D2≤4.0.

7 Claims, 2 Drawing Sheets

(51) Int. Cl.
*G02F 1/1335* (2006.01)
*C09B 57/00* (2006.01)

(52) U.S. Cl.
CPC ....... *G02B 5/223* (2013.01); *G02F 1/133514* (2013.01); *G02F 1/133528* (2013.01); *C09K 2323/00* (2020.08); *C09K 2323/03* (2020.08); *C09K 2323/031* (2020.08); *G02F 2201/50* (2013.01); *G02F 2202/28* (2013.01); *G02F 2203/055* (2013.01)

(58) Field of Classification Search
CPC ......... G02F 1/133528; G02F 1/133603; G02F 2201/50; G02F 2203/055; G02B 5/22; G02B 5/223
USPC ............ 428/1.1, 1.3, 1.31; 430/108.21, 103; 524/104
See application file for complete search history.

(56) References Cited

U.S. PATENT DOCUMENTS

| | | | |
|---|---|---|---|
| 2017/0205646 A1 | 7/2017 | Cho et al. | |
| 2017/0329179 A1 | 11/2017 | Cho et al. | |
| 2018/0373096 A1* | 12/2018 | Lee | C09D 133/06 |
| 2020/0369889 A1* | 11/2020 | Welch | C07D 209/00 |

FOREIGN PATENT DOCUMENTS

| | | |
|---|---|---|
| JP | 2003-140145 A | 5/2003 |
| JP | 2003-167119 A | 6/2003 |
| JP | 2004-086133 A | 3/2004 |
| JP | 2004-133208 A | 4/2004 |
| JP | 2008074922 A * | 4/2008 |
| JP | 2008-145480 A | 6/2008 |
| JP | 2008-275726 A | 11/2008 |
| JP | 2008-298820 A | 12/2008 |
| JP | 5205794 B2 | 6/2013 |
| JP | 2016-075892 A | 5/2016 |
| JP | 2016-090998 A | 5/2016 |
| JP | 2019-012159 A | 1/2019 |
| WO | 2004/005981 A1 | 1/2004 |
| WO | 2008/090757 A1 | 7/2008 |
| WO | 2012/008318 A1 | 1/2012 |
| WO | 2015/098906 A1 | 7/2015 |

OTHER PUBLICATIONS

International Search Report issued in connection with International Patent Application No. PCT/JP2019/015272 dated Jun. 11, 2019.
Written Opinion of the International Searching Authority issued in connection with International Patent Application No. PCT/JP2019/015272 dated Jun. 11, 2019.
International Preliminary Report on Patentability issued in connection with International Patent Application No. PCT/JP2019/015272 dated Oct. 13, 2020.
Office Action, issued by the Japanese Patent Office dated Aug. 17, 2021, in connection with Japanese Patent Application No. 2020-513250.

* cited by examiner

COLORANT FILTER, BACKLIGHT UNIT, AND LIQUID CRYSTAL DISPLAY DEVICE

CROSS-REFERENCE TO RELATED APPLICATIONS

This application is a Continuation of PCT International Application No. PCT/JP2019/015272 filed on Apr. 8, 2019, which was published under Article 21(2) in Japanese, and which claims priority under 35 U.S.C. § 119 (a) to Japanese Patent Application No. 2018-076358 filed in Japan on Apr. 11, 2018. The above applications are hereby expressly incorporated by reference, in their entirety, into the present application.

BACKGROUND OF THE INVENTION

1. Field of the Invention

The present invention relates to a colorant filter, a backlight unit, and a liquid crystal display device.

2. Description of the Related Art

A liquid crystal display device is widely used year by year as a space-saving image display device with low power consumption. In a market in which high-quality images are required, such as a television, there is an increasing demand for improvement in color reproducibility in addition to a resolution.

Since a liquid crystal panel displaying images is a non-light emitting element which does not emit light itself, the liquid crystal display device includes a backlight unit which is disposed on a rear surface of the liquid crystal panel and supplies light to the liquid crystal panel.

In recent years, as a light source for the backlight unit, a white light emitting diode (LED) has been used. As a light emitting device formed of the white LED, a method of producing white light by mixing blue light radiated from a blue LED and light radiated from a yellow fluorescent body, or a green fluorescent body and a red fluorescent body has been known. However, the above-described method has a problem in that a color reproduction range is narrow compared to an organic light emitting diode (OLED) or the like which is in the spotlight as a next-generation display, and there is a demand for a new technique for overcoming this problem.

On the other hand, JP2016-090998A proposes a technique in which a coating layer including a dye is provided on a diffusion film in a backlight unit, thereby blocking a light having an unnecessary wavelength, which is emitted from the white LED. In addition, in WO2004/005981A, WO2008/090757A, and JP5205794B, color correcting filters formed of squarylium-based colorants having a specific substituent are proposed.

SUMMARY OF THE INVENTION

However, since a colorant described in JP2016-090998A absorbs not only a light in an unnecessary wavelength region but also a light in a necessary wavelength region in a relatively large amount, in a case where a layer including the colorant is used to block the light having an unnecessary wavelength, there is a problem that the width of decrease in luminance is large. In addition, in a case of using the colorants described in WO2004/005981A, WO2008/ 090757A, and JP5205794B, the decrease in luminance can be prevented to some extent, but sufficient luminance has not been realized yet.

An object of the present invention is to provide a colorant filter which can enhance color reproducibility of a liquid crystal display device and can also realize high luminance. In addition, an object of the present invention is to provide a backlight unit including the colorant filter. In addition, an object of the present invention is to provide a liquid crystal display device including the backlight unit.

The above-described objects of the present invention are achieved by the following methods.

[1] A colorant filter comprising:
at least one colorant; and
at least one binder resin,
in which the colorant filter has an absorption spectrum having an absorption maximum in a wavelength region of 585 nm to 620 nm, and
in the absorption spectrum, a difference D1 between two wavelengths which give 10% absorbance with respect to an absorbance at the absorption maximum and a difference D2 between two wavelengths which give 50% absorbance with respect to the absorbance at the absorption maximum satisfy Expressions (a) and (b), $$D1 \leq 90 \text{ nm} \quad (a)$$

$$D1/D2 \leq 4.0. \quad (b)$$

[2] The colorant filter according to [1],
in which the binder resin satisfies Relational expression [A], $$0.80 \leq fd \leq 0.95 \quad \text{Relational expression [A]:}$$

where, the fd value is defined by Expression I, $$fd = \delta d/(\delta d + \delta p + \delta h) \quad \text{Expression I:}$$

in Expression I, δd, δp, and δh respectively represent, in a solubility parameter St calculated by Hoy method, a term corresponding to London dispersion force, a term corresponding to dipole-dipole force, and a term corresponding to hydrogen bonding force.

[3] The colorant filter according to [1] or [2],
in which the colorant filter includes a colorant represented by Formula (1),

Formula (1)

in Formula (1), A and B each independently represent an aryl group which may have a substituent, a heterocyclic group which may have a substituent, or —CH=G group, where G represents a heterocyclic group which may have a substituent.

[4] The colorant filter according to any one of [1] to [3],
in which the binder resin includes a cycloolefin resin and/or a polystyrene resin.

[5] The colorant filter according to any one of [1] to [4],
in which the absorption maximum of the colorant filter in the wavelength region of 585 nm to 620 nm is in a wavelength region of 585 nm to 605 nm.

[6] A backlight unit comprising:
the colorant filter according to any one of [1] to [5];
a light guide plate; and
a light source,
in which the colorant filter is disposed on a downstream side of a light emitted from the light source than the light guide plate.

[7] A liquid crystal display device comprising:
the colorant filter according to any one of [1] to [5];
polarizing plates including a polarizer and a polarizing plate protective film; and
a liquid crystal cell to which the polarizing plates are attached through a pressure-sensitive adhesive layer,
in which the colorant filter additionally serves as the polarizing plate protective film or the pressure-sensitive adhesive layer.

[8] A liquid crystal display device comprising:
the colorant filter according to any one of [1] to [5] in a backlight unit.

In a case where a compound represented by a chemical structural formula described in the present specification can have a resonance structure (contribution structure), the chemical structural formula indicates one of the resonance structures that the compound can adopt. That is, in a case where, even though a compound represented by a chemical structural formula other than a chemical structural formula described in the present specification, the compound can adopt a resonance structure represented by the chemical structural formula described in the present specification, the compound is included in compounds represented by the chemical structural formula described in the present specification.

The colorant filter and backlight unit according to an aspect of the present invention can enhance color reproducibility of a liquid crystal display device and can also realize high luminance. The liquid crystal display device according to an aspect of the present invention has high luminance and excellent color reproducibility.

DESCRIPTION OF THE PREFERRED EMBODIMENTS

Figure 1:
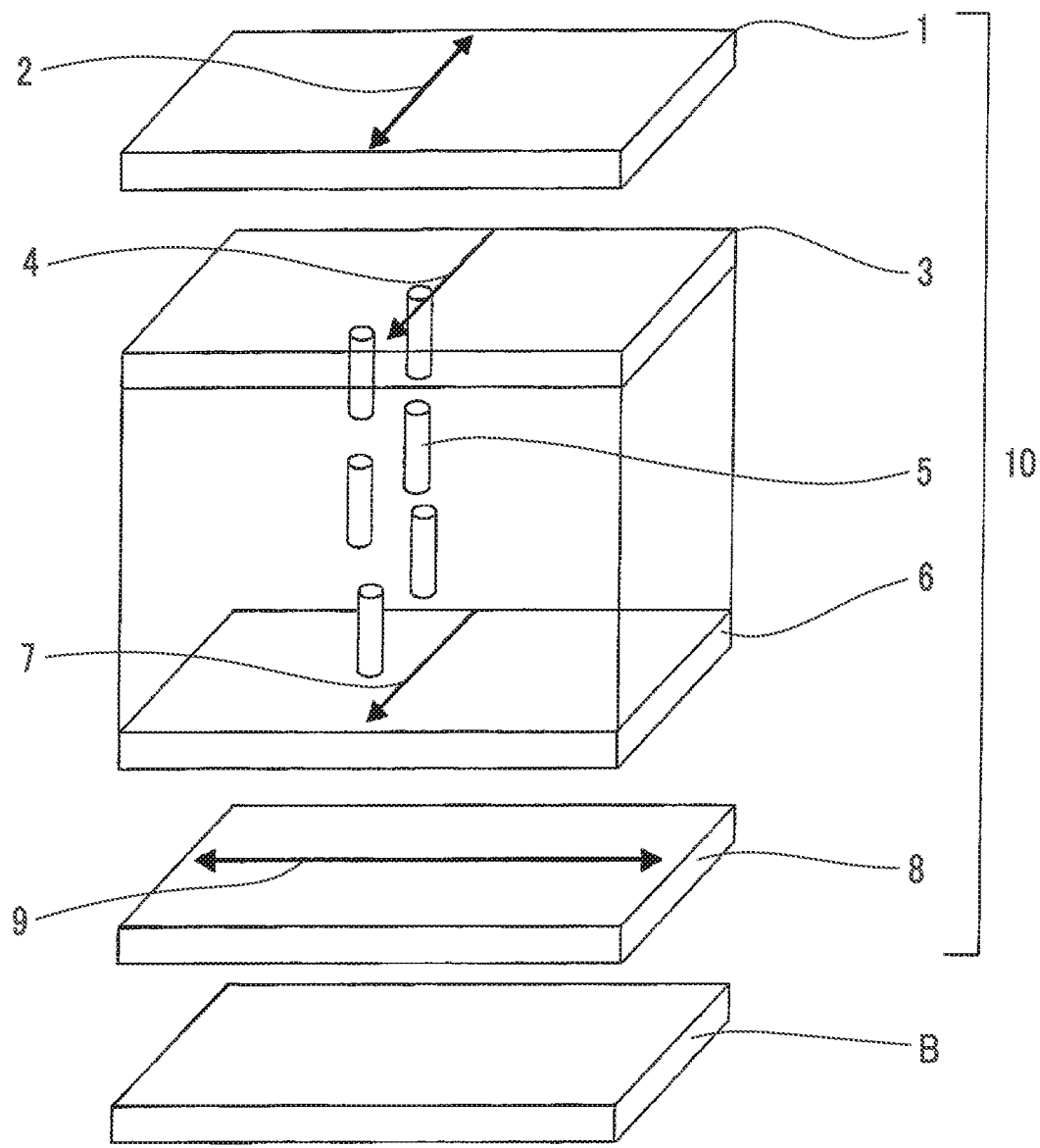
FIG. 1 is a schematic view showing an outline of an embodiment of a liquid crystal display device comprising polarizing plates which have a filter according to an embodiment of the present invention in a backlight.

In the present invention, numerical ranges expressed using "to" include numerical values before and after "to" as the lower limit value and the upper limit value.

In the present invention, in a case of a plurality of substituents, linking groups, and the like (hereinafter, referred to as a substituent and the like) represented by a specific reference, or in a case of simultaneously or alternatively defining a plurality of the substituent and the like, it means that each of the substituent and the like may be the same as or different from each other. The same applies to the definition of the number of substituents and the like. In a case where a plurality of the substituents and the like is near (particularly, adjacent to each other), it means that the substituents and the like may be linked to each other or condensed to form a ring.

In the present invention, the expression of a compound is used to include the compound itself, a salt thereof, and an ion thereof. In addition, it means that a part of the structure may be changed as long as the desired effect is not impaired. Examples of the salt of the compound include an acid-addition salt of the compound, formed of the compound and an inorganic acid or an organic acid, and a base-addition salt of the compound, formed of the compound and an inorganic base or an organic base. In addition, examples of the ion of the compound include ions generated by dissolving the salt of the compound in water, a solvent, or the like.

In the present specification, regarding a substituent (the same applies to a linking group) in which whether it is substituted or unsubstituted is not specified, within the range not impairing the desired effect, it means that the group may have any substituent. The same applies to a compound or a repeating unit in which whether it is substituted or unsubstituted is not specified.

In the present invention, in a case of defining a number of carbon atoms of a group, the number of carbon atoms means the number of carbon atoms of the entire group. That is, in a case of an aspect in which the group has a substituent, it means the total number of carbon atoms including the substituent.

In the present invention, in the case where a group can form an acyclic skeleton and a cyclic skeleton, unless described otherwise, the group includes an acyclic skeleton group and a cyclic skeleton group. For example, an alkyl group includes, unless described otherwise, a linear alkyl group, a branched alkyl group, and a cyclic (cyclo) alkyl group. In a case where a group forms a cyclic skeleton, the lower limit of the number of carbon atoms in the cyclic skeleton group is preferably 3 or more and more preferably 5 or more, regardless of the lower limit of the number of carbon atoms specifically described for the group.

In the present invention, the term "(meth)acrylic" is used to include both methacrylic and acrylic.

[Colorant Filter]

A colorant filter according to an embodiment of the present invention includes at least one colorant and at least one binder resin (matrix resin). The colorant filter has an absorption spectrum having an absorption maximum in a wavelength region of 585 nm to 620 nm, and in the absorption spectrum, a difference (D1, 10% value width) between two wavelengths which give 10% absorbance with respect to an absorbance at the absorption maximum is 90 nm or less. That is, D1≤90 is satisfied.

In addition, in the absorption spectrum of the colorant filter, the relationship between a difference (D2, 50% value width, half-width) between two wavelengths which give 50% absorbance with respect to the absorbance at the absorption maximum, and D1 satisfies the following expression. D1/D2≤4.0

The wavelength region of the absorption maximum is more preferably 585 nm to 610 nm and still more preferably 585 nm to 605 nm.

It is preferable that the colorant filter has no absorption maximum in a wavelength region other than the wavelength region of 585 nm to 620 nm.

In addition, from the viewpoint of improving luminance, D1 is preferably 86 nm or less, more preferably 84 nm or less, still more preferably 82 nm or less, and particularly preferably 80 nm or less.

Figure 2:
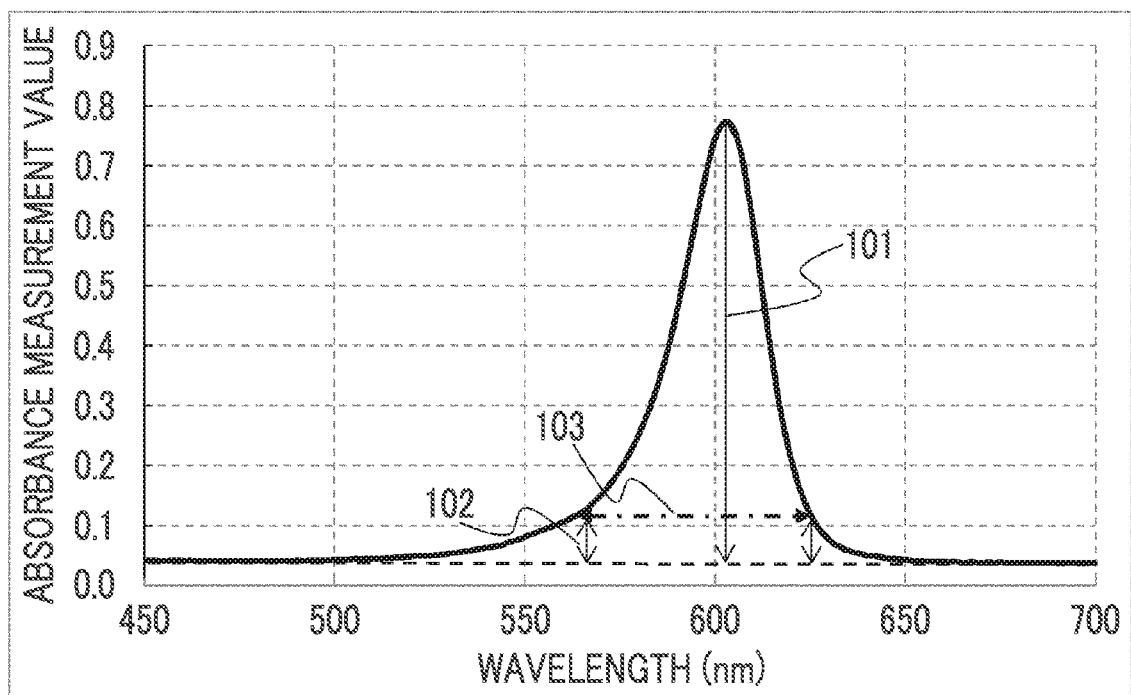
FIG. 2 is an explanatory view showing, in the present invention, a method of determining an absorbance at an absorption maximum wavelength and a difference (D1, 10% value width) between two wavelengths which give 10% absorbance with respect to the absorbance at the absorption maximum.

In the present invention, the absorbance at the absorption maximum of the colorant filter is an absorbance of an absorption peak in the wavelength region of 585 nm to 620 nm, and is a value (101) obtained by, as shown in FIG. 2, subtracting, from a measurement value (solid line) of the absorbance at the absorption maximum wavelength, a measurement value (dotted line) of a flat area which is not derived from the absorption of the colorant (usually determined by preparing a filter containing no colorant). The two wavelengths which give 10% absorbance with respect to the absorbance at the absorption maximum are wavelengths which give 10% absorbance (102) of the absorbance (101) at the absorption maximum in the absorption spectrum of the colorant filter, and mean two wavelengths existing on a short wavelength side and a long wavelength side with respect to the wavelength showing the absorption maximum. The 10% value width (103) refers to a difference (absolute value) between the two wavelengths showing 10% absorbance, which are determined in this manner.

In addition, from the viewpoint of improving luminance, D2 is preferably 40 nm or less, more preferably 35 nm or less, still more preferably 32 nm or less, and particularly preferably 30 nm or less. The two wavelengths which give 50% absorbance with respect to the absorbance at the absorption maximum are wavelengths which give 50% absorbance of the absorbance (101) at the absorption maximum in the absorption spectrum of the colorant filter, and mean two wavelengths existing on a short wavelength side and a long wavelength side with respect to the wavelength showing the absorption maximum. The 50% value width refers to a difference (absolute value) between the two wavelengths showing 50% absorbance, which are determined in this manner.

In the colorant filter, even in a case of using two or more colorants, the absorption maximum, the 10% value width D1, and the 50% value width D2 can be obtained in the same manner as described above. In a case where there are a plurality of absorption maxima in the wavelength range of 585 nm to 620 nm, the one showing the maximum absorbance among the plurality of absorption maxima refers to the "absorbance at the absorption maximum" defined in the present invention.

The 10% value width can be adjusted to a desired range by a combination of the type of the binder resin and the type of the colorant. For example, in a case of using a cycloolefin resin or polystyrene resin described later as the binder resin, it is preferable to use in combination with a colorant represented by Formula (1).

It is not clear why the colorant filter according to the embodiment of the present invention can achieve both wide color reproducibility and high luminance in a liquid crystal display device, but it is considered as follows.

Since the colorant filter has the absorption maximum at a specific wavelength, and the 10% value width D1 and the 50% value width D2 satisfy the requirements of the present invention, it is considered that the colorant filter specifically absorbs unnecessary light (particularly light having a wavelength of 585 nm to 620 nm) included in an incidence ray from a light source (for example, a white LED) for the backlight unit, and most of light having a necessary and desired wavelength can pass through the colorant filter without absorption.

The absorption of a squarine-based colorant preferably used in the present invention varies depending on the type of binder resin to be combined. As an example, in a case where the colorant is combined with a binder resin having a predetermined fd value, a colorant filter having a sharp reduction absorption peak (a sharper absorption peak) due to, for example, promotion of intramolecular hydrogen bond can be obtained. The effect of this combination can be sufficiently obtained regardless of whether the squarine-based colorant is used in a low concentration or a high concentration.

<Colorant>

The colorant used in the present invention is not particularly limited as long as the colorant filter can have the characteristics defined in the present invention, but it is preferable to use a squarine-based colorant and a squarine-based colorant represented by Formula (1) is more preferable.

In colorants represented by each formula in the present invention, cations are present in a delocalized manner and a plurality of tautomer structures are present. Thus, in the present invention, in a case where at least one tautomer structure of a certain colorant matches each formula, the colorant is considered as a colorant represented by the each formula. Therefore, a colorant represented by a specific formula can also be said to be a colorant having at least one tautomer structure which can be represented by the specific formula. In the present invention, a colorant represented by a formula may have any tautomer structure as long as at least one tautomer structure of the colorant matches the formula.

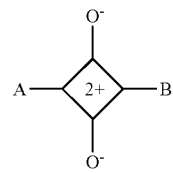

Formula (1)

In Formula (1), A and B each independently represent an aryl group which may have a substituent, a heterocyclic group which may have a substituent, or —CH=G group. G represents a heterocyclic group which may have a substituent.

The aryl group which can be adopted as A or B is not particularly limited, and may be a group formed of a single ring or a group formed of a fused ring. The number of carbon atoms in the aryl group is preferably 6 to 30, more preferably 6 to 20, and still more preferably 6 to 12. Examples of the aryl group include groups formed of a benzene ring or a naphthalene ring, and groups formed of a benzene ring are more preferable.

A heterocyclic group which can be adopted as A or B is not particularly limited, examples thereof include groups formed of an aliphatic hetero ring or an aromatic hetero ring, and groups formed of an aromatic hetero ring are preferable. Examples of a heteroaryl group which is an aromatic heterocyclic group include heteroaryl groups which can be adopted as the substituent X described later. The aromatic heterocyclic group which can be adopted as A or B is preferably a group of a five-membered ring or a six-membered ring and more preferably a group of a nitrogen-containing five-membered ring. Specifically, suitable examples thereof include a pyrrole ring, a furan ring, a thiophene ring, an imidazole ring, a pyrazole ring, a thiazole ring, an oxazole ring, a triazole ring, an indole ring, an indolenine ring, an indoline ring, a pyridine ring, a pyrimidine ring, a quinoline ring, a benzothiazole ring, a benzoxazole ring, and a pyrazolotriazole ring. Among these, a pyrrole ring, a pyrazole ring, a thiazole ring, a pyridine ring, a pyrimidine ring, or a pyrazolotriazole ring is preferable. It is sufficient that the pyrazolotriazole ring is formed of a fused ring of a pyrazole ring and a triazole ring and is a fused ring formed by fusing at least one of each of the rings, and examples thereof include fused rings in Formulae (4) and (5) described later.

G in —CH=G which can be adopted as A or B represents a heterocyclic group which may have a substituent, and suitable examples thereof include examples listed as A and B. Among these, groups formed of a benzoxazole ring, a benzothiazole ring, or an indoline ring are preferable.

Each of A, B, and G may have a substituent X, and in a case where A, B, or G has the substituent X, adjacent substituents may be bonded to each other to further form a ring structure. In addition, each of A, B, and G may have a plurality of substituents.

Examples of the substituent X include substituents which can be adopted as R' in Formula (2) described later, and preferred specific examples thereof include a halogen atom, a cyano group, a nitro group, an alkyl group, an alkenyl group, an alkynyl group, an aryl group, a heteroaryl group, an aralkyl group, $—OR^{10}OR^{11}$, $—COOR^{12}$, $—OCOR^{13}$, $—NR^{14}R^{15}$, $—NHCOR^{16}$, $—CONR^{17}R^{18}$, $—NHCONR^{19}R^{20}$, $—NHCOOR^{21}$, $—SR^{22}$, $—SO_2R^{23}$, $—SO_3R^{24}$, $—NHSO_2R^{25}$, $—SO_2NR^{26}R^{27}$, and $—OR^{28}$.

$R^{10}$ to $R^{28}$ each independently represent a hydrogen atom, an aliphatic group, an aromatic group, or a heterocyclic group. The aliphatic group and the aromatic group which can be adopted as $R^{10}$ to $R^{28}$ are not particularly limited, and can be appropriately selected from the substituents which can be adopted as $R^1$ in Formula (2) described later. The heterocyclic group which can be adopted as $R^{10}$ to $R^{28}$ may be aliphatic or aromatic, and can be appropriately selected from heteroaryl groups or heterocyclic groups which can be adopted as $R^1$ in Formula (2) described later.

In a case where $R^{12}$ in $—COOR^{12}$ is a hydrogen atom (that is, a carboxy group), the hydrogen atom may be dissociated (that is, a carbonate group) or may be in a state of salt. In addition, in a case where $R^{24}$ in $—SO_3R^{24}$ is a hydrogen atom (that is, a sulfo group), the hydrogen atom may be dissociated (that is, a sulfonate group) or may be in a state of salt.

Examples of the halogen atom include a fluorine atom, a chlorine atom, a bromine atom, and an iodine atom.

The number of carbon atoms in the alkyl group is preferably 1 to 20, more preferably 1 to 15, and still more preferably 1 to 8. The number of carbon atoms in the alkenyl group is preferably 2 to 20, more preferably 2 to 12, and still more preferably 2 to 8. The number of carbon atoms in the alkynyl group is preferably 2 to 40, more preferably 2 to 30, and particularly preferably 2 to 25. Each of the alkyl group, the alkenyl group, and the alkynyl group may be any of linear, branched, or cyclic, and is preferably linear or branched.

The aryl group includes a group of a single ring or a fused ring. The number of carbon atoms in the aryl group is preferably 6 to 30, more preferably 6 to 20, and still more preferably 6 to 12.

An alkyl portion in the aralkyl group is the same as the above-described alkyl group. An aryl portion in the aralkyl group is the same as the above-described aryl group. The number of carbon atoms in the aralkyl group is preferably 7 to 40, more preferably 7 to 30, and still more preferably 7 to 25.

The heteroaryl group includes a group formed of a single ring or a fused ring, and a group formed of a single ring or a fused ring having 2 to 8 rings is preferable and a group formed of a single ring or a fused ring having 2 to 4 rings is more preferable. The number of hetero atoms constituting a ring of the heteroaryl group is preferably 1 to 3. Examples of the hetero atoms constituting the ring of the heteroaryl group include a nitrogen atom, an oxygen atom, and a sulfur atom. The heteroaryl group is preferably a group formed of a five-membered ring or a six-membered ring. The number of carbon atoms constituting the ring of the heteroaryl group is preferably 3 to 30, more preferably 3 to 18, and still more preferably 3 to 12. Examples of the heteroaryl group include each of the groups formed of a pyridine ring, a piperidine ring, a furan ring, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a thiazole ring, a pyrazine ring, a thiadiazine ring, a benzoquinoline ring, or a thiadiazole ring.

Each of the alkyl group, the alkenyl group, the alkynyl group, the aralkyl group, the aryl group, and the heteroaryl group exemplified as the examples of the substituent X may further have a substituent or may be unsubstituted. The substituent which may be further included is not particularly limited, but is preferably a substituent selected from an alkyl group, an aryl group, an amino group, an alkoxy group, an aryloxy group, an aromatic heterocyclic oxy group, an acyl group, an alkoxycarbonyl group, an aryloxycarbonyl group, an acyloxy group, an acylamino group, an alkoxycarbonylamino group, an aryloxycarbonylamino group, a sulfonylamino group, an alkylthio group, an arylthio group, an aromatic heterocyclic thio group, a sulfonyl group, a hydroxy group, a mercapto group, a halogen atom, a cyano group, a sulfo group, and a carboxyl group, and more preferably a substituent selected from an alkyl group, an aryl group, an alkoxy group, an aryloxy group, an aromatic heterocyclic oxy group, an acyl group, an alkoxycarbonyl group, an aryloxycarbonyl group, an acyloxy group, an alkylthio group, an arylthio group, an aromatic heterocyclic thio group, a sulfonyl group, a hydroxy group, a mercapto group, a halogen atom, a cyano group, a sulfo group, and a carboxyl group. Preferred aspect of these groups can be appropriately selected from the substituents which can be adopted as R' in Formula (2) described later.

Examples of a preferred embodiment of the colorant represented by Formula (1) include a colorant represented by Formula (2).

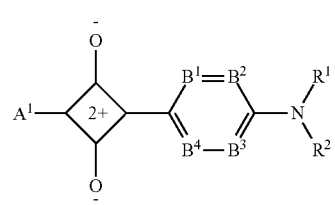

Formula (2)

In Formula (2), $A^1$ is the same as A in Formula (1). Among these, a heterocyclic group which is a nitrogen-containing five-membered ring is preferable.

In Formula (2), $R^1$ and $R^2$ each independently represent a hydrogen atom or a substituent. $R^1$ and $R^2$ may be the same as or different from each other, and may be bonded to each other to form a ring.

The substituent which can be adopted as $R^1$ and $R^2$ is not particularly limited, and examples thereof include alkyl groups (such as a methyl group, an ethyl group, a propyl group, an isopropyl group, a butyl group, a t-butyl group, an isobutyl group, a pentyl group, a hexyl group, an octyl group, a dodecyl group, and a trifluoromethyl group), cycloalkyl groups (such as a cyclopentyl group and a cyclohexyl group), alkenyl groups (such as a vinyl group and an allyl group), alkynyl groups (such as an ethynyl group and a propargyl group), aryl groups (such as a phenyl group and a naphthyl group), heteroaryl groups (such as a furyl group, a thienyl group, a pyridyl group, a pyridazyl group, a pyrimidyl group, a pyrazyl group, a triazyl group, an imidazolyl group, a pyrazolyl group, a thiazolyl group, a benzimidazolyl group, a benzoxazolyl group, a quinazolyl group, and a phthalazyl group), heterocyclic groups (such as a pyrrolidyl group, an imidazolidyl group, a morpholyl group, and an oxazolidyl group), alkoxy groups (such as a methoxy group, an ethoxy group, and a propyloxy group), cycloalkoxy groups (such as a cyclopentyloxy group and a cyclohexyloxy group), aryloxy groups (such as a phenoxy group and a naphthyloxy group), heteroaryloxy groups (aromatic heterocyclic oxy group), alkylthio groups (such as a methylthio group, an ethylthio group, and a propylthio group), cycloalkylthio groups (such as a cyclopentylthio group and a cyclohexylthio group), arylthio groups (such as a phenylthio group and a naphthylthio group), heteroarylthio groups (aromatic heterocyclic thio group), alkoxycarbonyl groups (such as methyloxycarbonyl group, an ethyloxycarbonyl group, a butyloxycarbonyl group, and an octyloxycarbonyl group), aryloxycarbonyl groups (such as a phenyloxycarbonyl group and a naphthyloxycarbonyl group), phosphoryl groups (such as dimethoxyphosphoryl group and diphenylphosphoryl group), sulfamoyl groups (such as an aminosulfonyl group, a methylaminosulfonyl group, a dimethylaminosulfonyl group, a butylaminosulfonyl group, a cyclohexylaminosulfonyl group, an octylaminosulfonyl group, a phenylaminosulfonyl group, and a 2-pyridylaminosulfonyl group), acyl groups (such as an acetyl group, an ethylcarbonyl group, a propylcarbonyl group, a cyclohexylcarbonyl group, an octylcarbonyl group, a 2-ethylhexylcarbonyl group, a phenylcarbonyl group, a naphthylcarbonyl group, and a pyridylcarbonyl group), acyloxy groups (such as an acetyloxy group, an ethylcarbonyloxy group, a butylcarbonyloxy group, an octylcarbonyloxy group, and a phenylcarbonyloxy group), amide groups (such as a methylcarbonylamino group, an ethylcarbonylamino group, a dimethylcarbonylamino group, a propylcarbonylamino group, a pentylcarbonylamino group, a cyclohexylcarbonylamino group, a 2-ethylhexylcarbonylamino group, an octylcarbonylamino group, a dodecylcarbonylamino group, a phenylcarbonylamino group, and a naphthylcarbonylamino group), sulfonamide groups (such as a methylsulfonylamino group, an octylsulfonylamino group, a 2-ethylhexylsulfonylamino group, and a trifluoromethylsulfonylamino group), carbamoyl groups (such as an aminocarbonyl group, a methylaminocarbonyl group, a dimethylaminocarbonyl group, a propylaminocarbonyl group, a pentylaminocarbonyl group, a cyclohexylaminocarbonyl group, an octylaminocarbonyl group, a 2-ethylhexylaminocarbonyl group, a dodecylaminocarbonyl group, a phenylaminocarbonyl group, a naphthylaminocarbonyl group, and a 2-pyridylaminocarbonyl group), ureido groups (such as a methylureido group, an ethylureido group, a pentylureido group, cyclohexylureido group, an octylureido group, a dodecylureido group, a phenylureido group, a naphthylureido group, and a 2-pyridylaminoureido group), alkylsulfonyl groups (such as a methylsulfonyl group, an ethylsulfonyl group, a butylsulfonyl group, a cyclohexylsulfonyl group, and a 2-ethylhexylsulfonyl group), arylsulfonyl groups (such as a phenylsulfonyl group, a naphthylsulfonyl group, and a 2-pyridylsulfonyl group), amino groups (such as an amino group, an ethylamino group, a dimethylamino group, a butylamino group, a dibutylamino group, a cyclopentylamino group, a 2-ethylhexylamino group, a dodecylamino group, an anilino group, a naphthylamino group, and a 2-pyridylamino group), alkylsulfonyloxy groups (methanesulfonyloxy group), a cyano group, a nitro group, halogen atoms (such as a fluorine atom, a chlorine atom, and a bromine atom), and a hydroxy group.

Among these, an alkyl group, an alkenyl group, an aryl group, or a heteroaryl group is preferable, an alkyl group, an aryl group, or a heteroaryl group is more preferable, and an alkyl group is still more preferable.

The substituent which can be adopted as $R^1$ and $R^2$ may further have a substituent. Examples of the substituent which may be further included include the above-described substituents which can be adopted as $R^1$ and $R^2$. In addition, $R^1$ and $R^2$ may be bonded to each other or may be bonded with a substituent which is included in $B^2$ or $B^3$ to form a ring. As the ring formed in this case, a hetero ring or a heteroaryl ring is preferable. The size of the ring formed is not particularly limited, but a five-membered ring or a six-membered ring is preferable.

In Formula (2), $B^1$, $B^2$, $B^3$, and $B^4$ each independently represent a carbon atom or a nitrogen atom. The ring including $B^1$, $B^2$, $B^3$, and $B^4$ is an aromatic ring. It is preferable that at least two or more of $B^1$ to $B^4$ are carbon atoms, and it is more preferable that all of $B^1$ to $B^4$ are carbon atoms.

The carbon atom which can be adopted as $B^1$ to $B^4$ has a hydrogen atom or a substituent. Among carbon atoms which can be adopted as $B^1$ to $B^4$, the number of carbon atoms having a substituent is not particularly limited, but is preferably 0, 1, or 2 and more preferably 1. In particular, it is preferable that $B^1$ and $B^4$ are carbon atoms and at least one has a substituent.

The substituent included in the carbon atom which can be adopted as $B^1$ to $B^4$ is not particularly limited, and examples thereof include the above-described substituents which can be adopted as $R^1$ and $R^2$. Among these, an alkyl group, an alkoxy group, an alkoxycarbonyl group, an aryl group, an acyl group, an amide group, a sulfonylamide group, a carbamoyl group, an alkylsulfonyl group, an arylsulfonyl group, an amino group, a cyano group, a nitro group, a halogen atom, or a hydroxy group is preferable, and an alkyl group, an alkoxy group, an alkoxycarbonyl group, an aryl group, an acyl group, an amide group, a sulfonylamide group, a carbamoyl group, an amino group, a cyano group, a nitro group, a halogen atom, or a hydroxy group is more preferable.

As the substituent included in the carbon atom which can be adopted as $B^1$ and $B^4$, an alkyl group, an alkoxy group, a hydroxy group, an amide group, a sulfonylamide group, or a carbamoyl group is still more preferable, and an alkyl group, an alkoxy group, a hydroxy group, an amide group, or a sulfonylamide group is particularly preferable, and a hydroxy group, an amide group, or a sulfonylamide group is most preferable.

As the substituent included in the carbon atom which can be adopted as $B^2$ and $B^3$, an alkyl group, an alkoxy group, an alkoxycarbonyl group, an acyl group, an amino group, a cyano group, a nitro group, or a halogen atom is still more preferable, and it is particularly preferable that the substituent in any one of $B^2$ or $B^3$ is an electron-withdrawing group (for example, an alkoxycarbonyl group, an acyl group, a cyano group, a nitro group, or a halogen atom).

The colorant represented by Formula (2) is preferably a colorant represented by any one of Formula (3), Formula (4), and Formula (5).

Formula (3)

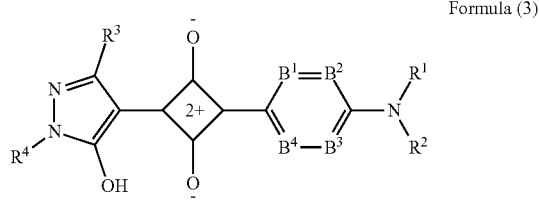

In Formula (3), $R^1$ and $R^2$ each independently represent a hydrogen atom or a substituent and have the same meaning as $R^1$ and $R^2$ in Formula (2), and the preferred range is also the same.

$B^1$ to $B^4$ each independently represent a carbon atom or a nitrogen atom and have the same meaning as $B^1$ to $B^4$ in Formula (2), and the preferred range is also the same.

In Formula (3), $R^3$ and $R^4$ each independently represent a hydrogen atom or a substituent. The substituent which can be adopted as $R^3$ and $R^4$ is not particularly limited, and the same substituent which can be adopted as $R^1$ and $R^2$ can be exemplified.

However, the substituent which can be adopted as $R^3$ is preferably an alkyl group, an alkoxy group, an amino group, an amide group, a sulfonylamide group, a cyano group, a nitro group, an aryl group, a heteroaryl group, a heterocyclic group, an alkoxycarbonyl group, a carbamoyl group, or a halogen atom, more preferably an alkyl group, an aryl group, or an amino group, and still more preferably an alkyl group.

The substituent which can be adopted as $R^4$ is preferably an alkyl group, an aryl group, a heteroaryl group, a heterocyclic group, an alkoxy group, an alkoxycarbonyl group, an acyl group, an acyloxy group, an amide group, a carbamoyl group, an amino group, or a cyano group, more preferably an alkyl group, an alkoxycarbonyl group, an acyl group, a carbamoyl group, or an aryl group, and still more preferably an alkyl group.

The alkyl group which can be adopted as $R^3$ and $R^4$ may be any of linear, branched, or cyclic, and is preferably linear or branched. The number of carbon atoms of the alkyl group is preferably 1 to 12 and more preferably 1 to 8. Preferred examples of the alkyl group include a methyl group, an ethyl group, an n-propyl group, an isopropyl group, a t-butyl group, a 2-ethylhexyl group, and a cyclohexyl group. Among these, a methyl group or a t-butyl group is more preferable.

Formula (4)

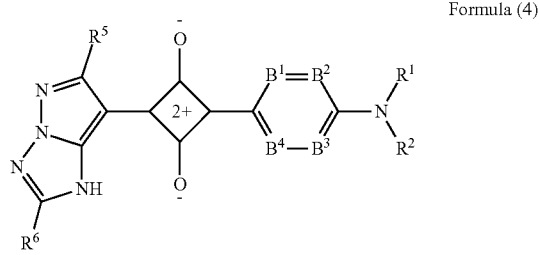

In Formula (4), $R^1$ and $R^2$ each independently represent a hydrogen atom or a substituent and have the same meaning as $R^1$ and $R^2$ in Formula (2), and the preferred range is also the same.

$B^1$ to $B^4$ each independently represent a carbon atom or a nitrogen atom and have the same meaning as $B^1$ to $B^4$ in Formula (2), and the preferred range is also the same.

In Formula (4), $R^5$ and $R^6$ each independently represent a hydrogen atom or a substituent. The substituent which can be adopted as $R^5$ and $R^6$ is not particularly limited, and the same substituent which can be adopted as $R^1$ and $R^2$ can be exemplified.

However, the substituent which can be adopted as $R^5$ is preferably an alkyl group, an alkoxy group, an aryloxy group, an amino group, a cyano group, an aryl group, a heteroaryl group, a heterocyclic group, an acyl group, an acyloxy group, an amide group, a sulfonylamide group, a ureido group, or a carbamoyl group, more preferably an alkyl group, an alkoxy group, an acyl group, an amide group, or an amino group, and still more preferably an alkyl group.

The alkyl group which can be adopted as $R^5$ has the same meaning as the alkyl group which can be adopted as $R^3$, and the preferred range is also the same.

The substituent which can be adopted as $R^6$ is preferably an alkyl group, an alkenyl group, an aryl group, a heteroaryl group, a heterocyclic group, an alkoxy group, a cycloalkoxy group, an aryloxy group, an alkoxycarbonyl group, an acyl group, an acyloxy group, an amide group, a sulfonylamide group, an alkylsulfonyl group, an arylsulfonyl group, a carbamoyl group, an amino group, a cyano group, a nitro group, or a halogen atom, more preferably an alkyl group, an aryl group, a heteroaryl group, or a heterocyclic group, and still more preferably an alkyl group or an aryl group.

The alkyl group which can be adopted as $R^6$ has the same meaning as the alkyl group which can be adopted as $R^4$, and the preferred range is also the same.

As the aryl group which can be adopted as $R^6$, an aryl group having 6 to 12 carbon atoms is preferable and a phenyl group is more preferable. The aryl group may have a substituent, and examples of such substitution include groups selected from Substituent group A. In particular, an alkyl group having 1 to 10 carbon atoms, a sulfonyl group, an amino group, an acylamino group, a sulfonylamino group, or the like is preferable. These substituents may further have a substituent. Specifically, the substituent is preferably an alkylsulfonylamino group.

—Substituent Group A—

Halogen atom, alkyl group, alkenyl group, alkynyl group, aryl group, heterocyclic group, cyano group, hydroxy group, nitro group, carboxyl group, alkoxy group, aminooxy group, aryloxy group, silyloxy group, heterocyclic oxy group, acyloxy group, carbamoyloxy group, amino group, acylamino group, aminocarbonylamino group, alkoxycarbonylamino group, aryloxycarbonylamino group, sulfamoylamino group, alkyl or aryl sulfamoylamino group, mercapto group, alkylthio group, arylthio group, heterocyclic thio group, sulfamoyl group, sulfo group, alkyl or aryl sulfinyl group, alkyl or aryl sulfonyl group, acyl group, aryloxycarbonyl group, alkoxycarbonyl group, carbamoyl group, aryl or heterocyclic azo group, imide group, phosphino group, phosphinyl group, phosphinyloxy group, phosphinylamino group, silyl group, or the like Formula (5)

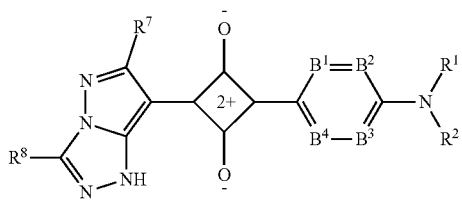

In Formula (5), $R^1$ and $R^2$ each independently represent a hydrogen atom or a substituent and have the same meaning as $R^1$ and $R^2$ in Formula (2), and the preferred range is also the same.

$B^1$ to $B^4$ each independently represent a carbon atom or a nitrogen atom and have the same meaning as $B^1$ to $B^4$ in Formula (2), and the preferred range is also the same.

In Formula (5), $R^7$ and $R^8$ each independently represent a hydrogen atom or a substituent. The substituent which can be adopted as $R^7$ and $R^8$ is not particularly limited, and the same substituent which can be adopted as $R^1$ and $R^2$ can be exemplified.

However, the preferred range, the more preferred range, and the still more preferred group of the substituent which can be adopted as $R^7$ are the same as the substituent which can be adopted as $R^5$. The alkyl group which can be adopted as $R^5$ has the same meaning as the alkyl group which can be adopted as $R^3$, and the preferred range is also the same.

The preferred range, the more preferred range, and the still more preferred range of the substituent which can be adopted as $R^8$ are the same as the substituent which can be adopted as $R^6$. The alkyl group and aryl group which can be adopted as $R^8$ has the same meaning as the alkyl group and aryl group which can be adopted as $R^6$, and the preferred range is also the same.

In the present invention, in a case of using a squarine-based colorant as the colorant, as the squarine-based colorant, any squarine colorant represented by any one of Formulae (1) to (5) can be used without particular limitation. Examples thereof include compounds described in JP2006-160618A, WO2004/005981A, WO2004/007447A, Dyes and Pigment, 2001, 49, pp. 161 to 179, WO2008/090757A, WO2005/121098A, and JP2008-275726A.

Specific examples of the colorant represented by any one of Formula (1) to Formula (5) are shown below. However, the present invention is not limited thereto.

In the following specific examples, Me represents methyl, Et represents ethyl, and Ph represents phenyl, respectively.

A-1

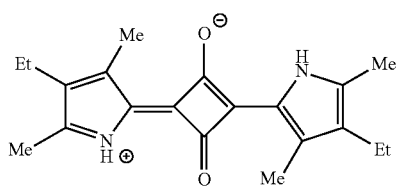

A-2

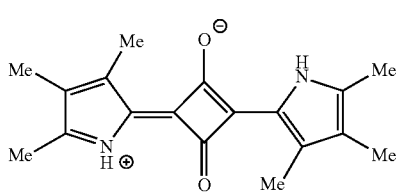

-continued

A-3

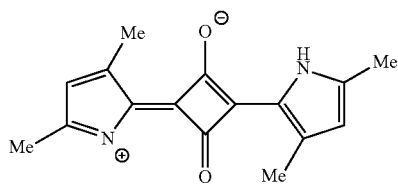

A-4

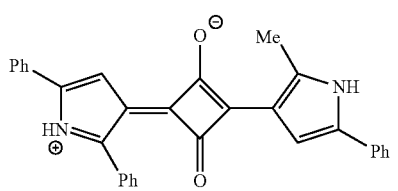

A-5

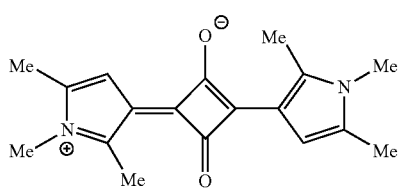

A-6

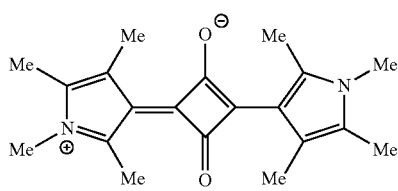

A-7

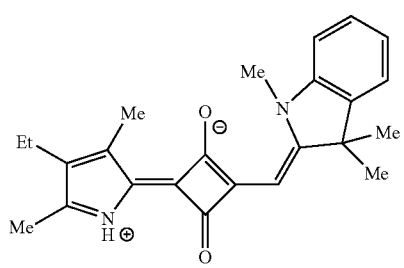

A-8

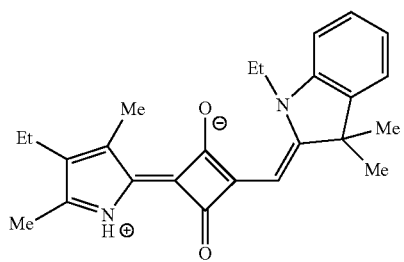

A-9

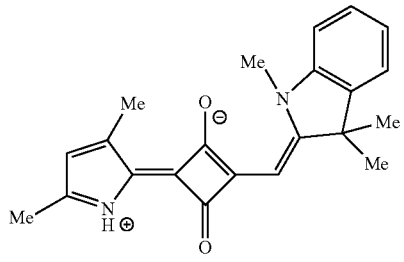

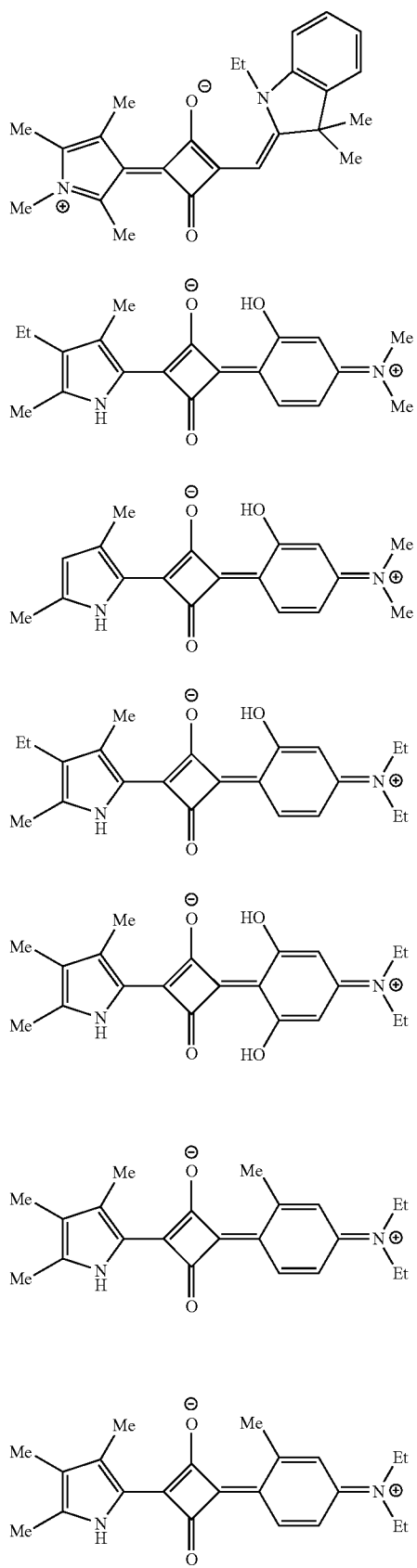

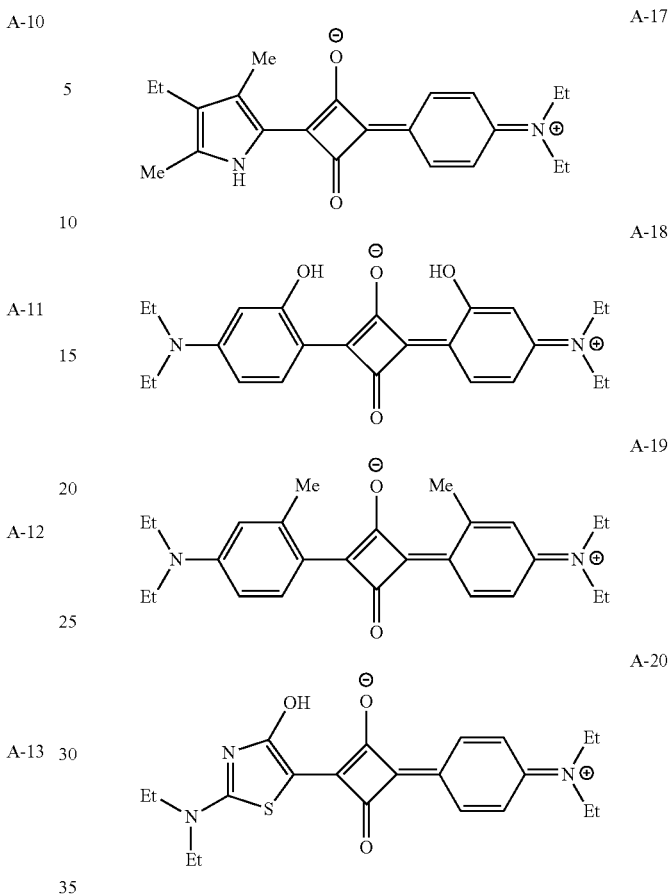

In addition to the above-shown specific examples, specific examples of the colorant represented by any one of Formulae (3) to (5) are shown below. In the following tables, substituents B represent the following structures. In the following structures and the following tables, Me represents methyl, Et represents ethyl, i-Pr represents isopropyl, Bu represents n-butyl, t-Bu represents t-butyl, and Ph represents phenyl, respectively. In the following structures, * indicates a bonding part with a four-membered carbon ring in each formula.

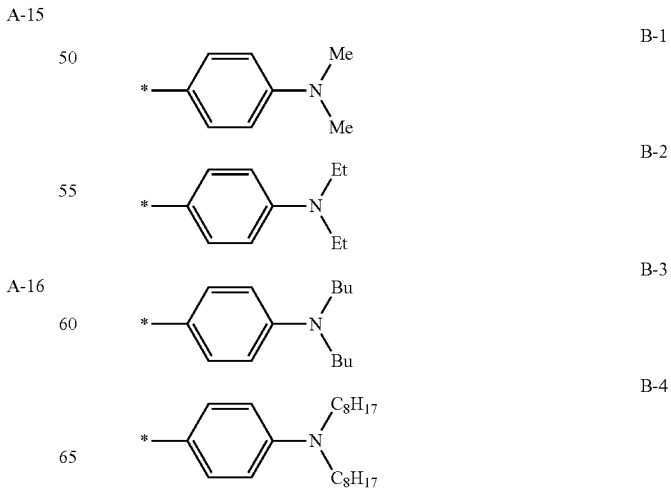

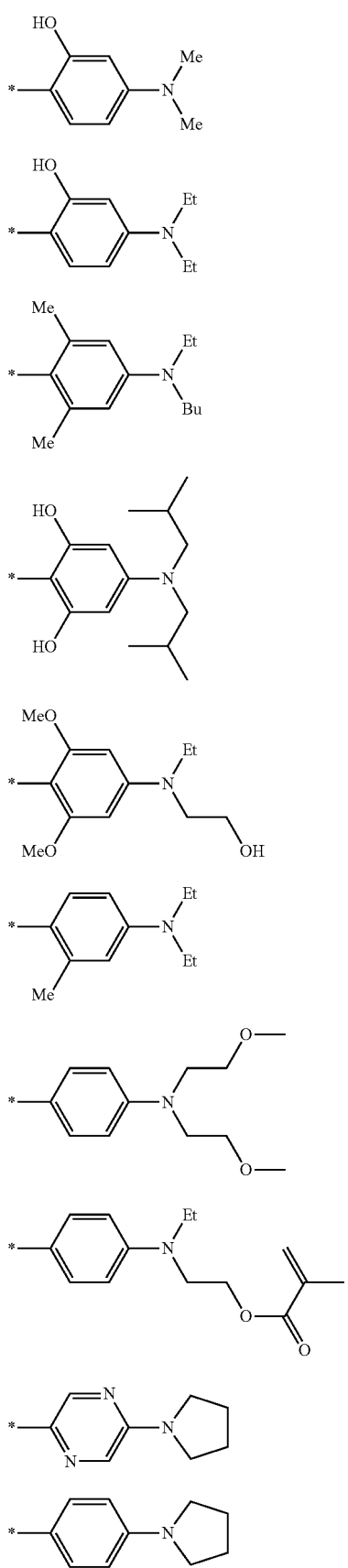
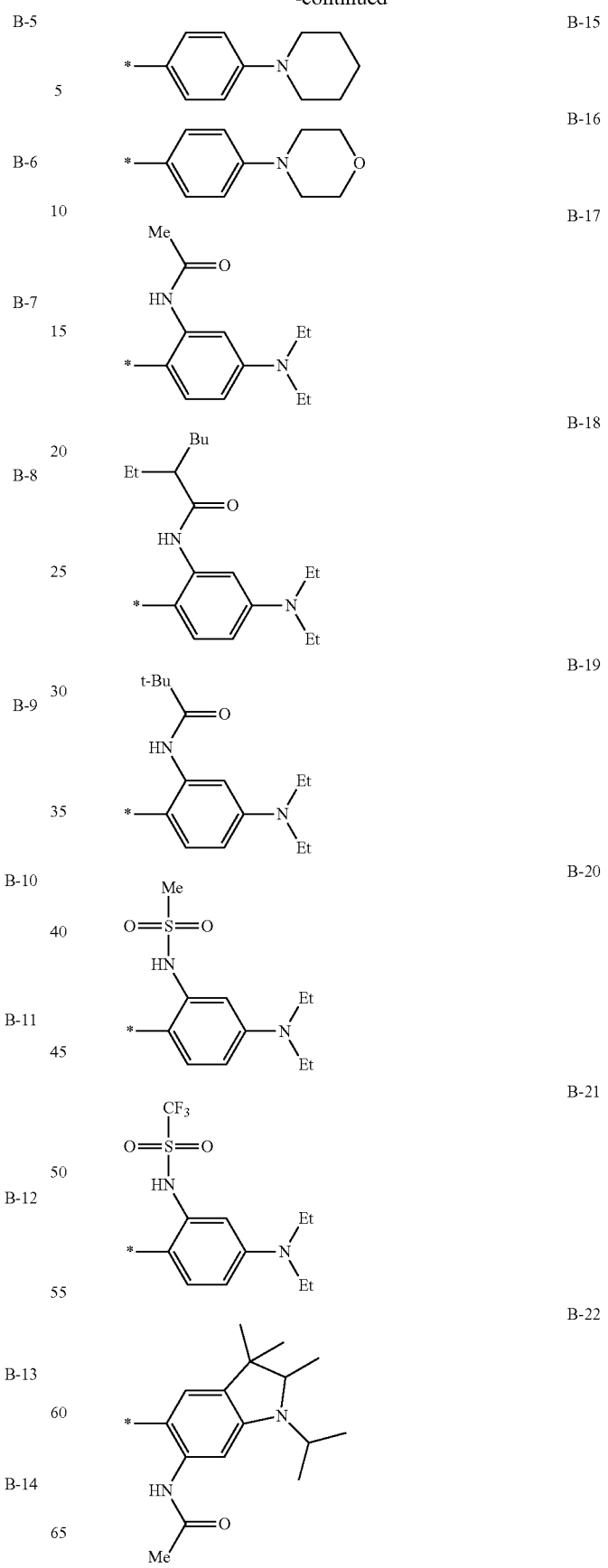

B-23 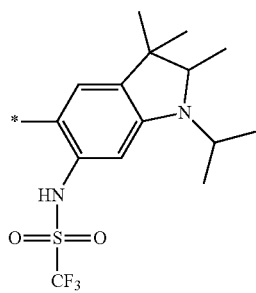
B-24 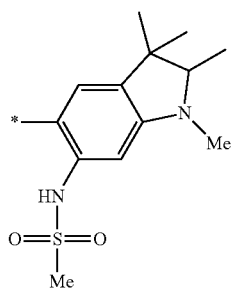
B-25 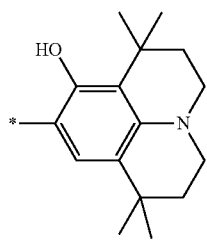
B-26 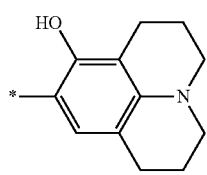
B-27 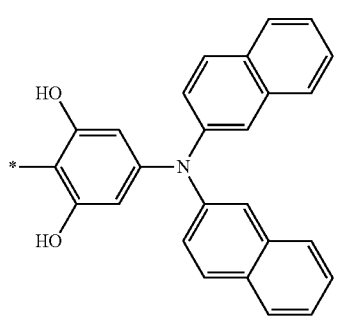
B-28 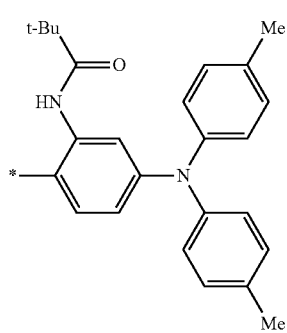
B-29 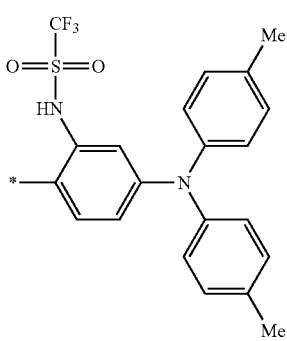
B-30 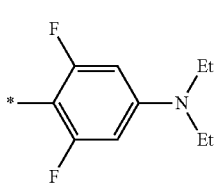
B-31 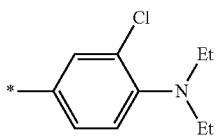
B-32 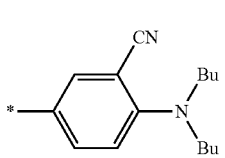
B-33 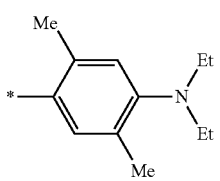
B-36 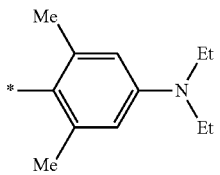
B-37 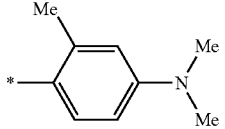
B-38 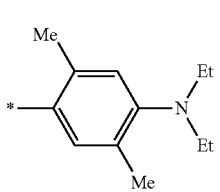

-continued
B-39 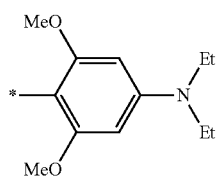
B-40 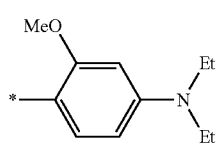
B-41 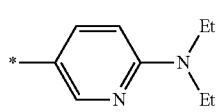
B-42 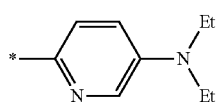
B-43 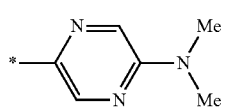
B-44 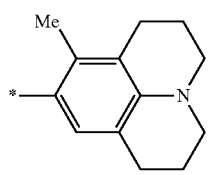
B-45 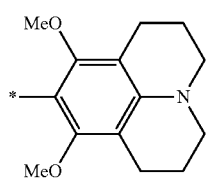
B-46 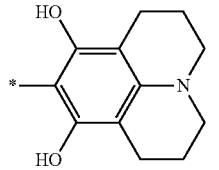
B-47 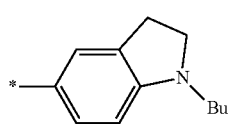
-continued
B-48 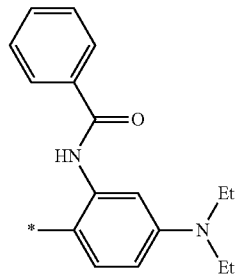
B-49 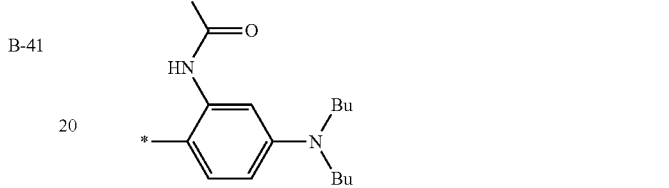
B-50 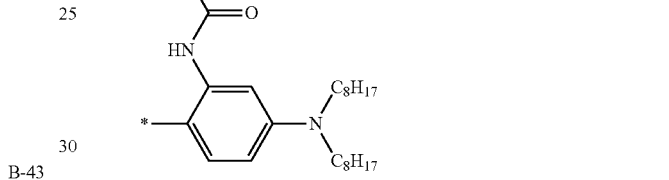
B-51 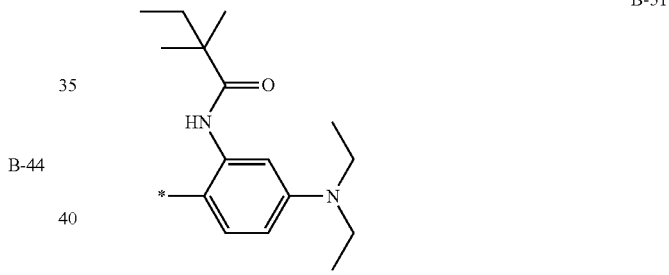
Formula (3)
| Compound No. | $R^3$ | $R^4$ | B |
|---|---|---|---|
| 3-1 | Me | Me | B-3 |
| 3-2 | Me | Me | B-4 |
| 3-3 | Me | Me | B-5 |
| 3-4 | Me | Me | B-10 |
| 3-5 | Me | Me | B-14 |
| 3-6 | Me | Me | B-16 |
| 3-7 | Me | Me | B-17 |
| 3-8 | Me | Me | B-18 |
| 3-9 | Me | Me | B-19 |
| 3-10 | Me | Me | B-20 |
| 3-11 | Me | Me | B-21 |
| 3-12 | Me | Me | B-22 |

-continued

Formula (3)

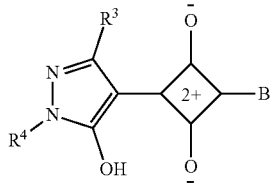

| Compound No. | R³ | R⁴ | B |
|---|---|---|---|
| 3-13 | Me | Me | B-23 |
| 3-14 | Me | Me | B-26 |
| 3-15 | Me | Me | B-32 |
| 3-16 | Me | Me | B-33 |
| 3-17 | Me | Me | B-38 |
| 3-18 | Me | Me | B-49 |
| 3-19 | Et | 2-pyridyl | B-28 |
| 3-20 | Me | 4-Me-6-OH-pyrimidin-2-yl | B-29 |
| 3-21 | H | H | B-23 |
| 3-22 | Et | t-Bu | B-21 |
| 3-23 | t-Bu | Me | B-18 |
| 3-24 | CF₃ | i-Pr | B-12 |
| 3-25 | COOEt | Et | B-6 |
| 3-26 | CN | Ph | B-11 |
| 3-27 | NMe₂ | Me | B-2 |
| 3-28 | i-Pr | Me | B-17 |
| 3-29 | OEt | Bu | B-27 |
| 3-30 | NH₂ | i-Pr | B-9 |
| 3-31 | t-Bu | Me | B-17 |
| 3-32 | t-Bu | Bu | B-21 |
| 3-33 | CF₃ | Me | B-18 |
| 3-34 | OEt | Et | B-33 |
| 3-35 | NMe₂ | i-Pr | B-2 |
| 3-36 | Et | Me | B-17 |
| 3-37 | Bu | Me | B-18 |
| 3-38 | NH₂ | Ph | B-19 |
| 3-39 | OEt | 2,4,6-trichlorophenyl | B-25 |
| 3-40 | Me | benzothiazol-2-yl | B-2 |
| 3-41 | Me | Ph | B-17 |
| 3-42 | Me | Ph | B-21 |
| 3-43 | Me | Ph | B-36 |
| 3-44 | Me | t-Bu | B-17 |
| 3-45 | Me | t-Bu | B-18 |
| 3-46 | Me | t-Bu | B-10 |
| 3-47 | OEt | Me | B-17 |
| 3-48 | OEt | Me | B-10 |

-continued

Formula (3)

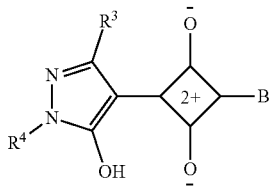

| Compound No. | R³ | R⁴ | B |
|---|---|---|---|
| 3-49 | Me | 2,4,6-trichlorophenyl | B-17 |
| 3-50 | Me | 2,4,6-trichlorophenyl | B-19 |
| 3-51 | Me | 2,4,6-trichlorophenyl | B-21 |
| 3-52 | Me | 2,4,6-trimethylphenyl | B-17 |
| 3-53 | Me | 2,4,6-trimethylphenyl | B-20 |
| 3-54 | Me | 2,4,6-trimethylphenyl | B-21 |
| 3-55 | t-Bu | Me | B-17 |
| 3-56 | t-Bu | Me | B-10 |
| 3-57 | t-Bu | Me | B-44 |
| 3-58 | t-Bu | t-Bu | B-17 |
| 3-59 | t-Bu | t-Bu | B-10 |
| 3-60 | t-Bu | t-Bu | B-6 |
| 3-61 | NBu₂ | Me | B-17 |
| 3-62 | NBu₂ | Me | B-10 |

-continued
Formula (3)
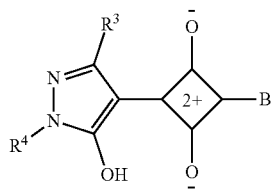
| Compound No. | R³ | R⁴ | B |
|---|---|---|---|
| 3-63 | t-Bu | 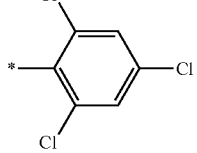 | B-17 |
| 3-64 | t-Bu | 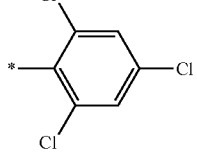 | B-19 |
| 3-65 | t-Bu | 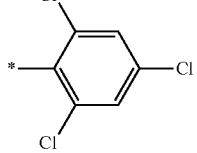 | B-21 |
| 3-66 | t-Bu | 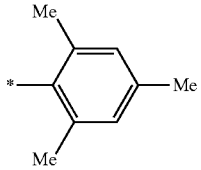 [SMILES: *c1c(C)cc(C)cc1C] | B-17 |
| 3-67 | t-Bu | 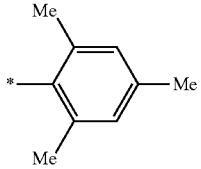 [SMILES: *c1c(C)cc(C)cc1C] | B-20 |
| 3-68 | t-Bu | 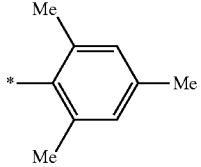 [SMILES: *c1c(C)cc(C)cc1C] | B-21 |
| 3-69 | Me | t-Bu | B-51 |
Formula (4)
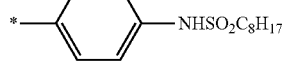
| Compound No. | R⁵ | R⁶ | B |
|---|---|---|---|
| 4-1 | t-Bu | 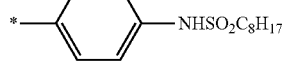 | B-2 |
| 4-2 | t-Bu | 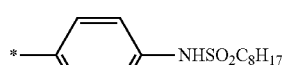 | B-6 |
| 4-3 | t-Bu | 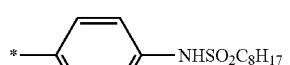 | B-10 |
| 4-4 | Me | 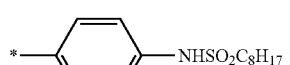 | B-4 |
| 4-5 | t-Bu | 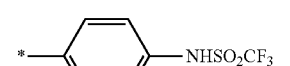 | B-6 |
| 4-6 | t-Bu | 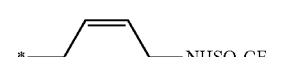 | B-14 |
| 4-7 | NHCOCH₃ | 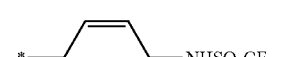 | B-1 |
| 4-8 | t-Bu | 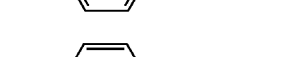 | B-6 |
| 4-9 | t-Bu | 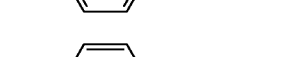 | B-16 |
| 4-10 | OEt | 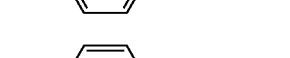 | B-11 |
| 4-11 | t-Bu | 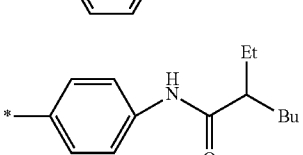 | B-6 |
| 4-12 | t-Bu | 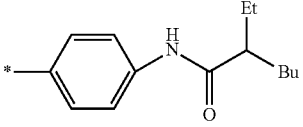 | B-12 |

-continued

Formula (4)

[Structure: pyrazolo-triazole with R5, R8 substituents, connected to squaraine ring with B substituent]

| Compound No. | R⁵ | R⁶ | B |
|---|---|---|---|
| 4-13 | OEt | *-C₆H₄-NHC(O)CH(Et)(Bu) | B-31 |
| 4-14 | H | H | B-22 |
| 4-15 | Me | Me | B-23 |
| 4-16 | Me | Me | B-17 |
| 4-17 | Me | Et | B-18 |
| 4-18 | Ph | Ph | B-8 |
| 4-19 | Et | t-Bu | B-17 |
| 4-20 | OEt | t-Bu | B-3 |
| 4-21 | OEt | Bu | B-26 |
| 4-22 | OEt | *-2-pyridyl | B-2 |
| 4-23 | CF3 | t-Bu | B-19 |
| 4-24 | NHCOCH₃ | t-Bu | B-2 |
| 4-25 | NHCOCH₃ | Me | B-1 |
| 4-26 | NMe₂ | t-Bu | B-6 |
| 4-27 | NMe₂ | Et | B-17 |
| 4-28 | H | Me | B-2 |
| 4-29 | t-Bu | t-Bu | B-18 |
| 4-30 | t-Bu | Me | B-17 |

Formula (5)

[Structure: pyrazolo-triazole with R7, R8 substituents, connected to squaraine ring with B substituent]

| Compound No. | R⁷ | R⁸ | B |
|---|---|---|---|
| 5-1 | t-Bu | *-C₆H₄-NHSO₂C₈H₁₇ | B-2 |
| 5-2 | Me | *-C₆H₄-NHSO₂C₈H₁₇ | B-6 |
| 5-3 | t-Bu | *-C₆H₄-NHSO₂CF₃ | B-4 |
| 5-4 | Me | *-C₆H₄-NHSO₂CH₃ | B-10 |
| 5-5 | t-Bu | *-C₆H₄-NHC(O)CH(Et)(Bu) | B-6 |
| 5-6 | t-Bu | *-2-pyridyl | B-14 |
| 5-7 | Me | *-2,4,6-trichlorophenyl | B-1 |
| 5-8 | Me | *-3,4-dichlorophenyl | B-6 |
| 5-9 | Me | *-2,4,6-trimethylphenyl | B-16 |
| 5-10 | t-Bu | *-2,4,6-trimethylphenyl | B-11 |
| 5-11 | Me | Me | B-17 |
| 5-12 | Me | t-Bu | B-18 |
| 5-13 | Ph | Ph | B-8 |
| 5-14 | Ph | *-2,4,6-trimethylphenyl | B-17 |
| 5-15 | Et | Ph | B-17 |
| 5-16 | OEt | t-Bu | B-3 |

-continued

Formula (5)

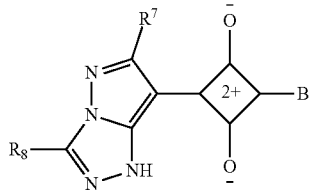

| Compound No. | R⁷ | R⁸ | B |
|---|---|---|---|
| 5-17 | OEt | Bu | B-26 |
| 5-18 | CF3 | t-Bu | B-19 |
| 5-19 | NHCOCH₃ | t-Bu | B-2 |
| 5-20 | NHCOCH₃ | 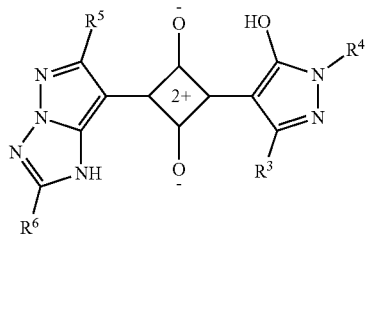 | B-1 |
| 5-21 | t-Bu | 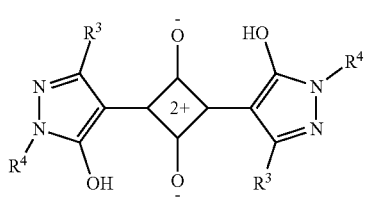 | B-2 |

Examples of a preferred embodiment of the colorant represented by Formula (1) include a colorant represented by Formula (6).

Formula (6)

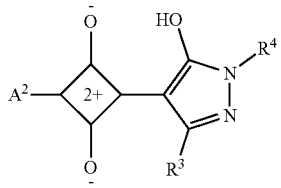

In Formula (6), $R^3$ and $R^4$ each independently represent a hydrogen atom or a substituent and have the same meaning as $R^3$ and $R^4$ in Formula (3), and the preferred ones are also the same.

In Formula (6), $A^2$ is the same as A in Formula (1). Among these, a heterocyclic group which is a nitrogen-containing five-membered ring is preferable.

The colorant represented by Formula (6) is preferably a colorant represented by any one of Formula (7), Formula (8), and Formula (9).

Formula (7)

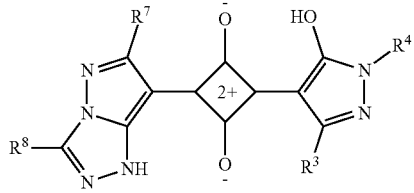

In Formula (7), $R^3$ and $R^4$ each independently represent a hydrogen atom or a substituent and have the same meaning as $R^3$ and $R^4$ in Formula (3), and the preferred range is also the same. Two $R^3$'s and two $R^4$'s may be the same as or different from each other.

Formula (8)

In Formula (8), $R^3$ and $R^4$ each independently represent a hydrogen atom or a substituent and have the same meaning as $R^3$ in Formula (3), and the preferred range is also the same.

In Formula (8), $R^5$ and $R^6$ each independently represent a hydrogen atom or a substituent and have the same meaning as $R^5$ and $R^6$ in Formula (4), and the preferred range is also the same.

Formula (9)

In Formula (9), $R^3$ and $R^4$ each independently represent a hydrogen atom or a substituent and have the same meaning as $R^3$ in Formula (3), and the preferred range is also the same.

In Formula (9), $R^7$ and $R^8$ each independently represent a hydrogen atom or a substituent and have the same meaning as $R^7$ and $R^8$ in Formula (5), and the preferred range is also the same.

Specific examples of the colorant represented by any one of Formulae (6) to (9) are shown below. However, the present invention is not limited thereto.

In the following specific examples, Me represents methyl, Et represents ethyl, i-Pr represents i-propyl, t-Bu represents t-butyl, and Ph represents phenyl, respectively. In the following structures, * indicates a bonding part with a four-membered carbon ring in each formula.

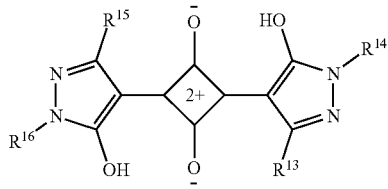

Formula (7)

| Compound No. | R13 | R14 | R15 | R16 |
|---|---|---|---|---|
| 7-1 | Me | Me | Me | Me |
| 7-2 | Et | Me | Et | Me |
| 7-3 | Me | 2,4,6-trichlorophenyl | Me | 2,4,6-trichlorophenyl |
| 7-4 | t-Bu | 2,4,6-trimethylphenyl | t-Bu | 2,4,6-trimethylphenyl |
| 7-5 | NMe2 | Me | NMe2 | Me |
| 7-6 | CN | Me | CN | Me |
| 7-7 | OEt | Me | OEt | Me |
| 7-8 | Me | 4-methyl-6-hydroxypyrimidin-2-yl | Me | 4-methyl-6-hydroxypyrimidin-2-yl |
| 7-9 | Et | 2-pyridyl | Et | 2-pyridyl |
| 7-10 | i-Pr | 2-pyridyl | i-Pr | 2-pyridyl |
| 7-11 | t-Bu | t-Bu | t-Bu | t-Bu |
| 7-12 | CF3 | Ph | CF3 | Ph |
| 7-13 | COOEt | Me | COOEt | Me |
| 7-14 | NH2 | Me | NH2 | Me |
| 7-15 | Me | Me | Me | 2,4,6-trichlorophenyl |
| 7-16 | Me | Me | t-Bu | t-Bu |
| 7-17 | Me | Me | NMe2 | Me |
| 7-18 | Me | Me | Me | Ph |
| 7-19 | Et | Me | Et | 2-pyridyl |

Formula (7)
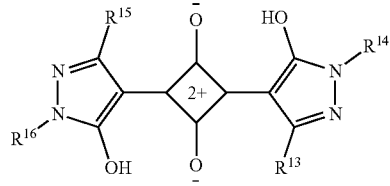
| Compound No. | R¹³ | R¹⁴ | R¹⁵ | R¹⁶ |
|---|---|---|---|---|
| 7-20 | COOEt | Me | Me | 2,4,6-trichlorophenyl |
Formula (8)
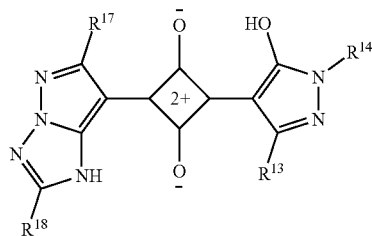
| Compound No. | R¹³ | R¹⁴ | R¹⁷ | R¹⁸ |
|---|---|---|---|---|
| 8-1 | Me | Me | Me | Me |
| 8-2 | Me | Me | t-Bu | *-C₆H₄-NHSO₂C₈H₁₇ |
| 8-3 | Me | Me | t-Bu | *-C₆H₄-NHSO₂CF₃ |
| 8-4 | Me | Me | t-Bu | *-C₆H₄-NHC(O)CH(Et)(Bu) |
| 8-5 | Me | 2,4,6-trichlorophenyl | Me | Me |

Formula (8)
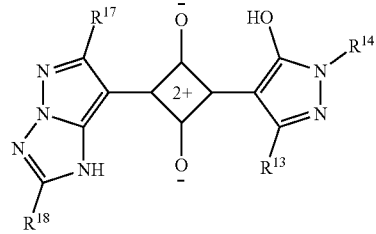
| Compound No. | R¹³ | R¹⁴ | R¹⁷ | R¹⁸ |
|---|---|---|---|---|
| 8-6 | Me | 2,4,5-trichlorophenyl (*) | t-Bu | *-C₆H₄-NHSO₂CF₃ |
| 8-7 | Me | Ph | t-Bu | *-C₆H₄-NHSO₂C₈H₁₇ |
| 8-8 | Me | 2,4,6-trimethylphenyl (*) | Me | Me |
| 8-9 | Et | Me | Me | Me |
| 8-10 | i-Pr | Me | Me | Me |
| 8-11 | t-Bu | Me | Me | Me |
| 8-12 | Me | Me | OEt | Bu |
| 8-13 | COOEt | Me | Me | Me |
| 8-14 | NH₂ | Me | Me | Me |
| 8-15 | Me | Me | CF₃ | t-Bu |
Formula (9)
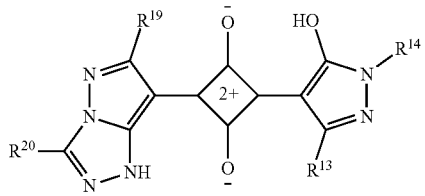
| Compound No. | R¹³ | R¹⁴ | R¹⁹ | R²⁰ |
|---|---|---|---|---|
| 9-1 | Me | Me | Me | Me |
| 9-2 | Me | Me | t-Bu | *-C₆H₄-NHSO₂C₈H₁₇ |

Formula (9)

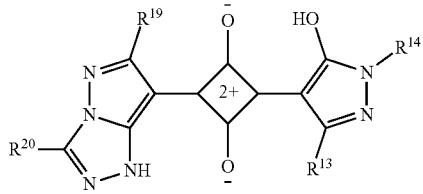

| Compound No. | R$^{13}$ | R$^{14}$ | R$^{19}$ | R$^{20}$ |
|---|---|---|---|---|
| 9-3 | Me | Me | Me | 2,4,6-trimethylphenyl |
| 9-4 | Me | Me | Me | 3,4-dichlorophenyl |
| 9-5 | Me | 2,4,6-trichlorophenyl | Me | Me |
| 9-6 | Me | 2,4,6-trichlorophenyl | Me | 2,4,6-trichlorophenyl |
| 9-7 | t-Bu | Me | t-Bu | 2,4,6-trimethylphenyl |
| 9-8 | t-Bu | Me | Me | Me |
| 9-9 | Et | Me | t-Bu | Me |
| 9-10 | i-Pr | Me | Me | 2,4,6-trimethylphenyl |

From the viewpoint of obtaining a colorant filter having high light fastness, which does not easily deteriorate images even in a case of being lighted for a long time, it is preferable to use the colorant represented by Formula (2) or (3).

The content of the colorant in the colorant filter according to the embodiment of the present invention, the colorant having an absorption maximum wavelength in a range of 560 to 620 nm or 460 to 520 nm, is preferably 0.001 parts by mass to 10 parts by mass with respect to 100 parts by mass of the binder resin described later. It is more preferable to be 0.005 parts by mass to 5 parts by mass, still more preferable to be 0.001 parts by mass to 3 parts by mass. From the viewpoint of obtaining a colorant filter having high light fastness, it is preferably to be 0.005% to 0.1% by mass.

In addition, the content of the colorant in the colorant filter according to the embodiment of the present invention, the colorant having an absorption maximum wavelength in a range of 560 to 620 nm or 460 to 520 nm, is preferably 0.001 g/m² to 1.0 g/m² in a case where the content is converted into a content per 1 m² of the colorant filter. It is still more preferable to be 0.01 g/m² to 0.7 g/m².

In a case where a colorant filter includes two or more kinds of colorants having an absorption maximum wavelength in a range of 560 to 620 nm or 460 to 520 nm, the above-described content is the total content thereof.

In a case where the colorant filter according to the embodiment of the present invention additionally serves as a polarizing plate protective film or a pressure-sensitive adhesive layer which will be described later, it is sufficient that the content of the colorant is also within the above-described range.

<Resin>

The colorant filter according to the embodiment of the present invention contains a resin (binder resin) (binder resin may include any conventional component in addition to a polymer). From the viewpoint of giving a sharper absorption waveform, in the resin used in the colorant filter according to the embodiment of the present invention preferably, it is preferable that fd calculated by Expression I satisfies Relational expression [A].

$$0.80 \leq fd \leq 0.95 \quad \text{Relational expression [A]:}$$

Here, the fd value is defined by Expression I.

$$fd = \delta d/(\delta d + \delta p + \delta h) \quad \text{Expression I:}$$

In Expression I, δd, δp, and δh respectively represent, in a solubility parameter St calculated by Hoy method, a term corresponding to London dispersion force, a term corresponding to dipole-dipole force, and a term corresponding to hydrogen bonding force. That is, fd represents the ratio of δd to the sum of δd, δp, and δh.

By using a binder resin having an fd value of 0.95 or less, the binder resin can be sufficiently dissolved in a solvent which can dissolve the colorant, and by using a binder resin having an fd value of 0.80 or more, a sharper absorption waveform is easily obtained.

In addition, in a case where the colorant filter includes two or more kinds of binder resins, the fd value is calculated as follows.

$$fd = \Sigma(wi \cdot fdi)$$

Here, wi represents the mass fraction of the i-th binder resin and fdi represents the fd value of the i-th binder resin.

—Term δd Corresponding to London Dispersion Force—

The term δd corresponding to London dispersion force refers to δd obtained from Amorphous Polymers described in the column "2) Method of Hoy (1985, 1989)" in pages 214 to 220 of reference "Properties of Polymers 3$^{rd}$, ELSEVIER, (1990)", and is calculated according to the description of the above-described column in the reference.

—Term δp Corresponding to Dipole-Dipole Force—

The calculation method of the term δp corresponding to dipole-dipole force relates to Op obtained from Amorphous Polymers described in the column "2) Method of Hoy (1985, 1989)" in pages 214 to 220 of reference "Properties of Polymers 3$^{rd}$, ELSEVIER, (1990)", and the term is calculated according to the description of the above-described column in the reference.

—Term δh Corresponding to Hydrogen Bonding Force—

The calculation method of the term δh corresponding to hydrogen bonding force relates to δh obtained from Amorphous Polymers described in the column "2) Method of Hoy (1985, 1989)" in pages 214 to 220 of reference "Properties of Polymers 3$^{rd}$, ELSEVIER, (1990)", and the term is calculated according to the description of the above-described column in the reference.

Preferred examples of the binder resin in the colorant filter according to the embodiment of the present invention include a polystyrene resin, an acrylic resin, a cycloolefin resin. Among these, a resin having low polarity is preferable, and a cycloolefin resin or a polystyrene resin is more preferable.

Hereinafter, the cycloolefin resin and the polystyrene resin preferably used in the present invention will be described.

—Cycloolefin Resin—

A cyclic olefin compound forming the cycloolefin resin (cyclic polyolefin resin) is not particularly limited as long as the cyclic olefin compound is a compound having a ring structure including a carbon-carbon double bond, and examples thereof include a norbornene compound, a monocyclic olefin compound which is not a norbornene compound, a cyclic conjugated diene compound, and a vinyl alicyclic hydrocarbon compound.

Examples of the cycloolefin resin include (1) polymers including a structural unit derived from a norbornene compound, (2) polymers including a structural unit derived from a monocyclic olefin compound which is not a norbornene compound, (3) polymers including a structural unit derived from a cyclic conjugated diene compound, (4) polymers including a structural unit derived from a vinyl alicyclic hydrocarbon compound, and hydrides of polymers including a structural unit derived from each of the compounds (1) to (4). In the present invention, the polymer including a structural unit derived from a norbornene compound and the polymer including a structural unit derived from a monocyclic olefin compound include ring-opening polymers of the respective compounds.

The cycloolefin resin is not particularly limited, but is preferably a polymer having a structural unit derived from a norbornene compound, which is represented by Formula (A-II) or (A-III). The polymer having the structural unit represented by Formula (A-II) is an addition polymer of a norbornene compound, and the polymer having the structural unit represented by Formula (A-III) is a ring-opening polymer of a norbornene compound.

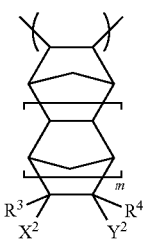

Formula (A-II)

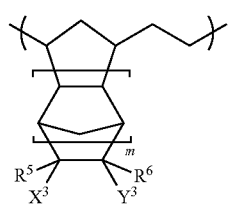

(A-III)

In the formulae, m represents an integer of 0 to 4, and is preferably 0 or 1.

$R^3$ to $R^6$ each independently represent a hydrogen atom or a hydrocarbon group having 1 to 10 carbon atoms.

In the present invention, the hydrocarbon group is not particularly limited as long as the hydrocarbon group is a group consisting of a carbon atom and a hydrogen atom, and examples thereof include an alkyl group, an alkenyl group, an alkynyl group, and an aryl group (aromatic hydrocarbon group). Among these, an alkyl group or an aryl group is preferable.

$X^2$ and $X^3$, and $Y^2$ and $Y^3$ each independently represent a hydrogen atom, a hydrocarbon group having 1 to 10 carbon atoms, a halogen atom, a hydrocarbon group having 1 to 10 carbon atoms, which is substituted with a halogen atom, —(CH$_2$)nCOOR$^{11}$, —(CH$_2$)nOCOR$^{12}$, —(CH$_2$)nNCO, —(CH$_2$)nNO$_2$, —(CH$_2$)nCN, —(CH$_2$)nCONR$^{13}$R$^{14}$, —(CH$_2$)nNR$^{13}$R$^{14}$, —(CH$_2$)nOZ, —(CH$_2$)nW, or (—CO)$_2$O or (—CO)$_2$NR$^{15}$ which is formed by bonding $X^2$ and $Y^2$, or $X^3$ and $Y^3$.

Here, $R^{11}$ to $R^{15}$ each independently represent a hydrogen atom or a hydrocarbon group having 1 to 20 carbon atoms, Z represents a hydrocarbon group or a hydrocarbon group substituted with halogen, and W represents Si(R$^{16}$)$_p$D$_{(3-p)}$ (R$^{16}$ represents a hydrocarbon group having 1 to 10 carbon atoms, and D represents a halogen atom, —OCOR$^{17}$, or —OR$^{17}$ (R$^{17}$ represents a hydrocarbon group having 1 to 10 carbon atoms), and p represents an integer of 0 to 3). n represents an integer of 0 to 10, and is preferably 0 to 8 and more preferably 0 to 6.

In Formula (A-II) or (A-III), $R^3$ to $R^6$ are respectively preferably a hydrogen atom or —CH$_3$, and from the viewpoint of moisture permeability, still more preferably a hydrogen atom.

Each of $X^2$ and $X^3$ is preferably a hydrogen atom, —CH$_3$, or —C$_2$H$_5$, and from the viewpoint of moisture permeability, still more preferably a hydrogen atom.

Each of $Y^2$ and $Y^3$ is preferably a hydrogen atom, a halogen atom (particularly a chlorine atom), or —(CH$_2$)nCOOR$^{11}$ (particularly —COOCH$_3$), and from the viewpoint of moisture permeability, still more preferably a hydrogen atom.

Other groups are appropriately selected.

The polymer having the structural unit represented by Formula (A-II) or (A-III) may further include at least one kind of a structural unit represented by Formula (A-I).

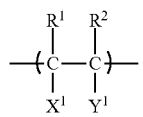

Formula (A-I)

In the formula, $R^1$ and $R^2$ each independently represent a hydrogen atom or a hydrocarbon group having 1 to 10 carbon atoms, and $X^1$ and $Y^1$ each independently represent a hydrogen atom, a hydrocarbon group having 1 to 10 carbon atoms, a halogen atom, a hydrocarbon group having 1 to 10 carbon atoms, which is substituted with a halogen atom, —(CH$_2$)nCOOR$^{11}$, —(CH$_2$)nOCOR$^{12}$, —(CH$_2$)nNCO, —(CH$_2$)nNO$_2$, —(CH$_2$)nCN, —(CH$_2$)nCONR$^{13}$R$^{14}$, —(CH$_2$)nNR$^{13}$R$^{14}$, —(CH$_2$)nOZ, —(CH$_2$)nW, or (—CO)$_2$O or (—CO)$_2$NR$^{15}$ which is formed by bonding $X^1$ and $Y^1$.

Here, $R^{11}$ to $R^{15}$ each independently represent a hydrogen atom or a hydrocarbon group having 1 to 20 carbon atoms, Z represents a hydrocarbon group or a hydrocarbon group substituted with halogen, and W represents Si(R$^{16}$)$_p$D$_{(3-p)}$ (R$^{16}$ represents a hydrocarbon group having 1 to 10 carbon atoms, and D represents a halogen atom, —OCOR$^{17}$, or —OR$^{17}$ (R$^{17}$ represents a hydrocarbon group having 1 to 10 carbon atoms), and p represents an integer of 0 to 3). n represents an integer of 0 to 10.

From the viewpoint of adhesiveness to a polarizer, the content of the above-described structural unit derived from a norbornene compound in the cycloolefin resin having the structural unit represented by Formula (A-II) or (A-III) is preferably 90% by mass or less, more preferably 30% to 85% by mass, still more preferably 50% to 79% by mass, and most preferably 60% to 75% by mass with respect to the total mass of the cycloolefin resin. Here, the proportion of the structural unit derived from a norbornene compound represents the average value in the cycloolefin resin.

Addition (co)polymers of a norbornene compound are described in JP1998-007732A (JP-H10-007732A), JP2002-504184A, US2004/0229157A1, WO2004/070463A, or the like.

The polymer of a norbornene compound is obtained by an addition polymerization of norbornene compounds (for example, polycyclic unsaturated compounds of norbornene).

In addition, examples of the polymer of a norbornene compound include copolymers obtained by an addition copolymerization of, as necessary, a norbornene compound, and olefin such as ethylene, propylene, and butene, conjugated diene such as butadiene and isoprene, unconjugated diene such as ethylidene norbornene, or an ethylenically unsaturated compound such as acrylonitrile, acrylic acid, methacrylic acid, maleic acid anhydride, acrylic acid ester, methacrylic acid ester, maleimide, vinyl acetate, and vinyl chloride. Among these, a copolymer with ethylene is preferable.

Examples of the above-described addition (co)polymers of a norbornene compound include APL8008T (Tg: 70° C.), APL6011T (Tg: 105° C.), APL6013T (Tg: 125° C.), and APL6015T (Tg: 145° C.) which are sold by Mitsui Chemicals, Inc. under a trade name of APL and have different glass transition temperatures (Tg). In addition, pellets such as TOPAS8007, TOPAS6013, and TOPAS6015 are commercially available from Polyplastics Co., Ltd. Furthermore, Appear3000 is commercially available from Film Ferrania S. R. L.

As the above-described polymer of a norbornene compound, a commercially available product can be used. For example, polymers are commercially available from JSR Corporation under a trade name of Arton G or Arton F, and polymers are commercially available from Zeon Corporation under a trade name of Zeonor ZF14, ZF16, Zeonex 250, or Zeonex 280.

The hydride of the polymer of a norbornene compound can be synthesized by an addition polymerization or a ring-opening metathesis polymerization of a norbornene compound or the like and then an addition of hydrogen. Synthetic methods are described in, for example, JP1989-240517A (JP-H01-240517A), JP1995-196736A (JP-H07-196736A), JP1985-026024A (JP-S60-026024A), JP1987-019801A (JP-S62-019801A), JP2003-159767A, JP2004-309979A, and the like.

The molecular weight of the cycloolefin resin used in the present invention is appropriately selected depending on the purpose of use, but is in range of, based on mass average molecular weight in terms of polyisoprene or polystyrene measured by gel permeation chromatography of a cyclohexane solution (in a case where the polymer is not dissolved, toluene solution), usually 5000 to 500000, preferably 8000 to 200000, and more preferably 10000 to 100000. A polymer having a molecular weight within the above-described range is capable of satisfying both the mechanical strength and molding workability of a molded product at a high level in a well-balanced manner.

—Polystyrene Resin—

The polystyrene resin means a resin including 50% by mass or more of a styrene component. In the present invention, only one polystyrene resin may be used or two or more polystyrene resins may be used in combination. Here, the styrene component refers to a constitutional unit derived from a monomer having a styrene skeleton in the structure. For the purpose of controlling a photoelastic coefficient of the colorant filter to be preferable and controlling hygroscopicity of the colorant filter to be preferable, the polystyrene resin more preferably includes 70% by mass or more of the styrene component and still more preferably includes 85% by mass or more of the styrene component. In addition, it is preferable that the polystyrene resin is composed of only the styrene component.

Examples of the polystyrene resin include a homopolymer of a styrene compound and a copolymer of two or more styrene compounds. Here, the styrene compound refers to a compound having a styrene skeleton in the structure thereof and also refers to a compound having, in addition to styrene, a substituent introduced to a portion other than an ethylenically unsaturated bond of styrene. Examples of the styrene compound include styrene; alkyl styrenes such as α-methyl styrene, o-methyl styrene, m-methyl styrene, p-methyl styrene, 1,3-dimethyl styrene, 2,4-dimethyl styrene, o-ethyl styrene, p-ethyl styrene, and tert-butyl styrene; and substituted styrenes in which a hydroxyl group, an alkoxy group, a carboxyl group, a halogen, or the like is introduced to a benzene nucleus of styrene, such as hydroxy styrene, tert-butoxy styrene, vinyl benzoic acid, o-chlorostyrene, and p-chlorostyrene. Among these, from the viewpoint of easy procurement, material costs, and the like, the polystyrene used in the present invention is preferably a homopolymer of styrene (that is, polystyrene).

In addition, constitutional components other than the styrene component, which can be included in the above-described polystyrene resin, are not particularly limited. That is, the polystyrene resin may be a styrene-diene copolymer, a styrene-polymerizable unsaturated carboxylate ester copolymer, or the like. In addition, it is also possible to use a mixture of polystyrene and synthetic rubber (for example, polybutadiene, polyisoprene, and the like). In addition, high impact polystyrene (HIPS) obtained by graft-polymerizing styrene to synthetic rubber is also preferable. In addition, polystyrene (referred to as graft-type high impact polystyrene "graft HIPS") obtained by dispersing a rubber-form elastic body in a continuous phase of a polymer including the styrene component (for example, a copolymer of the styrene component and a (meth)acrylate ester component) and graft-polymerizing the copolymer to the rubber-form elastic body is also preferable. Furthermore, so-called styrene-based elastomers can also be suitably used.

In addition, the above-described polystyrene resin may be hydrogenated (may be a hydrogenated polystyrene resin). The hydrogenated polystyrene resin is not particularly limited, but is preferably hydrogenated styrene-diene-based copolymers such as a hydrogenated styrene-butadiene-styrene block copolymer (SEBS) and a hydrogenated styrene-isoprene-styrene block copolymer (SEPS), which are resins obtained by adding hydrogen to SBS or SIS. The hydrogenated polystyrene resin may be used singly or in combination of two or more thereof.

As the polystyrene resin, a plurality of types of polystyrene having different compositions, molecular weights, and the like can be used in combination.

The polystyrene-based resin can be obtained by a known anion, massive, suspension, emulsification, or solution polymerization method. In addition, in the polystyrene resin, an unsaturated double bond of a conjugated diene or of a benzene ring of a styrene monomer may be hydrogenated. The hydrogenation rate can be measured by a nuclear magnetic resonance device (NMR).

As the polystyrene resin, a commercially available product may be used, and examples thereof include "CLEAREN 530L", "CLEAREN 730L" manufactured by Denka Company Limited, "TUFPRENE 126S", "ASAPRENE T411" manufactured by Asahi Kasei Corporation, "KRATON D1102A", "KRATON D1116A" manufactured by Kraton Corporation, "STYROLUX S", "STYROLUX T" manufactured by INEOS Styrolution Group GmbH, "ASAFLEX 840", "ASAFLEX 860" manufactured by Asahi Kasei Corporation (all of which is SBS), "679", "HF77", "SGP-10" manufactured by PS Japan Corporation, "DICSTYRENE XC-515", "DICSTYRENE XC-535" manufactured by DIC Corporation (all of which is GPPS), "475D", "H0103", "HT478" manufactured by PS Japan Corporation, and "DICSTYRENE GH-8300-5" manufactured by DIC Corporation (all of which is HIPS). Examples of the hydrogenated polystyrene-based resin include "TUFTEC H Series" manufactured by Asahi Kasei Corporation, "KRATON G Series" manufactured by Shell Japan Limited (all of which is SEBS), "DYNARON" manufactured by JSR Corporation (hydrogenated styrene-butadiene random copolymer), and "SEPTON" manufactured by Kuraray Co., Ltd. (SEPS). In addition, examples of a modified polystyrene-based resin include "TUFTEC M Series" manufactured by Asahi Kasei Corporation, "EPOFRIEND" manufactured by Daicel Corporation, "polar group-modified DYNARON" manufactured by JSR Corporation, and "RESEDA" manufactured by Toagosei Co., Ltd.

From the viewpoint of sharpness of absorption waveform and light resistance, the colorant filter includes the binder resin in an amount of preferably 50% by mass or more, more preferably 70% by mass or more, and particularly preferably 90% by mass or more. The content of the binder resin in the colorant filter according to the embodiment of the present invention is usually 99.90% by mass or less, and is preferably 99.85% by mass or less.

Two or more kinds of binder resins may be used, and binder resins having different compositional ratios and/or molecular weights may be used in combination. In this case, the total content of the respective binder resins is within the above-described range.

<Additive>

The colorant filter according to the embodiment of the present invention may include an additive as long as the effects of the present invention are not impaired. For example, the colorant filter according to the embodiment of the present invention may include an additive which can be generally blended in a plastic film as necessary. Examples of the additive include an antioxidant, a heat stabilizer, a light stabilizer, an ultraviolet absorber, an antistatic agent, a lubricant, a plasticizer, and a filler, and the content thereof can be selected within a range which does not impair the object of the present invention. In addition, examples of the additive include a plasticizer, an organic acid, a polymer, a retardation adjuster, an ultraviolet absorber, an antioxidant, and a matting agent, which are commonly used. With regard to these compounds, reference can be made to the description in paragraphs "0062" to "0097" of JP2012-155287A, and the contents of which are incorporated herein by reference. In addition, examples of the additive include a peeling accelerator, an organic acid, and a polyvalent carboxylic acid derivative. With regard to these compounds, reference can be made to the description in paragraphs "0212" to "0219" of WO2015/005398A, and the contents of which are incorporated herein by reference. Furthermore, examples of the additive include a radical scavenger and a deterioration inhibitor which will be described later.

The content of the additive (in a case where the colorant filter contains two or more kinds of additives, total content thereof) is preferably 50 parts by mass or less, more preferably 30 parts by mass or less, and still more preferably 5 to 30 parts by mass with respect to 100 parts by mass of the binder resin.

—Antioxidant—

A preferred example of the additive includes an antioxidant. With regard to the antioxidant, reference can be made to the description in paragraphs "0143" to "0165" of WO2015/005398A, and the contents of which are incorporated herein by reference.

—Radical Scavenger—

A preferred example of the additive includes a radical scavenger. With regard to the radical scavenger, reference can be made to the description in paragraphs "0166" to "0199" of WO2015/005398A, and the contents of which are incorporated herein by reference.

—Deterioration Inhibitor—

A preferred example of the additive includes a deterioration inhibitor. With regard to the deterioration inhibitor, reference can be made to the description in paragraphs "0205" and "0206" of WO2015/005398A, and the contents of which are incorporated herein by reference.

—Ultraviolet Absorber—

In the present invention, from the viewpoint of preventing deterioration, an ultraviolet absorber may be added to the colorant filter. From the viewpoint of excellent absorption capacity of ultraviolet rays with a wavelength of 370 nm or less and good liquid crystal display properties, an ultraviolet absorber having a small absorption of visible light with a wavelength of 400 nm or more is preferably used. Specific examples of the ultraviolet absorber preferably used in the present invention include a hindered phenol-based compound, a hydroxybenzophenone-based compound, a benzotriazole-based compound, a salicylic acid ester-based compound, a benzophenone-based compound, a cyanoacrylate-based compound, and a nickel complex salt compound.

Examples of the hindered phenol-based compound include 2,6-di-tert-butyl-p-cresol, pentaerythrityl-tetrakis [3-(3,5-di-tert-butyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, and tris-(3,5-di-tert-butyl-4-hydroxybenzyl)-isocyanurate. Examples of the benzotriazole-based compound include 2-(2'-hydroxy-5'-methylphenyl)benzotriazole, 2,2-methylenebis(4-(1,1,3,3-tetramethylbutyl)-6-(2H-benzotriazol-2-yl)phenol), (2,4-bis-(n-octylthio)-6-(4-hydroxy-3,5-di-tert-butylanilino)-1,3, 5-triazine, triethylene glycol-bis [3-(3-tert-butyl-5-methyl-4-hydroxyphenyl)propionate], N,N'-hexamethylenebis (3,5-di-tert-butyl-4-hydroxy-hydrocinnamide), 1,3,5-trimethyl-2,4,6-tris(3,5-di-tert-butyl-4-hydroxybenzyl)benzene, 2(2'-hydroxy-3',5'-di-tert-butylphenyl)-5-chlorbenzotriazole, (2(2'-hydroxy-3',5'-di-tert-amylphenyl)-5-chlorbenzotriazole, 2,6-di-tert-butyl-p-cresol, pentaerythrityl-tetrakis [3-(3, 5-di-tert-butyl-4-hydroxyphenyl)propionate], and 2-(2H-benzotriazol-2-yl)-6-(1-methyl-1-phenylethyl)-4-(1,1,3,3-tetramethylbutyl)phenol.

The colorant filter according to the embodiment of the present invention preferably contains the ultraviolet absorber in an amount of 0.01% by mass to 5% by mass with respect to the binder resin. The content of the ultraviolet absorber is preferably 0.5% by mass to 4.0% by mass and more preferably 1.5% by mass to 3.5% by mass with respect to the binder resin.

In addition, the colorant filter according to the embodiment of the present invention may include a polarization-improving agent, a discoloration preventer, a matting agent, a leveling agent, or the like, in addition to the above-described colorant and matrix resin.

(Polarization-Improving Agent)

The colorant filter according to the embodiment of the present invention preferably contains a polarization-improving agent. By quenching the fluorescence emitted from the colorant with a polarization-improving agent, an organic EL display device can improve the degree of polarization of a polarizing plate having the purpose of preventing reflected glare of external light.

The polarization-improving agent used in the present invention is preferably an electron-donating quencher or an electron-accepting quencher. Hereinafter, the electron-donating quencher and electron-accepting quencher used in the present invention will be described.

—Electron-Donating Quencher—

The electron-donating quencher used in the present invention is a quencher which deactivates the colorant in the excited state to the ground state by donating an electron to SOMO of the lower energy level among two SOMO's of the colorant in the excited state and then by receiving an electron from SOMO of the higher energy level in the colorant.

It is preferable that the energy level of HOMO of the electron-donating quencher used in the present invention satisfies Relational expression [A-1] with regard to the energy level of HOMO of the colorant.

$$E_{Hq} - E_{Hd} \leq 0.40 \text{ eV} \qquad \text{Relational expression [A-1]:}$$

Here, each of $EH_d$ and $EH_q$ represents the following values.

$EH_d$: energy level of HOMO of colorant $EH_q$: energy level of HOMO of electron-donating quencher In a case where the energy levels satisfy the above-described relationship, it is possible to effectively suppress the fluorescence emission of the colorant.

It is more preferable that the energy level of HOMO of the electron-donating quencher used in the present invention satisfies Relational expression [A-2], and it is most preferable to satisfy Relational expression [A-3].

$$E_{Hq} - E_{Hd} \leq 0.20 \text{ eV} \qquad \text{Relational expression [A-2]:}$$

$$E_{Hq} - E_{Hd} \leq 0.10 \text{ eV} \qquad \text{Relational expression [A-3]:}$$

——Calculation Method of Energy Level——

Regarding the energy levels of the colorant and the polarization-improving agent used in the present invention, values obtained from the oxidation potential are used as HOMO, and values obtained from the reduction potential are used as LUMO. Hereinafter, the measurement and calculation method of each potential will be described.

The oxidation potential of the colorant and the oxidation potential and reduction potential of the polarization-improving agent used in the present invention are measured by an electrochemical analyzer (ALS660A manufactured by ALS Co., Ltd.) respectively using a gold electrode as a working electrode, a platinum black electrode as a counter electrode, an Ag line as a reference electrode, and tetrabutylammonium hexafluorophosphate as a supporting electrolyte, and are represented by values with, as a standard potential, the ferrocene/ferricinium ion system (Fc/Fc$^+$) measured under the same conditions. Regarding the colorant with a built-in polarization-improving agent described later, two oxidation potentials are detected, but the noble potential is assigned to the oxidation potential of a colorant portion and the base potential is assigned to the oxidation potential of a polarization-improving agent portion.

The reduction potential of the colorant is calculated as follows.

First, the absorption spectrum of the colorant is measured using a spectrophotometer (8430 manufactured by HP), and the fluorescence spectrum is measured using a fluorescence photometer (Fluorog3 manufactured by HORIBA). A solvent used for measurement is the same as the solvent used in the above-described potential measurement.

Next, the absorption spectrum and fluorescence spectrum obtained above are respectively standardized by the absorbance at the absorption maximum wavelength and the emission intensity at the emission maximum wavelength, a wavelength at the intersection point thereof is determined, and the value of this wavelength is converted into an energy unit (eV) to obtain a HOMO-LUMO band gap.

The reduction potential of the colorant is calculated by adding the value of the HOMO-LUMO band gap to the value. (eV) of the oxidation potential of the colorant measured above.

Hereinafter, compounds preferably used as the electron-donating quencher in the present invention will be described.

A structure represented by Formula (I) or (I') can be preferably used as the electron-donating quencher used in the present invention.

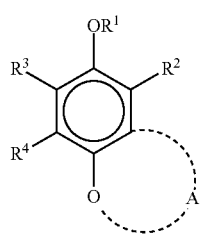

Formula (I)

In Formula (I), $R^1$ represents a hydrogen atom, an alkyl group, an acyl group, a sulfonyl group, a carbamoyl group, a sulfamoyl group, an alkoxycarbonyl group, an aryloxycarbonyl group, or a trialkylsilyl group, and A represents a non-metal atom necessary for completing a five- or six-membered ring. Each of $R^2$, $R^3$, and $R^4$ represents a hydrogen atom, an alkyl group, a cycloalkyl group, an alkoxy group, an aryl group, an aryloxy group, an aralkyl group, an aralkoxy group, an alkenyl group, an alkenoxy group, an acylamino group, a halogen atom, an alkylthio group, a diacylamino group, an arylthio group, an alkoxycarbonyl group, an acyloxy group, an acyl group, or a sulfonamide group, which may be the same as or different from each other. Furthermore, the compound represented by Formula (I) includes a bisspiro compound in which the ring A is a structure including a Spiro atom.

Preferred examples of $R^1$ in Formula (I) include an alkyl group such as methyl, ethyl, and propyl; an acyl group such as acetyl, and benzoyl; a sulfonyl group such as methanesulfonyl, butanesulfonyl, benzenesulfonyl, and trimethylsilyl; a carbamoyl group such as N-methylcarbamoyl, N,N-diethylcarbamoyl, and N-phenylcarbamoyl; a sulfamoyl group such as N-methylsulfamoyl, N,N-dimethylsulfamoyl, and N-phenylsulfamoyl; an alkoxycarbonyl group such as methoxycarbonyl, ethoxycarbonyl, and benzyloxycarbonyl; an aryloxycarbonyl group such as phenoxycarbonyl; and a trialkylsilyl group such as trimethylsilyl and dimethylbutylsilyl.

A in Formula (I) represents a non-metal atom necessary for completing a five- or six-membered ring, and the ring may have a substituent. Preferred examples of the substituent include an alkyl group (such as methyl), an alkoxy group (such as methoxy), an aryl group (such as phenyl), an aryloxy group (such as phenoxy), an aralkyl group (such as benzyl), an aralkoxy group (such as benzyloxy), an alkenyl group (such as allyl), N-substituted amino group (such as an alkylamino group, a dialkylamino group, an N-alkyl-N-arylamino group, and piperazino), and a heterocyclic group (such as benzothiazolyl and benzoxazoyl). In addition, A may have a residue obtained by forming a fused ring. The alkyl group and aryl group as the substituent that A may have may further have a substituent, and preferred examples of the substituent include a halogen atom, a hydroxy group, a carboxy group, an alkoxycarbonyl group, an acyloxy group, a sulfo group, a sulfonyloxy group, an amide group (such as acetamide, ethanesulfonamide, and benzamide), an alkoxy group, and an aryloxy group.

Preferred examples of $R^2$, $R^3$, and $R^4$ in Formula (I) include an alkyl group such as methyl, ethyl, and propyl; a cycloalkyl such as cyclohexyl; an alkoxy group such as methoxy, ethoxy, and butoxy; an aryl group such as phenyl; an aryloxy group such as phenoxy; an aralkyl group such as benzyl; an aralkoxy group such as benzyloxy; an alkenyl group such as allyl; an alkenoxy group such as allyloxy; an acylamino group such as acylamino and benzamide; a halogen atom such as chlorine atom and bromine atom; an alkylthio group such as ethylthio; a diacylamino group such as succinimide and hydantoinyl; an arylthio group such as phenylthio; an alkoxycarbonyl group such as methoxycarbonyl, ethoxycarbonyl, and benzyloxycarbonyl; an acyloxy group such as acetyloxy and benzoyloxy; an acyl group such as methylcarbonyl; and a sulfonamide group such as dimethylsulfonamide and diethylsulfonamide.

Examples of the bisspiro compound which is a preferred aspect of the compound represented by Formula (I) include the following compound represented by Formula (I').

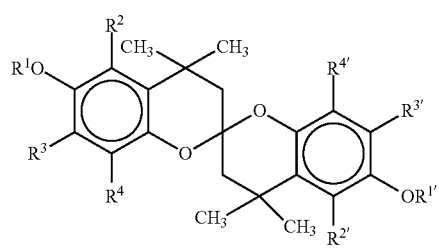

Formula (I')

$R^1$, $R^2$, $R^3$, and $R^4$ in Formula (I') have the same meaning as $R^1$, $R^2$, $R^3$, and $R^4$ in Formula (I). In addition, $R^{1'}$, $R^{2'}$, $R^{3'}$, and $R^{4'}$ in Formula (I') have the same meaning as $R^1$, $R^2$, $R^3$, and $R^4$ in Formula (I).

The total number of carbon atoms included in $R^2$, $R^3$, $R^4$, and the ring A in Formula (I) is preferably 20 or less and particularly preferably 12 or less. In addition, for general purposes, the compound represented by Formula (I) preferably has a total number of carbon atoms included in the molecule of up to approximately 30. A 5-hydroxycoumaran compound and 6-hydroxychromane compound in which one of $R^2$ and $R^3$ in Formula (I) is a hydrogen atom, and a 6,6'-dihydroxybis-2,2'-spirochromane compound included in Formula (I') are particularly useful. It is still more preferable that each of $R^2$, $R^3$, and $R^4$ in Formula (I) and $R^{2'}$, $R^{3'}$, and $R^{4'}$ in Formula (I') is an alkyl group, an alkoxy group, an aryl group, an aryloxy group, or an alkylthio group.

Specific examples of the compounds represented by Formula (I) and Formula (I') are shown below.

Formula (I)

I-1

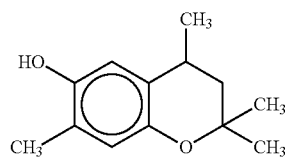

I-2

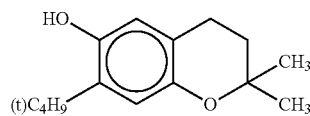

I-3

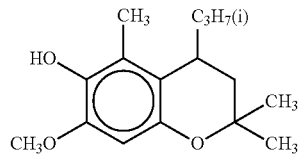

I-4

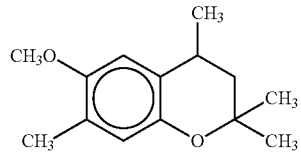

I-5

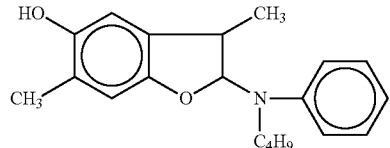

I-6

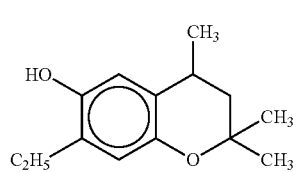

I-7

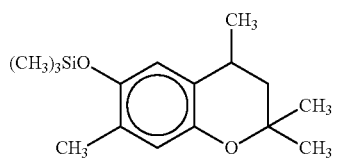

I-8

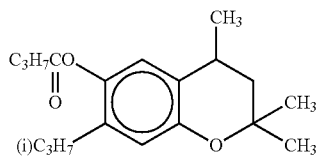

I-9

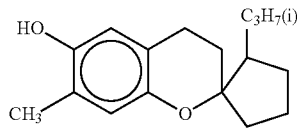

I-10

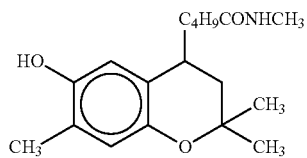

I-11

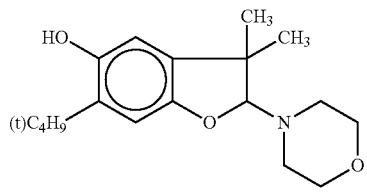

I-12

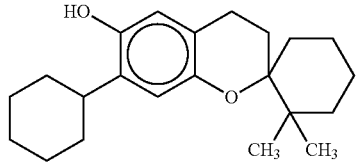

I-13

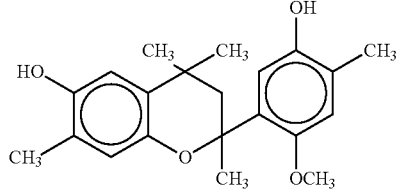

I-14

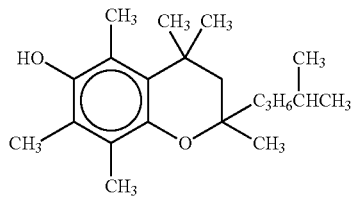

Formula (I')

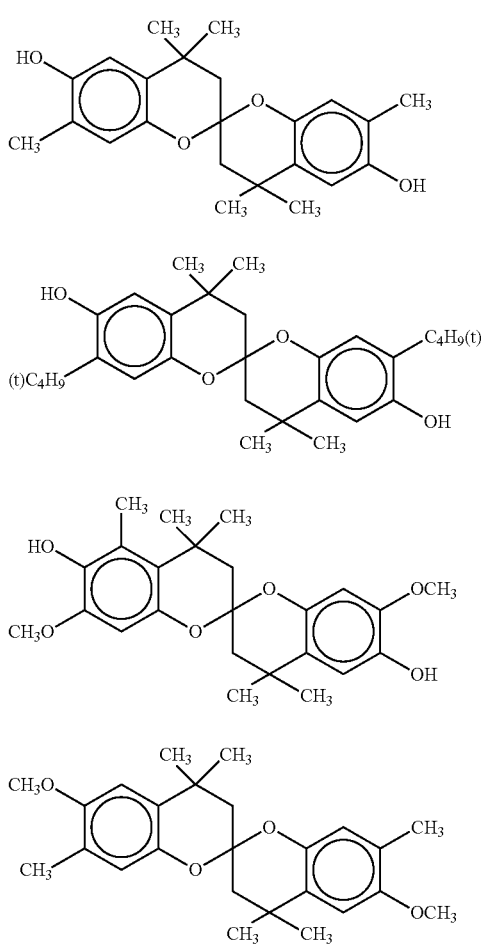

I'-1
I'-2
I'-3
I'-4
I'-5
I'-6
I'-7
I'-8

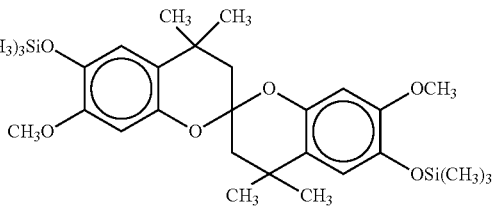

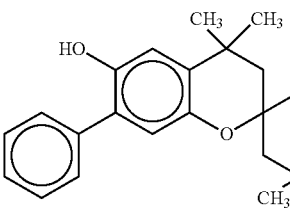

A metallocene represented by Formula (L) is also preferable as the electron-donating quencher used in the present invention.

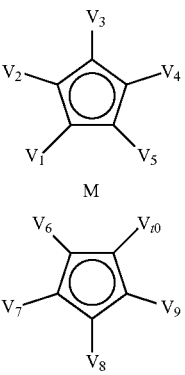

Formula (L)

In Formula (L), M represents Fe, Ti, V, Cr, Co, Ni, Ru, Os, or Pd. Each of $V_1$, $V_2$, $V_3$, $V_4$, $V_5$, $V_6$, $V_7$, $V_8$, $V_9$, and $V_{10}$ represents a hydrogen atom or a monovalent substituent. It is still more preferable that M is Fe, and such compounds are called ferrocenes.

Hereinafter, Formula (L) will be described in detail.

$V_1$, $V_2$, $V_3$, $V_4$, $V_5$, $V_6$, $V_7$, $V_8$, $V_9$, and $V_{10}$ in Formula (L) represent a hydrogen atom or a monovalent substituent. Any substituent can be used as the substituent, but preferred examples of the substituent include the following.

For example, an unsubstituted alkyl group (such as a methyl group, an ethyl group, a propyl group, an isopropyl group, a butyl group, an isobutyl group, a hexyl group, an octyl group, a dodecyl group, an octadecyl group, a cyclopentyl group, a cyclopropyl group, and a cyclohexyl group); a substituted alkyl group {in a case where a substituent is defined as V, the substituent represented by V is not particularly limited, but examples thereof include a carboxy group, a sulfo group, a cyano group, a halogen atom (such as a fluorine atom, a chlorine atom, a bromine atom, and an iodine atom), a hydroxy group, an alkoxycarbonyl group (such as a methoxycarbonyl group, an ethoxycarbonyl group, a phenoxycarbonyl group, and a benzyloxycarbonyl group), an alkoxy group (such as a methoxy group, an ethoxy group, a benzyloxy group, and a phenethyloxy group), an aryloxy group having 18 or less carbon atoms (such as a phenoxy group, a 4-methylphenoxy group, and an α-naphthoxy group), an acyloxy group (such as an acetyloxy group and a propionyloxy group), an acyl group (such as an acetyl group, a propionyl group, a benzoyl group, and a mesyl group), a carbamoyl group (such as a carbamoyl group, an N,N-dimethylcarbamoyl group, a morpholinocarbonyl group, and a piperidinocarbonyl group), a sulfamoyl group (such as a sulfamoyl group, an N,N-dimethylsulfamoyl group, a morpholinosulfonyl group, and a piperidinosulfonyl group), an aryl group (such as a phenyl group, a 4-chlorophenyl group, a 4-methylphenyl group, and an α-naphthyl group), a heterocyclic group (such as a 2-pyridyl group, a tetrahydrofurfuryl group, a morpholino group, and a 2-thiopheno group), an amino group (such as an amino group, a dimethylamino group, an anilino group, and a diphenylamino group), an alkylthio group (such as a methylthio group and an ethylthio group), an alkylsulfonyl group (such as a methylsulfonyl group and a propylsulfonyl group), an alkylsulfinyl group (such as a methylsulfinyl group), a nitro group, a phosphoric acid group, an acylamino group (such as an acetylamino group), and ammonium group (such as a trimethylammonium group and a tributylammonium group), a mercapto group, a hydracino group (such as trimethylhydrazino group), a ureido group (such as a ureido group and an N,N-dimethylureido group), an imide group, and an unsaturated hydrocarbon group (such as a vinyl group, an ethynyl group, an 1-cyclohexenyl group, a benzylidine group, and a benzylidene group); the number of carbon atoms of the substituent V is preferably 18 or less; in addition, these substituents may be further substituted with V};

an unsubstituted aryl group (such as a phenyl group and an 1-naphthyl group); a substituted aryl group (examples of a substituent include the above-described V); an unsubstituted heterocyclic group (such as a 2-pyridyl group, a 2-thiazolyl group, a morpholino group, and a 2-thiopheno group); a substituted heterocyclic group (examples of a substituent include the above-described V); or a substituent represented by the above-described V is preferably exemplified.

More specifically, an alkyl group (such as a methyl group, an ethyl group, a carboxymethyl group, a 2-carboxyethyl group, a 3-carboxypropyl group, a 4-carboxybutyl group, a sulfomethyl group, a 2-sulfoethyl group, a 3-sulfopropyl group, a 4-sulfobutyl group, a 3-sulfobutyl group, a 2-hydroxy-3-sulfopropyl group, a 2-cyanoethyl group, a 2-chloroethyl group, a 2-bromoethyl group, a 2-hydroxyethyl group, a 3-hydroxypropyl group, a hydroxymethyl group, a 2-hydroxyethyl group, a 4-hydroxybutyl group, a 2,4-dihydroxybutyl group, a 2-methoxyethyl group, a 2-ethoxyethyl group, a methoxymethyl group, a 2-ethoxycarbonylethyl group, a methoxycarbonylmethyl group, a 2-methoxyethyl group, a 2-ethoxyethyl group, a 2-phenoxyethyl group, a 2-acetyloxyethyl group, a 2-propionyloxyethyl group, a 2-acetylethyl group, a 3-benzoylpropyl group, a 2-carbamoylethyl group, a 2-morpholinocarbonylethyl group, a sulfamoylmethyl group, a 2-(N,N-dimethylsulfamoyl)ethyl group, a benzyl group, a 2-naphthylethyl group, a 2-(2-pyridyl)ethyl group, an allyl group, a 3-aminopropyl group, a dimethylaminomethyl group, a 3-dimetylaminopropyl group, a methylthiomethyl group, a 2-methylsulfonylethyl group, a methylsulfinylmethyl group, a 2-acetylaminoethyl group, an acetylaminomethyl group, a trimethylammoniummethyl group, a 2-mercaptoethyl group, a 2-trimethylhydrazinoethyl group, a methylsulfonylcarbamoylmethyl group, and a (2-methoxy)ethoxymethyl group); an aryl group (such as a phenyl group, an 1-naphthyl group, and a p-chlorophenyl group); a heterocyclic group (such as a 2-pyridyl group, a 2-thiazolyl group, and a 4-phenyl-2-thiazolyl group);

or a substituent represented by V (such as a carboxy group, a formyl group, an acetyl group, a benzoyl group, a 3-carboxypropanoyl group, a 3-hydroxypropanoyl group, a chlorine atom, an N-phenylcarbamoyl group, an N-butylcarbamoyl group, a boric acid group, a sulfo group, a cyano group, a hydroxy group, a methoxy group, a methoxycarbonyl group, an acetyloxy group, and a dimethylamino group) is preferable. In addition, two of $V_1$ to $V_{10}$ may be bonded to each other to form a ring. These rings may be either aliphatic or aromatic. In addition, these rings may be substituted, for example, with the above-described substituent V.

Typical examples of the compound represented by Formula (L) are shown below, but the compound is not limited thereto.

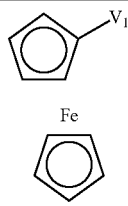

| Compound No. | $V_1$ |
| --- | --- |
| I-1 | H |
| I-2 | $CO_2H$ |
| I-3 | $(CH_2)_{11}N^+(CH_3)_3I^-$ |
| I-4 | CHO |
| I-5 | $SO_3H$ |
| I-6 | CO—〈phenyl〉 |
| I-7 | —〈phenyl〉 |
| I-8 | $B(OH)_2$ |
| I-9 | $CH_2N^+(CH_3)_3I^-$ |
| I-10 | $CH_2N(CH_3)_2$ |
| I-11 | $CO(CH_2)_2CO_2H$ |
| I-12 | $COCH_3$ |
| I-13 | CONH—〈phenyl〉 |
| I-14 | $CONH—(CH_2)_3CH_3$ |
| I-15 | $CH_2OH$ |
| I-16 | Cl |
| I-17 | $CH_2P^+$—(〈phenyl〉)$_3$ $I^-$ |
| I-18 | $CO(CH_2)_3Br$ |
| I-19 | $CO(CH_2)_3OH$ |
| I-20 | $CO(CH_2)_2OH$ |
| I-21 | $CH=N—OH$ |
| I-22 | $CH=N^+—O^-$ |
| I-23 | $CH2SO_3^-Na^+$ |

-continued
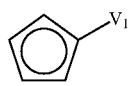
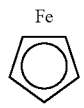
| Compound No. | V₁ |
|---|---|
| I-24 | CH₂OCH₃ |
| I-25 | CH₂NHCOCH₃ |
| I-26 | C₂H₅ |
| I-27 | CH(OH)CH₃ |
| I-28 | C(OH)(CH₃)₂ |
| I-29 | (CH₂)₄OH |
| I-30 | CH(OH)(CH₂)₂CH₂OH |
I-31
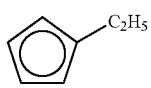
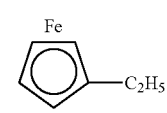
I-32
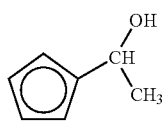
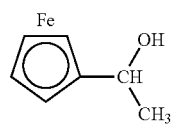
I-33
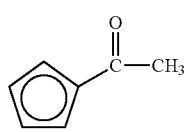
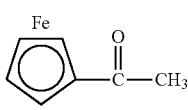
I-34
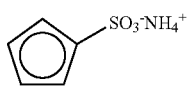
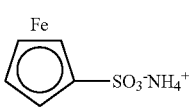
I-35
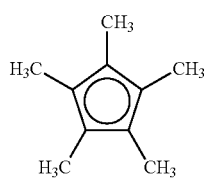
-continued
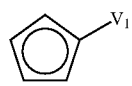
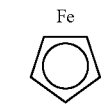
| Compound No. | V₁ |
|---|---|
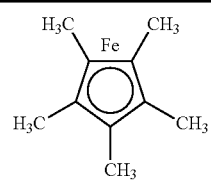
I-36
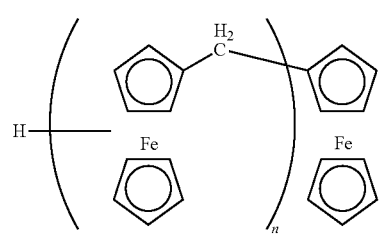
I-37      R = H
R = 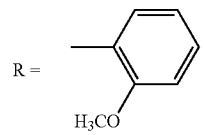
I-38
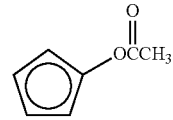
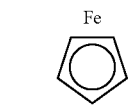
I-39
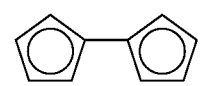
I-40
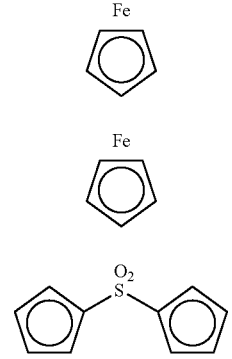

-continued
| Compound No. | V₁ |
|---|---|
| I-41 | 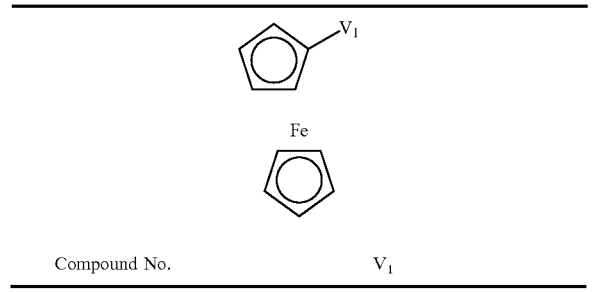 |
| I-42 | 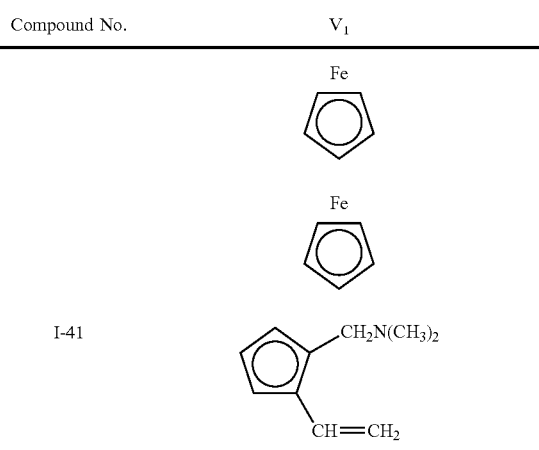 |
| I-43 | |
| I-44 | 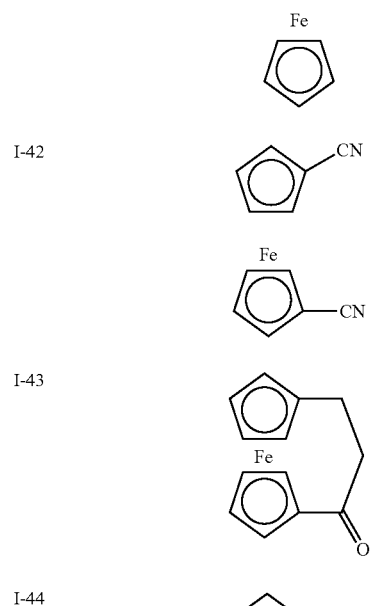 |
| I-45 | 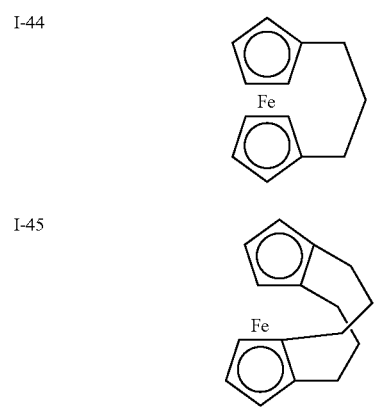 |
-continued
| Compound No. | V₁ |
|---|---|
| I-46 | 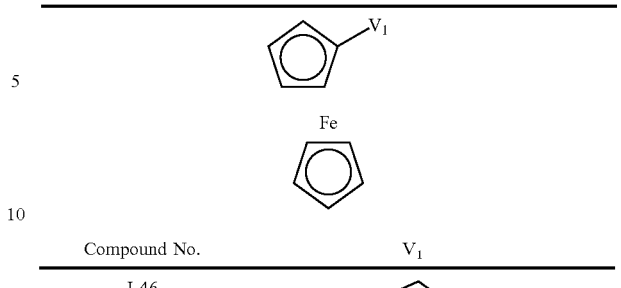 |
| I-47 | 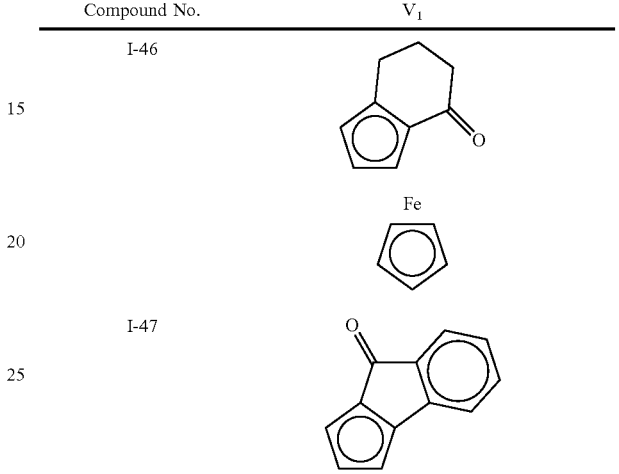 |
| I-48 | |
| I-50 | 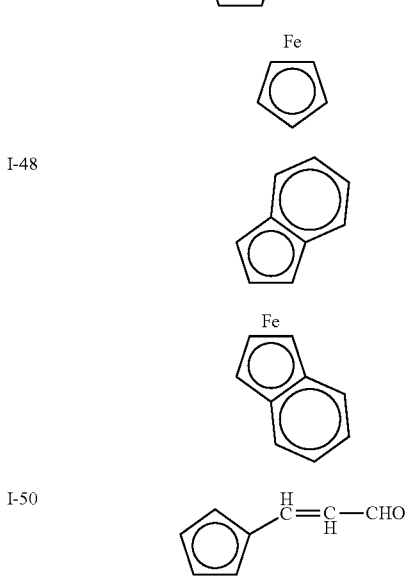 |
| I-51 | |
| I-52 |  |

-continued

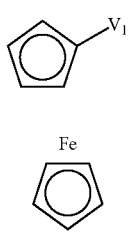

| Compound No. | $V_1$ |
|---|---|
| I-53 |  Os <br><br>  Mn |

The metallocene used in the present invention can be synthesized with reference to the method described in D. E. Bublitz et al., Organic Reactions, Vol. 17, pp. 1 to 154 (1969). As the notation of metallocene and ferrocene, the following notations are known in addition to those shown in the present invention, but all mean the same compounds.

Notation of Present Invention a)

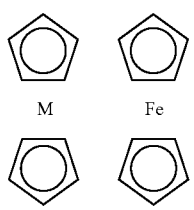

Other Notations b)

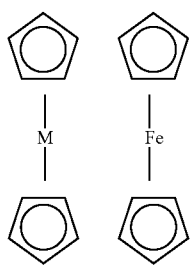

c)

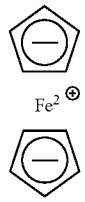

A compound represented by Formula (IA) is also preferable as the electron-donating quencher in the present invention.

Formula (IA)

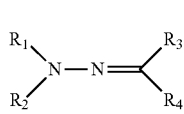

In Formula (IA), each of $R_1$, $R_2$, and $R_3$ represents an alkyl group, an aryl group, or a heterocyclic group. However, the carbon atom directly bonded to the nitrogen atom in each of $R_1$ and $R_2$ is not substituted with an oxo group, a thioxo group, or an imino group. $R_4$ is a hydrogen atom, an alkyl group, an aryl group, or a heterocyclic group.

In addition, it is preferable that the compound represented by Formula (IA) is a compound represented by Formula (IIA).

Formula (IIA)

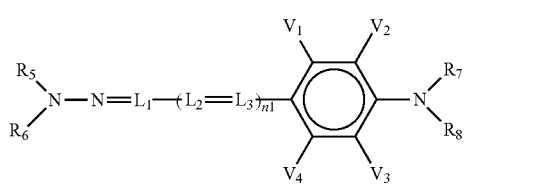

In Formula (IIA), each of $R_5$ and $R_6$ has the same meaning as $R_1$ and $R_2$ in Formula (IA). Each of $R_7$ and $R_8$ represents a hydrogen atom, an alkyl group, an aryl group, or a heterocyclic group. Each of $V_1$, $V_2$, $V_3$, and $V_4$ represents a hydrogen atom or a monovalent substituent. Each of $L_1$, $L_2$, and $L_3$ represents a methine group. n1 represents 0 or 1.

Hereinafter, Formula (IA) will be described in detail.

As $R_1$, $R_2$, and $R_3$ in Formula (IA), for example, an unsubstituted alkyl group (such as a methyl group, an ethyl group, a propyl group, an isopropyl group, a butyl group, an isobutyl group, a hexyl group, an octyl group, a dodecyl group, an octadecyl group, a cyclopentyl group, a cyclopropyl group, and a cyclohexyl group); a substituted alkyl group {in a case where a substituent is defined as Va, the substituent represented by Va is not particularly limited, but examples thereof include a carboxy group, a sulfo group, a cyano group, a halogen atom (such as a fluorine atom, a chlorine atom, a bromine atom, and an iodine atom), a hydroxy group, an alkoxycarbonyl group (such as a methoxycarbonyl group, an ethoxycarbonyl group, a phenoxycarbonyl group, and a benzyloxycarbonyl group), an alkoxy group (such as a methoxy group, an ethoxy group, a benzyloxy group, and a phenethyloxy group), an aryloxy group having 18 or less carbon atoms (such as a phenoxy group, a 4-methylphenoxy group, and an α-naphthoxy group), an acyloxy group (such as an acetyloxy group and a propionyloxy group), an acyl group (such as an acetyl group, a propionyl group, a benzoyl group, and a mesyl group), a carbamoyl group (such as a carbamoyl group, an N,N-dimethylcarbamoyl group, a morpholinocarbonyl group, and a piperidinocarbonyl group), a sulfamoyl group (such as a sulfamoyl group, an N,N-dimethylsulfamoyl group, a morpholinosulfonyl group, and a piperidinosulfonyl group), an aryl group (such as a phenyl group, a 4-chlorophenyl group, a 4-methylphenyl group, and an α-naphthyl group), a heterocyclic group (such as a 2-pyridyl group, a tetrahydrofurfuryl group, a morpholino group, and a 2-thiopheno group), an amino group (such as an amino group, a dimethylamino group, an anilino group, and a diphenylamino group), an alkylthio group (such as a methylthio group and an ethylthio group), an alkylsulfonyl group (such as a methylsulfonyl group and a propylsulfonyl group), an alkylsulfinyl group (such as a methylsulfinyl group), a nitro group, a phosphoric acid group, an acylamino group (such as an acetylamino group), and ammonium group (such as a trimethylammonium group and a tributylammonium group), a mercapto group, a hydracino group (such as trimethylhydrazino group), a ureido group (such as a ureido group and an N,N-dimethylureido group), an imide group, and an unsaturated hydrocarbon group (such as a vinyl group, an ethynyl group, an 1-cyclohexenyl group, a benzylidine group, and a benzylidene group); the number of carbon atoms of the substituent Va is preferably 18 or less; in addition, these substituents may be further substituted with Va;

more specifically, examples of the alkyl group include a carboxymethyl group, a 2-carboxyethyl group, a 3-carboxypropyl group, a 4-carboxybutyl group, a 2-sulfoethyl group, a 3-sulfopropyl group, a 4-sulfobutyl group, a 3-sulfobutyl group, a 2-hydroxy-3-sulfopropyl group, a 2-cyanoethyl group, a 2-chloroethyl group, a 2-bromoethyl group, a 2-hydroxyethyl group, a 3-hydroxypropyl group, a hydroxymethyl group, a 2-hydroxyethyl group, a 2-methoxyethyl group, a 2-ethoxyethyl group, a 2-ethoxycarbonylethyl group, a methoxycarbonylmethyl group, a 2-methoxyethyl group, a 2-ethoxyethyl group, a 2-phenoxyethyl group, a 2-acetyloxyethyl group, a 2-propionyloxyethyl group, a 2-acetylethyl group, a 3-benzoylpropyl group, a 2-carbamoylethyl group, a 2-morpholinocarbonylethyl group, a sulfamoylmethyl group, a 2-(N,N-dimethylsulfamoyl)ethyl group, a benzyl group, a 2-naphthylethyl group, a 2-(2-pyridyl)ethyl group, an allyl group, a 3-aminopropyl group, a 3-dimetylaminopropyl group, a methylthiomethyl group, a 2-methylsulfonylethyl group, a methylsulfinylmethyl group, a 2-acetylaminoethyl group, a 3-trimethylammoniumethyl group, a 2-mercaptoethyl group, a 2-trimethylhydrazinoethyl group, a methylsulfonylcarbamoylmethyl group, and a (2-methoxy)ethoxymethyl group}; an aryl group (such as a phenyl group, an α-naphthyl group, a β-naphthyl group, a phenyl group substituted with the above-described unsubstituted alkyl group or the above-described substituent Va, and a naphthyl group); or a heterocyclic group (such as a 2-pyridyl group, a 2-thiazolyl group, and a 2-pyridyl group substituted with the above-described substituent Va) is preferable.

In addition, in Formula (IA), $R_1$ and $R_2$, and $R_3$ and $R_4$ may be bonded to each other to form a ring. These rings may be substituted, for example, with the above-described substituent Va. However, the carbon atom directly bonded to the nitrogen atom in $R_1$ and $R_2$ is not substituted with an oxo group, a thioxo group, or an imino group. For example, $R_1$ and $R_2$ are not an acetyl group, a carboxy group, a benzoyl group, a formyl group, a thioacetyl group, a thioaldehyde group, a thiocarboxy group, a thiobenzoyl group, an imino group, an N-methylimino group, or an N-phenylimino group, and in a case where the two ($R_1$ and $R_2$) form a ring, $R_1$ and $R_2$ are not a malonyl group, a succinyl group, a glutaryl group, or an adipoyl group.

In Formula (IA), $R_1$ and $R_2$ are still more preferably the unsubstituted alkyl group or the substituted alkyl group described in Formula (IA). It is particularly preferable to be an unsubstituted alkyl group (such as a methyl group, an ethyl group, a propyl group, and a butyl group), or a substituted alkyl group {such as a sulfoalkyl group (for example, a 2-sulfoethyl group, a 3-sulfopropyl group, a 4-sulfobutyl group, and a 3-sulfobutyl group), a carboxyalkyl group (for example, a carboxymethyl group and a 2-carboxyethyl group), and a hydroxyalkyl group (for example, a 2-hydroxyethyl group)}.

In Formula (IA), $R_3$ is still more preferably a substituent represented by Formula (IIIA).

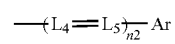

Formula (IIIA)

In Formula (IIIA), each of $L_4$ and $L_5$ is a methine group. Ar represents an aryl group. $n_2$ represents an integer of 0 or more. Ar is preferably a phenyl group or a substituted phenyl group (examples of a substituent include the above-described Va). $L_4$ and $L_5$ are preferably an unsubstituted methine group. $n_2$ is preferably 0 or 1.

In Formula (IA), as $R_4$, a hydrogen atom or the same substituent of $R_1$, $R_2$, and $R_3$ in Formula (IA) is used. $R_4$ is preferably a hydrogen atom.

The hydrazone compound represented by Formula (IA) may be isolated as a salt without any problem, in a case where it is advantageous for synthesis and storage. In such a case, any compound can be used as long as the compound can form a salt with hydrazones, but examples of a preferred salt include the following. Examples thereof include aryl sulfonates (such as p-toluene sulfonate and p-chlorbenzene sulfonate), aryl disulfonates (such as 1,3-benzene disulfonate, 1,5-naphthalene disulfonate, and 2,6-naphthalene disulfonate), thiocyanates, picrates, carboxylates (such as oxalate, acetate, benzoate, and hydrogen oxalate), halogenates (such as hydrochloride, hydrofluoride, hydrobromide, and hydroiodide), sulfate salts, perchlorate salts, tetrafluoroborate salts, sulfite salts, nitrate salts, phosphate salts, carbonate salts, and bicarbonate salts. Hydrogen oxalate, oxalate, or hydrochloride is preferable.

Hereinafter, Formula (IIA) will be described in detail.

$R_5$ and $R_6$ in Formula (IIA) have the same meaning as $R_1$ and $R_2$ in Formula (IA), and the preferred ones are also the same.

It is preferable that $R_7$ and $R_8$ in Formula (IIA) are a hydrogen atom or the examples of $R_1$ and $R_2$ in Formula (IA). $R_7$ and $R_8$ are still more preferably an unsubstituted alkyl group or a substituted alkyl group, and it is particularly preferable to be an unsubstituted alkyl group (such as a methyl group, an ethyl group, a propyl group, and a butyl group), or a substituted alkyl group {such as a sulfoalkyl group (for example, a 2-sulfoethyl group, a 3-sulfopropyl group, a 4-sulfobutyl group, and a 3-sulfobutyl group), a carboxyalkyl group (for example, a carboxymethyl group and a 2-carboxyethyl group), and a hydroxyalkyl group (for example, a 2-hydroxyethyl group)}.

In Formula (IIA), $V_1$, $V_2$, $V_3$, and $V_4$ represent a hydrogen atom or a monovalent substituent. The substituent is not particularly limited, but examples thereof include those represented by $R_1$, $R_2$, $R_3$, and Va in Formula (IA). Particularly preferred examples thereof include an unsubstituted alkyl group (such as a methyl group and an ethyl group), a substituted alkyl group (such as a 2-sulfobutyl group and 2-carboxyethyl group), and an alkoxy group (such as a methoxy group and an ethoxy group).

In Formula (IIA), $L_1$, $L_2$, and $L_3$ represent an unsubstituted methine group or a substituted methine group (examples of a substituent include those represented by $R_1$, $R_2$, $R_3$, and Va in Formula (IA)). An unsubstituted methine group is preferable. $n_1$ is preferably 0.

Typical examples of the compounds represented by Formula (IA) and Formula (IIA) are shown below, but the compound is not limited thereto.

Compound represented by Formula (IA) (the compound represented by Formula (IA) includes the compound represented by Formula (IIA); however, examples in which the compound represented by Formula (IIA) is excluded as the compound represented by Formula (IA) will be shown)

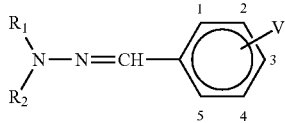

| Compound No. | $R_1$ | $R_2$ | V |
|---|---|---|---|
| IA-1 | $CH_3$ | $CH_3$ | H |
| IA-2 | $CH_3$ | $CH_3$ | 3-$OCH_3$ |
| IA-3 | $CH_3$ | $CH_3$ | 3-Cl |
| IA-4 | $(CH_2)_2SO_3Na$ | $CH_3$ | H |
| IA-5 | $(CH_2)_4SO_3Na$ | $CH_3$ | 1-$CH_3$ |
| IA-6 | $(CH_2)_3SO_3Na$ | $CH_3$ | 1-$OCH_3$ |
| IA-7 | $(CH_2)_2CO_2H$ | $(CH_2)_2CO_2H$ | 2-$OCH_3$ |
| IA-8 | $(CH_2)_2CO_2H$ | $C_2H_5$ | H |
| IA-9 | $(CH_2)_3OH$ | $CH_3$ | 3-$SCH_3$ |
| IA-10 | $(CH_2)_2CO_2C_2H_5$ | $CH_3$ | 2,4-$Cl_2$ |
| IA-11 | $(CH_2)_2CN$ | $CH_3$ | 1,5-$(CH_3)_2$ |
| IA-12 | $(CH_2)_3NHCOCH_3$ | $CH_3$ | H |
| IA-13 | $(CH_2)_2SO_3Na$ | $(CH_2)_2SO_3Na$ | H |

Compound represented by Formula (IIA)

$$R_1\text{-}N(R_2)\text{-}N=CH\text{-}C_6H_4\text{-}N(R_3)(R_4)$$

| Compound No. | $R_1$ | $R_2$ | $R_3$ | $R_4$ |
|---|---|---|---|---|
| IIA-1 | $CH_3$ | $CH_3$ | $CH_3$ | $CH_3$ |
| IIA-2 | $CH_3$ | $CH_3$ | $CH_3$ | $(CH_2)_2OH$ |
| IIA-3 | $CH_3$ | $CH_3$ | $CH_3$ | $(CH_2)_2OC_2H_5$ |
| IIA-4 | $CH_3$ | $CH_3$ | $CH_3$ | $CH_2CO_2H$ |
| IIA-5 | $CH_3$ | $CH_3$ | $CH_3$ | $(CH_2)_2N(CH_3)_3^{\oplus}I^{\ominus}$ |
| IIA-6 | $CH_3$ | $CH_3$ | $CH_2CO_2H$ | $CH_2CO_2H$ |
| IIA-7 | $CH_3$ | $CH_3$ | $CH_3$ | $(CH_2)_2SO_3Na$ |
| IIA-8 | $CH_3$ | $CH_3$ | $CH_3$ | $(CH_2)_2Cl$ |
| IIA-9 | $CH_3$ | $CH_3$ | $CH_3$ | $CH_2CN$ |
| IIA-10 | $CH_3$ | $(CH_2)_2SO_3Na$ | $CH_3$ | $CH_3$ |
| IIA-11 | $CH_3$ | $(CH_2)_2SO_3Na$ | $CH_3$ | $(CH_2)_2SO_3Na$ |
| IIA-12 | $(CH_2)_2SO_3Na$ | $(CH_2)_2SO_3Na$ | $CH_3$ | $CH_3$ |
| IIA-13 | $CH_3$ | $(CH_2)_3OH$ | $CH_3$ | $CH_3$ |
| IIA-14 | $CH_3$ | $(CH_2)_2CO_2H$ | $CH_3$ | $CH_3$ |
| IIA-15 | $CH_3$ | $(CH_2)_2CN$ | $CH_3$ | $CH_3$ |
| IIA-16 | $CH_3$ | $(CH_2)_3NHCOCH_3$ | $CH_3$ | $CH_3$ |
| IIA-17 | $CH_3$ | $(CH_2)_2CO_2C_2H_5$ | $CH_3$ | $CH_3$ |

IIA-18: dimethylhydrazone of 4-(dimethylamino)-2-methoxybenzaldehyde

IIA-19: dimethylhydrazone of 4-(diethylamino)-2-methylbenzaldehyde

IIA-20: dimethylhydrazone of 4-(diethylamino)-2,6-dimethylbenzaldehyde (with additional $CH_3$ substituent)

IIA-21: pyrrolidinyl hydrazone of 4-(dimethylamino)benzaldehyde

IIA-22: pyrrolidinyl hydrazone of 4-(dimethylamino)-2-methoxybenzaldehyde

IIA-23: pyrrolidinyl hydrazone of 4-(diethylamino)-2-methylbenzaldehyde

IIA-24: pyrrolidinyl hydrazone of 4-[N-methyl-N-(2-hydroxyethyl)amino]benzaldehyde -continued
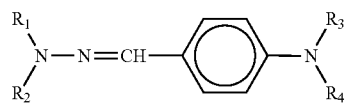
| Compound No. | $R_1$ | $R_2$ | $R_3$ | $R_4$ |
|---|---|---|---|---|
| IIA-25 | 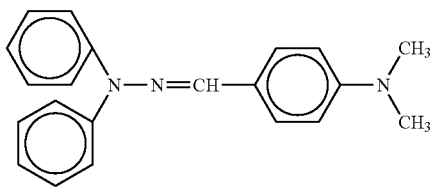 | | | |
| IIA-26 | 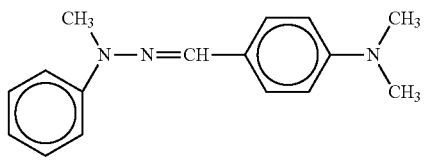 | | | |
| IIA-27 | 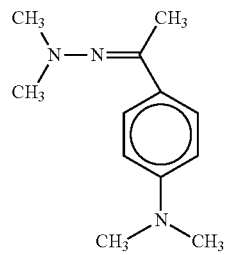 | | | |
| IIA-28 | 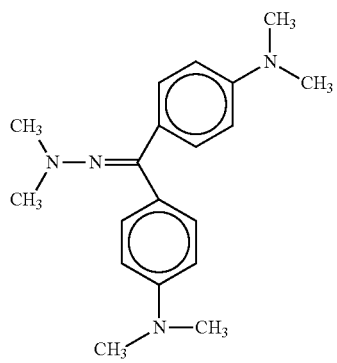 | | | |
| IIA-29 | 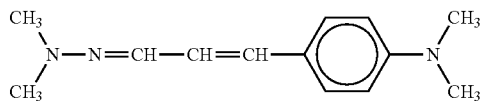 | | | |
| IIA-30 | 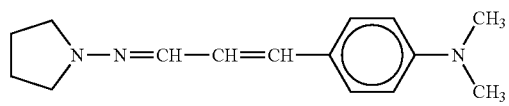 | | | |
| IIA-31 | 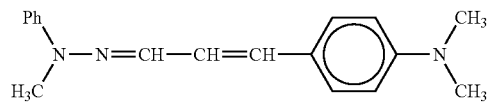 | | | |

The compound represented by Formula (IA) (including Formula (IIA)) can be easily produced by a known method. That is, the compound can be obtained by adding a small amount of an acid (for example, acetic acid and hydrochloric acid) as a condensing agent to hydrazines, and aldehydes or ketones, and then condensing the mixture. Specific methods are described in JP1985-034099A (JP-S60-034099A), JP1985-034100A (JP-560-034100A), and the like.

In addition, reductones represented by Formula (A) or Formula (B) described later are also preferable as the electron-donating quencher used in the present invention.

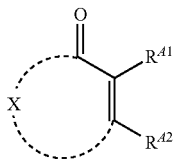

Formula (A)

In Formula (A), $R^{A1}$ and $R^{A2}$ each independently represent a hydroxy group, an amino group, an acylamino group, an alkylsulfonylamino group, an arylsulfonylamino group, an alkoxycarbonylamino group, a mercapto group, or an alkylthio group. X represents a non-metal atom group which is composed of a carbon atom and an oxygen atom, and/or a nitrogen atom and constitutes a five- or six-membered ring together with $—C(=O)—C(R^{A1})=C(R^{A2})—$.

$R^{A1}$ and $R^{A2}$ are preferably a hydroxy group, an amino group, an alkylsulfonylamino group, or an arylsulfonylamino group, more preferably a hydroxy group or an amino group, and still more preferably a hydroxy group.

In Formula (A), X has at least one —O— bond, and is preferably composed of a combination of one or two or more of $—C(R^{A3})(R^{A4})—$, $—C(R_{A5})—$, $—C(=O)—$, $—N(Ra)—$, and $N=$. Here, it is preferable that $R^{A3}$ to $R^{A5}$ and Ra are each independently a hydrogen atom; an alkyl group which has 1 to 10 carbon atoms and may have a substituent; an aryl group which has 6 to 15 carbon atoms and may have a substituent; a hydroxy group; or a carboxyl group.

In Formula (A), examples of the five- or six-membered ring formed with X include a cyclopentenone ring (2-cyclopenten-1-one ring; the formed compound is reductic acid), a furanone ring [2(5H)-furanone ring], a dihydropyranone ring [3,4-dihydro-2H-pyran-4-one ring (2,3-dihydro-4H-pyrone ring), 3,6-dihydro-2H-pyran-2-one ring, 3,6-dihydro-2H-pyran-6-one ring (5,6-dihydro-2-pyrone ring)], and a 3,4-dihydro-2H-pyrone ring. A cyclopentenone ring, a furanone ring, or a dihydropyrone ring is preferable, a furanone ring or a dihydropyrone ring is still more preferable, and a furanone ring is particularly preferable.

These rings may be fused and the fused ring may be a saturated ring or an unsaturated ring.

Among the reductones represented by Formula (A), a compound represented by Formula (A1) is preferable, and among these, a compound represented by Formula (A2) is preferable.

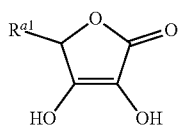

Formula (A1)

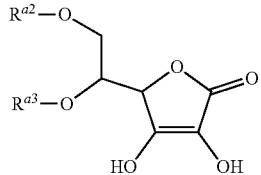

Formula (A2)

In Formula (A1), $R^{a1}$ represents a hydrogen atom, an alkyl group, an aryl group, or a heterocyclic group, which may have a substituent.

$R^{a1}$ is preferably an alkyl group which may have a substituent, and more preferably $—CH(OR^{a3})CH_2OR_{a2}$, where the compound represented by Formula (A1) is the compound represented by Formula (A2).

In Formula (A2), $R^{a2}$ and $R^{a3}$ each independently represent a hydrogen atom, an alkyl group, an acyl group, or an alkoxycarbonyl group, $R^{a2}$ and $R^{a3}$ may be bonded to each other to form a ring, the formed ring is preferably an 1,3-dioxolane ring, and the ring may further have a substituent. A compound having a dioxolane ring can be synthesized by acetalization or ketalization of ascorbic acid with aldehydes or ketones, and any ketones and aldehydes can be used as a starting material without particular limitation.

In the compound represented by Formula (A2), one particularly preferred combination of the substituents is that $R^{a2}$ is an acyl group and $R^{a3}$ is a hydrogen atom, and the acyl group may be either an aliphatic acyl group or an aromatic acyl group. In a case of an aliphatic acyl group, the number of carbon atoms is preferably 2 to 30, more preferably 4 to 24, and still more preferably 8 to 18. In a case of an aromatic acyl group, the number of carbon atoms is preferably 7 to 24, more preferably 7 to 22, and still more preferably 7 to 18. Preferred examples of the acyl group include butanoyl, hexanoyl, 2-ethylhexanoyl, decanoyl, lauroyl, myristoyl, palmitoyl, stearoyl, palmitoleyl, myristoyl, oleoyl, benzoyl, 4-methylbenzoyl, and 2-methylbenzoyl.

Same as the compound represented by Formula (A), a compound represented by Formula (B) is also preferable.

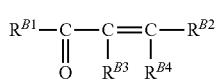

Formula (B)

In Formula (B), $R^{B1}$ and $R^{B2}$ each independently represent a hydrogen atom, an alkyl group, an alkenyl group, a cycloalkyl group, an aryl group, an acyl group, a carboxy group, an amino group, an alkoxy group, an alkoxycarbonyl group, or a heterocyclic group, and $R^{B3}$ and $R^{B4}$ each independently represent a hydroxy group, an amino group, an acylamino group, an alkylsulfonylamino group, an arylsulfonylamino group, an alkoxycarbonylamino group, or a mercapto group.

The alkyl group in $R^{B1}$ and $R^{B2}$ preferably has 1 to 10 carbon atoms. The alkyl group is preferably methyl, ethyl, or t-butyl.

The alkenyl group in $R^{B1}$ and $R^{B2}$ preferably has 2 to 10 carbon atoms. The alkenyl group is preferably vinyl or allyl, and more preferably vinyl.

The cycloalkyl group in $R^{B1}$ and $R^{B2}$ preferably has 3 to 10 carbon atoms. The cycloalkyl group is preferably cyclopropyl, cyclopentyl, or cyclohexyl.

These alkyl group, alkenyl group, and cycloalkyl group may have a substituent, and the substituent is preferably at least one selected from a hydroxy group, a carboxyl group, and a sulfo group.

In a case where the alkenyl group is vinyl, a vinyl group substituted with a carboxyl group is also preferable.

The aryl group in $R^{B1}$ and $R^{B2}$ preferably has 6 to 12 carbon atoms. The aryl group may have a substituent, and the substituent is preferably at least one selected from an alkyl group, a hydroxy group, a carboxyl group, a sulfo group, a halogen atom, a nitro group, and a cyano group.

The acyl group in $R^{B1}$ and $R^{B2}$ is preferably formyl, acetyl, isobutyryl, or benzoyl.

The amino group in $R^{B1}$ and $R^{B2}$ includes an amino group, an alkylamino group, an arylamino group, and is preferably amino, methylamino, dimethylamino, ethylamino, diethylamino, dipropylamino, phenylamino, or N-methyl-N-phenylamino.

The alkoxy group in $R^{B1}$ and $R^{B2}$ preferably has 1 to 10 carbon atoms. The alkoxy group is preferably methoxy or ethoxy.

The alkoxycarbonyl group in $R^{B1}$ and $R^{B2}$ is preferably methoxycarbonyl.

In the heterocyclic group in $R^{B1}$ and $R^{B2}$, the ring-constituting hetero atom is preferably an oxygen atom, a sulfur atom, or a nitrogen atom, and the ring structure is preferably a five-membered ring or a six-membered ring. The heterocyclic group may be an aromatic heterocyclic group or a saturated heterocyclic group, and may be fused.

The hetero ring in the heterocyclic group is preferably a pyridine ring, a pyrimidine ring, a pyrrole ring, a furan ring, a thiophene ring, a pyrazole ring, a piperidine ring, a piperazine ring, or a morpholine ring.

$R^{B1}$ and $R^{B2}$ are more preferably an alkyl group having 1 to 6 carbon atoms or an aryl group having 6 to 12 carbon atoms.

The amino group in $R^{B3}$ and $R^{B4}$ includes an amino group, an alkylamino group, an arylamino group, and is preferably an amino group, or an alkylamino group such as methylamino, ethylamino, n-butylamino, and hydroxyethylamino.

The acylamino group in $R^{B3}$ and $R^{B4}$ is preferably acetylamino or benzoylamino.

The alkylsulfonylamino group in $R^{B3}$ and $R^{B4}$ is preferably methylsulfonylamino.

The arylsulfonylamino group in $R^{B3}$ and $R^{B4}$ is preferably benzenesulfonylamino or p-toluenesulfonylamino.

The alkoxycarbonylamino group in $R^{B3}$ and $R^{B4}$ is preferably methoxycarbonylamino.

$R^{B3}$ and $R^{B4}$ are more preferably a hydroxy group, an amino group, an alkylsulfonylamino group, or an arylsulfonylamino group.

The electron-donating quencher used in the present invention is more preferably reductones, and specific examples thereof include compounds exemplified in paragraphs 0014 to 0034 of JP1994-027599A (JP-H06-027599A), compounds exemplified in paragraphs 0012 to 0020 of JP1994-110163A (JP-H06-110163A), and compounds exemplified in paragraphs 0022 to 0031 of JP1996-114899A (JP-H08-114899A).

Among these, myristic acid ester, palmitic acid, and stearic acid of L-ascorbic acid are particularly preferable.

Hydroquinones, aminophenols, aminonaphthols, 3-pyrazolidinones, saccharins and precursors thereof, or picoliniums are also preferable as the electron-donating quencher used in the present invention. Examples thereof are shown below.

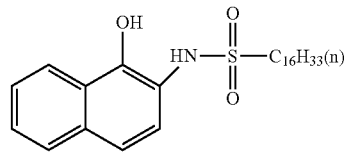
S-1

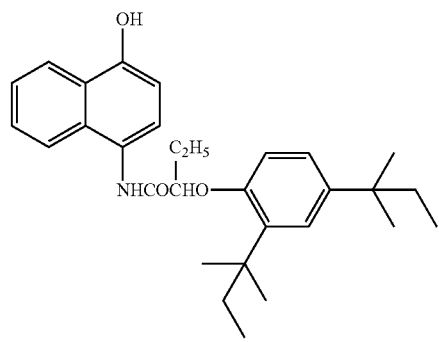
S-2

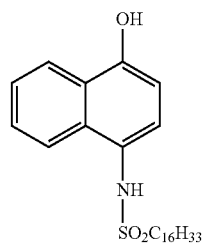
S-3

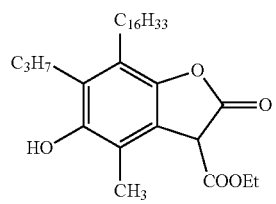
S-4

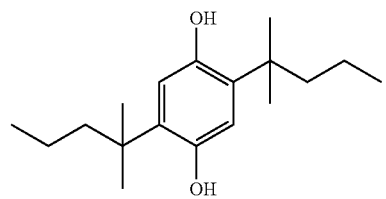
S-5

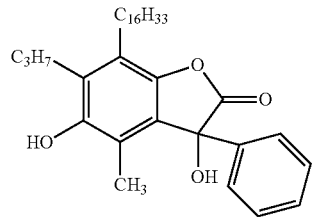
S-6

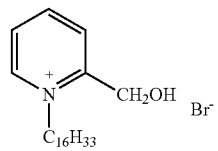
S-7

-continued

S-8

S-9

S-10

S-11

S-12

S-13

-continued

S-14

S-15

S-16

S-17

S-18

S-19

S-20

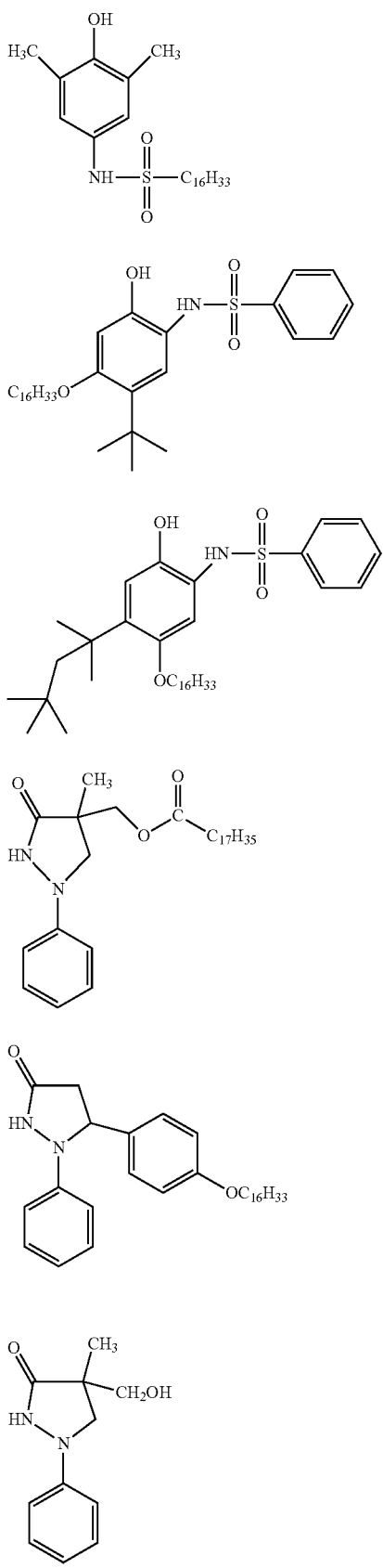
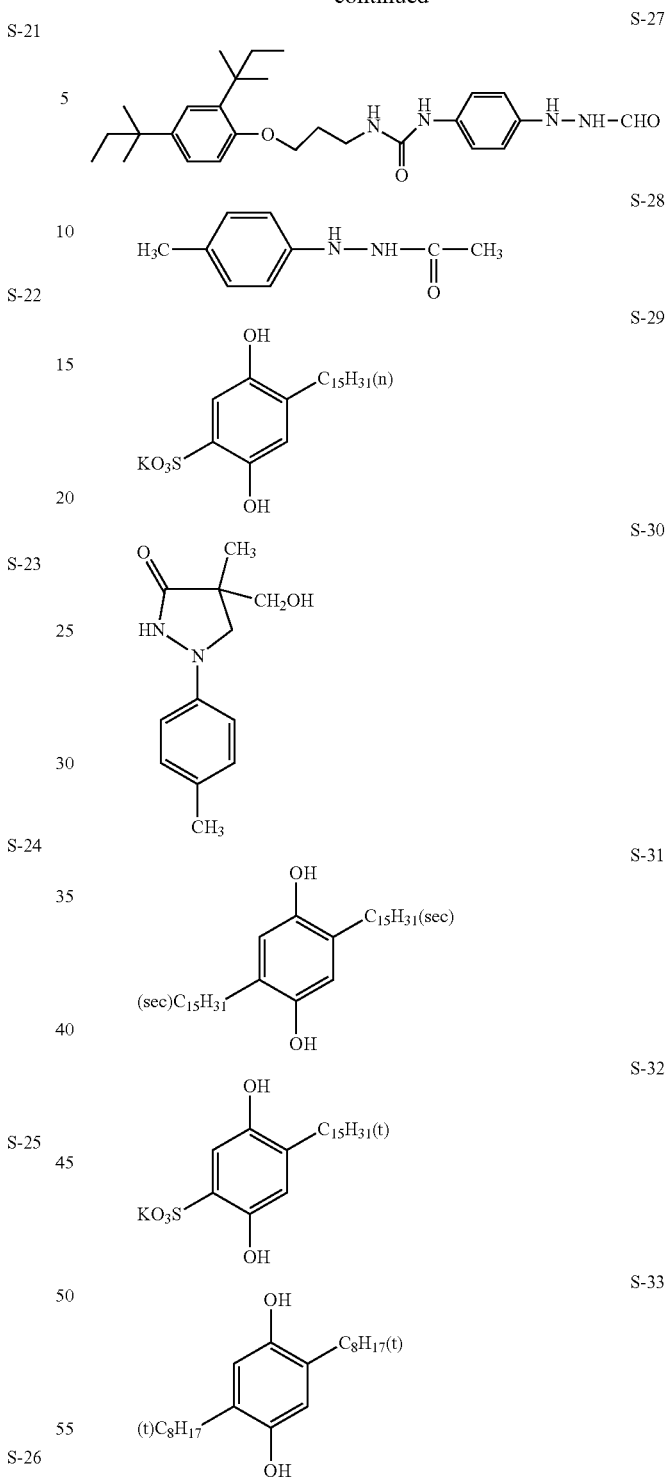

—Electron-Accepting Quencher—

Next, the electron-accepting quencher used in the present invention will be described.

The electron-accepting quencher used in the present invention is a quencher which deactivates the colorant in the excited state to the ground state by accepting an electron from SOMO of the higher energy level among two SOMO's of the colorant in the excited state and then by donating an electron to SOMO of the lower energy level in the colorant.

It is preferable that the energy level of LUMO of the electron-accepting quencher used in the present invention satisfies Relational expression [B-1] with regard to the energy level of LUMO of the colorant used in the present invention.

$$E_{Ld} - E_{Lq} \leq 0 \text{ eV} \qquad \text{Relational expression [B-1]:}$$

Here, each of $E_{Ld}$ and $E_{Lq}$ represents the following values.
$E_{Ld}$: energy level of LUMO of colorant
$E_{Lq}$: energy level of LUMO of electron-accepting quencher By satisfying Relational expression [B-1], electron transfer from the colorant in the excited state to the electron-accepting quencher easily occurs, and quenching can be performed efficiently.

It is more preferable that the energy level of LUMO of the electron-accepting quencher in the present invention satisfies Relational expression [B-2] with regard to the energy level of LUMO of the colorant used in the present invention, and it is still more preferable to satisfy Relational expression [B-3].

$$E_{Ld} - E_{Lq} \leq -0.2 \text{ eV} \qquad \text{Relational expression [B-2]:}$$

$$E_{Ld} - E_{Lq} \leq -0.4 \text{ eV} \qquad \text{Relational expression [B-3]:}$$

The energy levels of the colorant and the quencher can be calculated by the same method as described in the description of the electron-donating quencher.

A phthalimide-based compound represented by Formula (E) can be preferably used as the electron-accepting quencher used in the present invention.

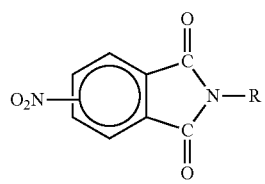

Formula (E)

In Formula (E), R represents a monovalent organic group having 1 to 14 carbon atoms and selected from the group consisting of an alkyl group, an aromatic hydrocarbon group, and an aromatic hydrocarbon group substituted with a halogen atom, a nitro group, and/or an alkyl group.

Specific examples of the compound represented by Formula (E) are shown below.

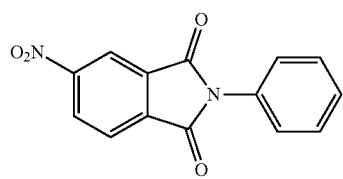

E-1

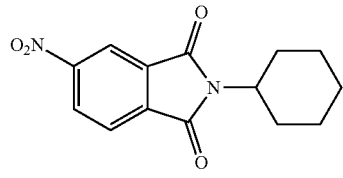

E-2

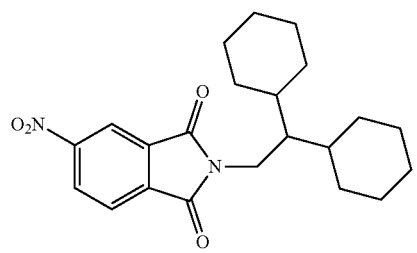

E-3

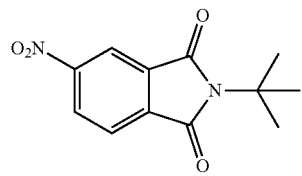

E-4

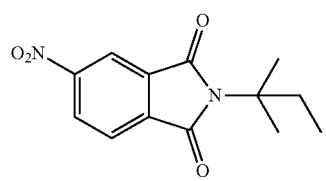

E-5

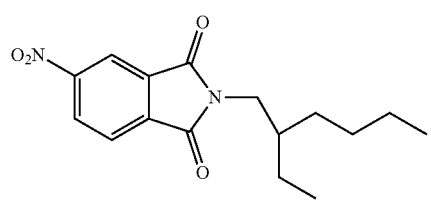

E-6

Naphthalimides having the following structure can also be preferably used as the electron-accepting quencher used in the present invention.

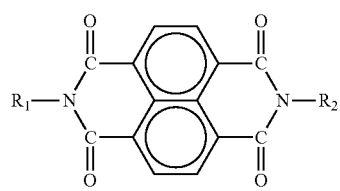

Formula (IB)

In Formula (IB), $R_1$ and $R_2$ represent an alkyl group having 20 or less carbon atoms, a substituted alkyl group, or an aryl group with or without a substituent, and may be the same as or different from each other. Examples of the substituted alkyl group include a hydroxyethyl group and a benzyl group. Examples of the aryl group include a phenyl group and a naphthyl group, and examples of the substituent include a halogen, a lower alkyl group, a nitro group, and an amino group.

Phthalimides having the following structure can also be preferably used as the electron-accepting quencher used in the present invention.

Formula (IIB)

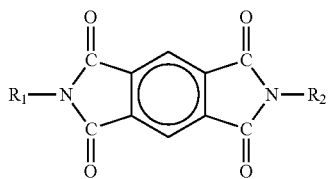

In Formula (IIB), $R_1$ and $R_2$ represent an alkyl group (including a cycloalkyl group) having 20 or less carbon atoms, a substituted alkyl group, or an aryl group with or without a substituent, and may be the same as or different from each other. Examples of the substituted alkyl group include a hydroxyethyl group and a benzyl group. Examples of the aryl group include a phenyl group and a naphthyl group, and examples of the substituent include a halogen, a (lower) alkyl group, a nitro group, and an amino group.

Specific examples thereof are shown below.

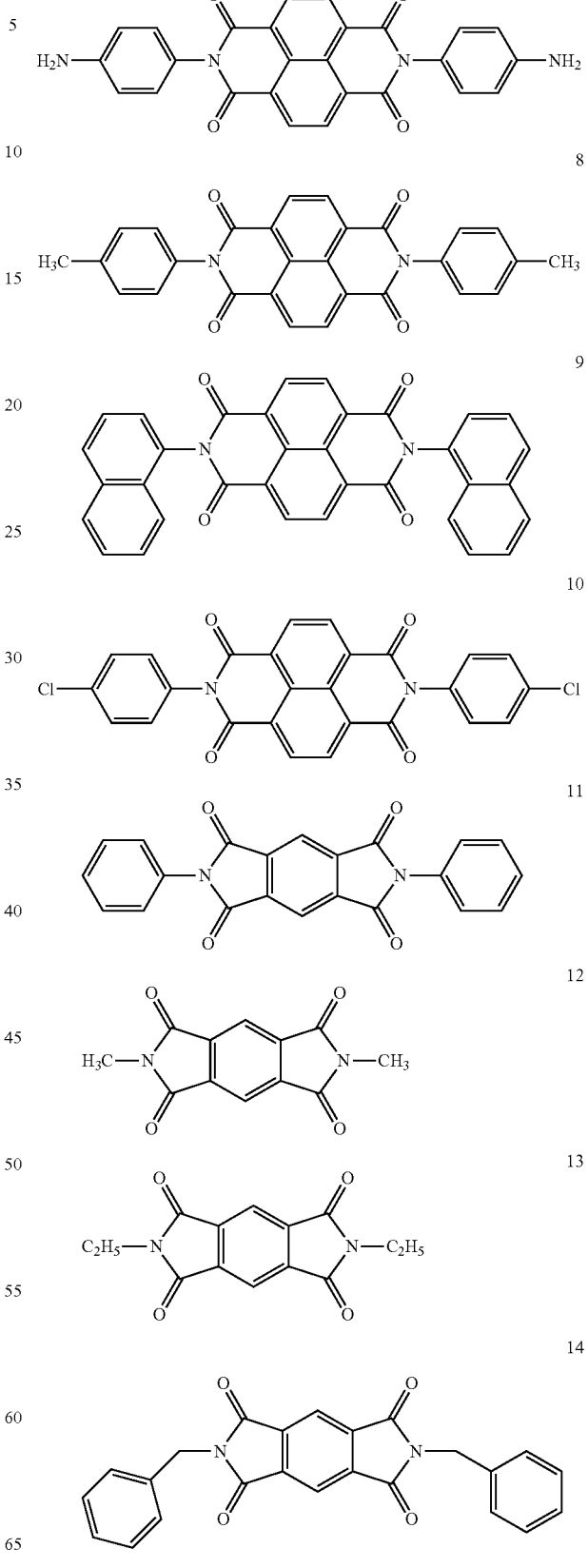

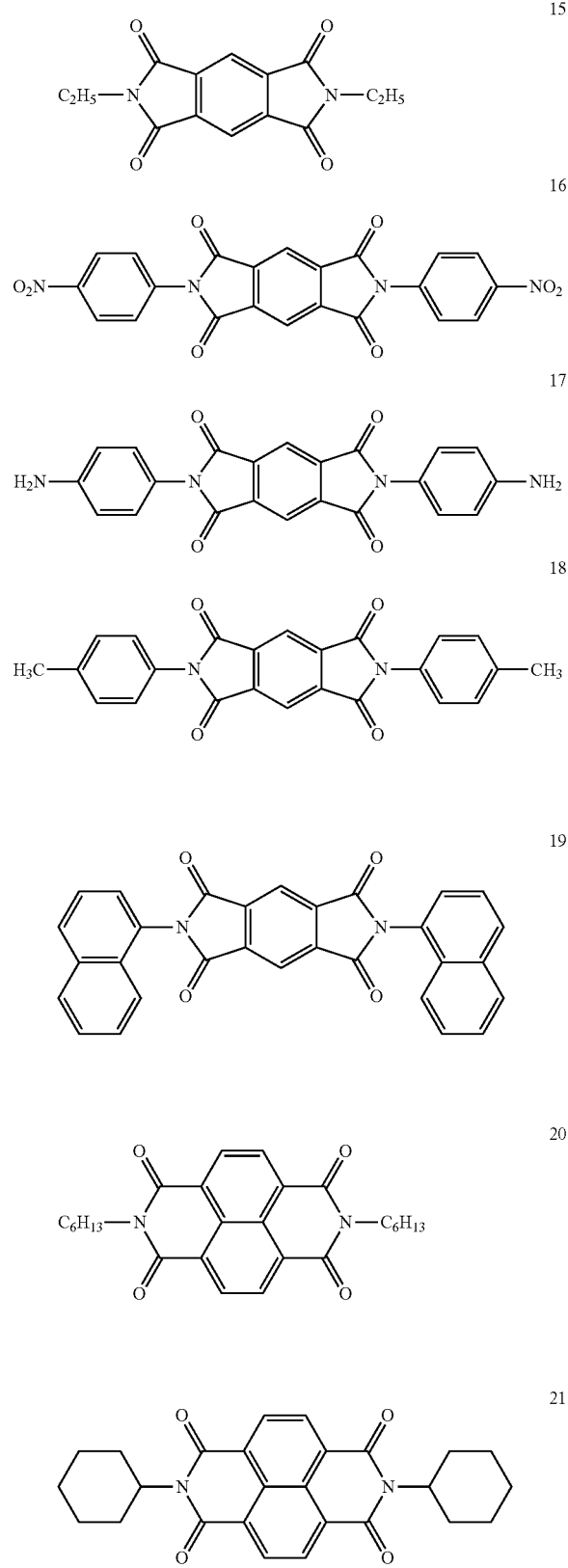

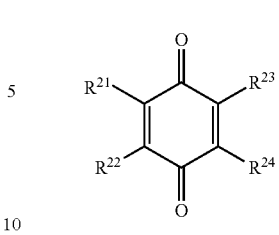

Formula (IIC)

In Formula (IIC), each of $R^{21}$, $R^{22}$, $R^{23}$, and $R^{24}$ represents a hydrogen atom, a substituted or unsubstituted alkyl group having 1 to 10 carbon atoms, a substituted or unsubstituted alkoxy group having 1 to 10 carbon atoms, a substituted or unsubstituted alkylthio group having 1 to 10 carbon atoms, a substituted or unsubstituted aryl group, a substituted or unsubstituted arylthio group, a substituted or unsubstituted aryloxy group, a halogen atom, or a cyano group. In addition, $R^{21}$ and $R^{22}$, or $R^{23}$ and $R^{24}$ may be linked to each other to form a ring.

Specific examples thereof are shown below.

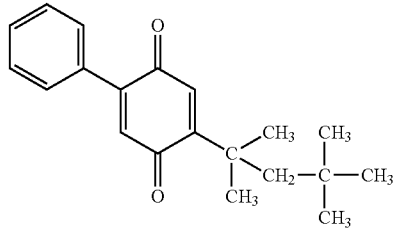

IIC-1

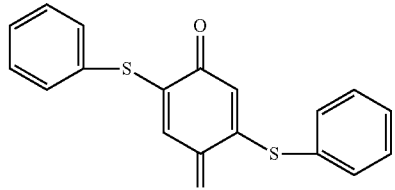

IIC-2

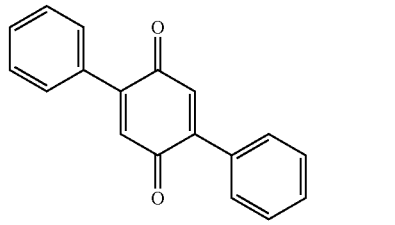

IIC-3

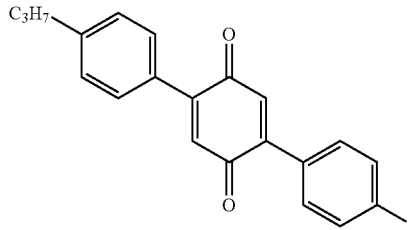

IIC-4

Quinones represented by Formula (IIC) can also be preferably used as the electron-accepting quencher used in the present invention.

IIC-5 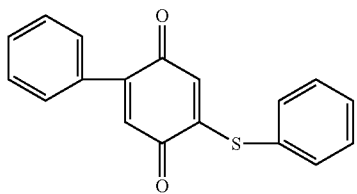

IIC-6 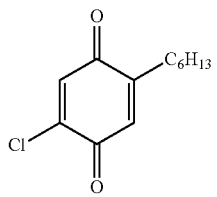

IIC-7 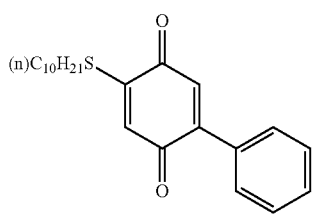

IIC-8 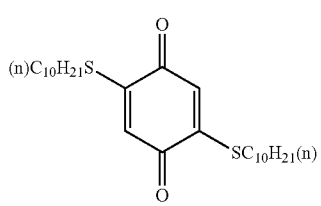

IIC-9 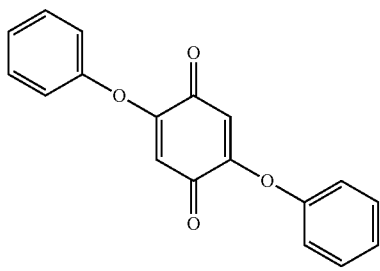

IIC-10 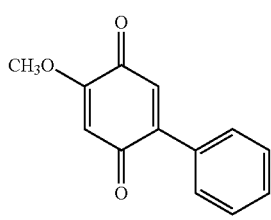

IIC-11 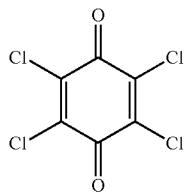

IIC-12 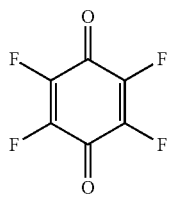

The content of the polarization-improving agent in the colorant filter according to the embodiment of the present invention is preferably 0% to 6% by mass, more preferably 0.1% to 5% by mass, and still more preferably 0.3% to 4.5% by mass. By controlling the addition amount of the polarization-improving agent to the above-described upper limit value or less, the degree of polarization can be improved without causing side effects such as discoloration of the colorant filter.

(Colorant with Built-in Polarization-Improving Agent)

The polarization-improving agent used in the present invention is also preferably linked to the colorant by a covalent bond through a linking group, as necessary, to form a colorant with a built-in polarization-improving agent. A colorant having such a form is also included in the squarine-based colorant of Formula (1) defined in the present invention.

The energy levels of a colorant portion and a polarization-improving agent portion in the colorant with a built-in polarization-improving agent of the present invention can be calculated by the same method as the above-described calculation method of the energy levels of the colorant and the polarization-improving agent. In the measurement of the potential, two oxidation potentials are detected from the colorant with a built-in polarization-improving agent used in the present invention, but a value close to the oxidation potential of the colorant having no built-in polarization-improving agent is defined as the oxidation potential of the colorant portion, and a value far therefrom is defined as the oxidation potential of the polarization-improving agent portion.

Examples of the colorant with a built-in polarization-improving agent used in the present invention are shown below.

AA-1

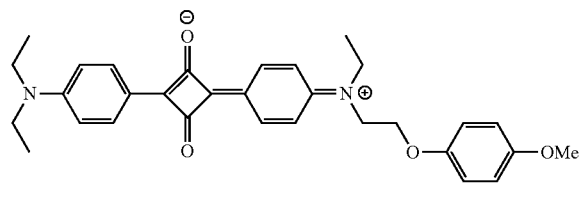

AA-2

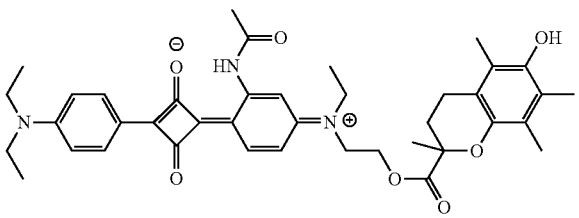

-continued
AA-3
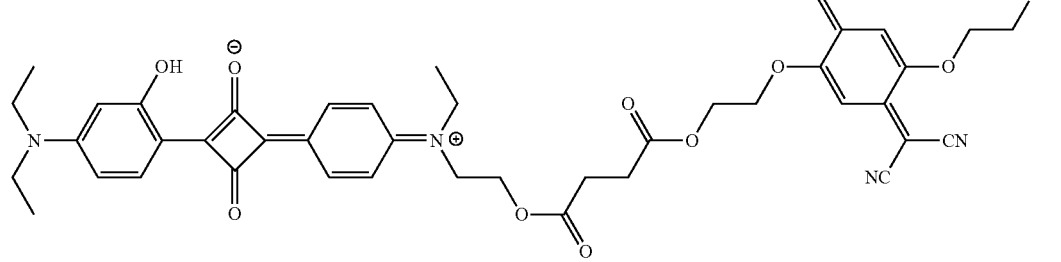
AA-4
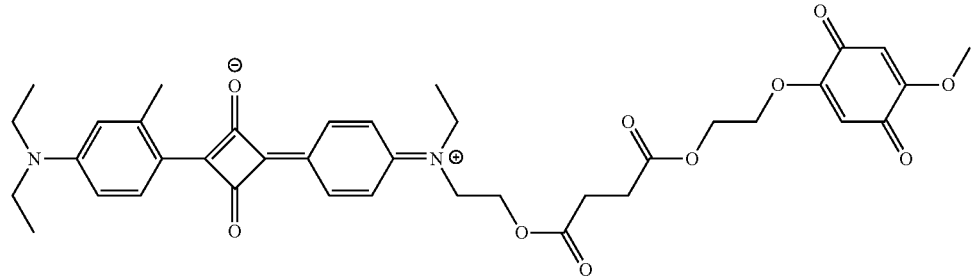
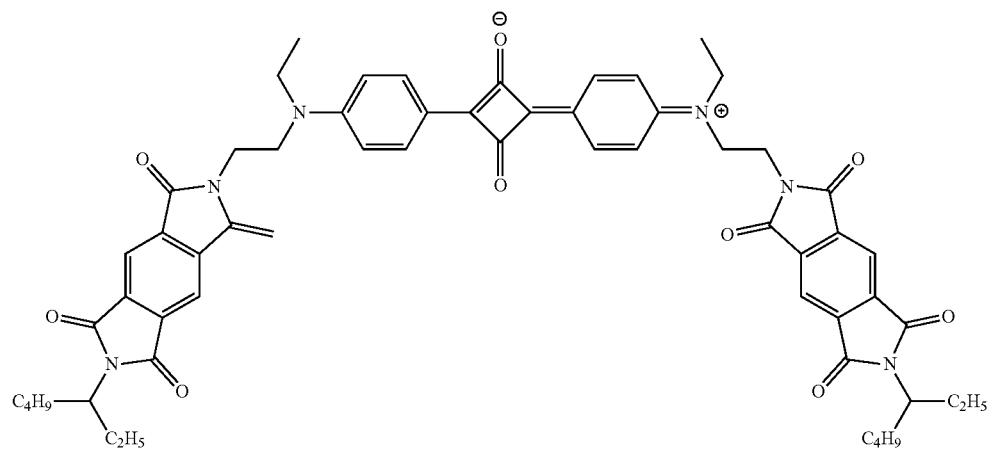
AA-6
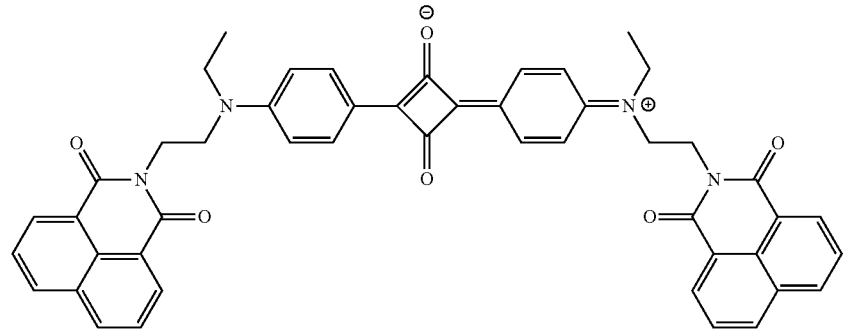
AA-7
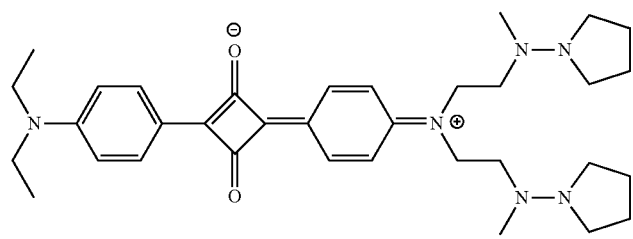

-continued
AA-8
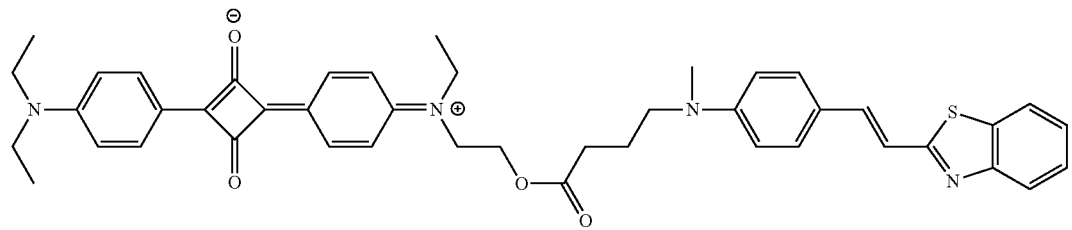
AA-9
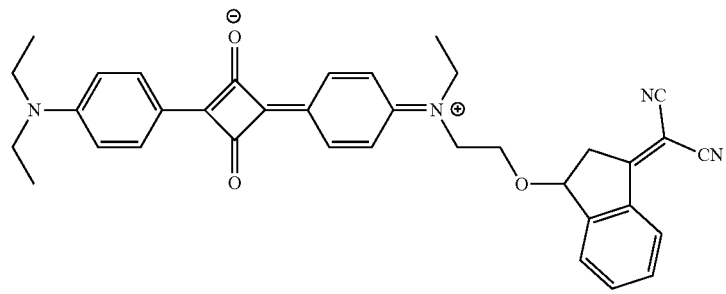
A-10
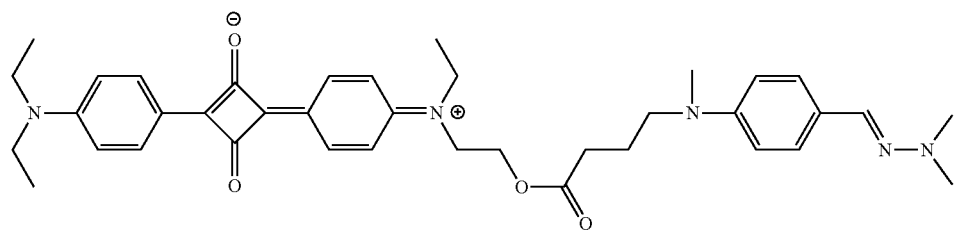
A-11
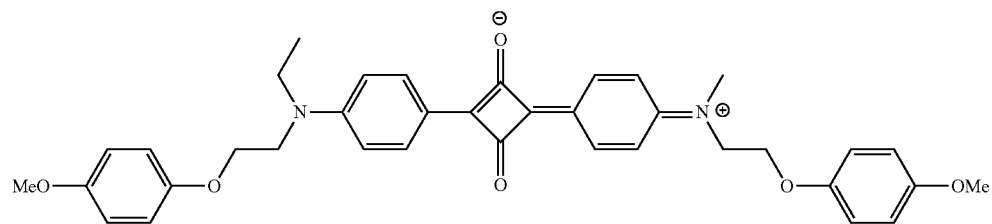
AA-12
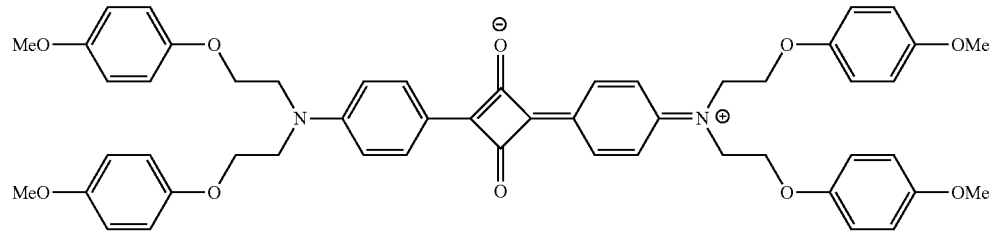
AA-13
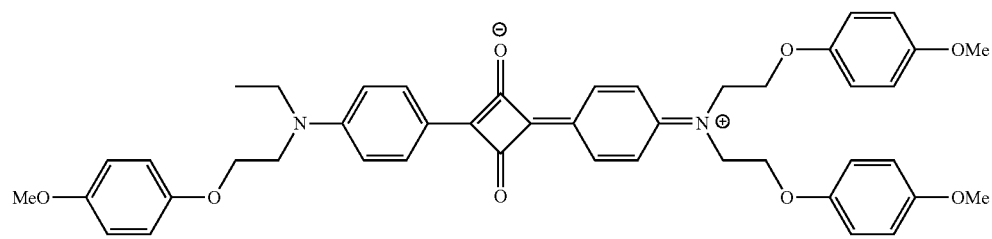

-continued
AA-14
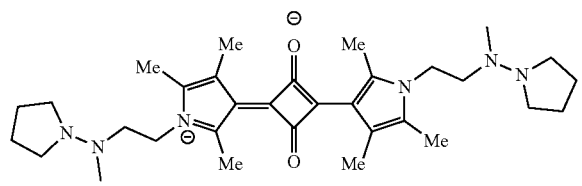
AA-15
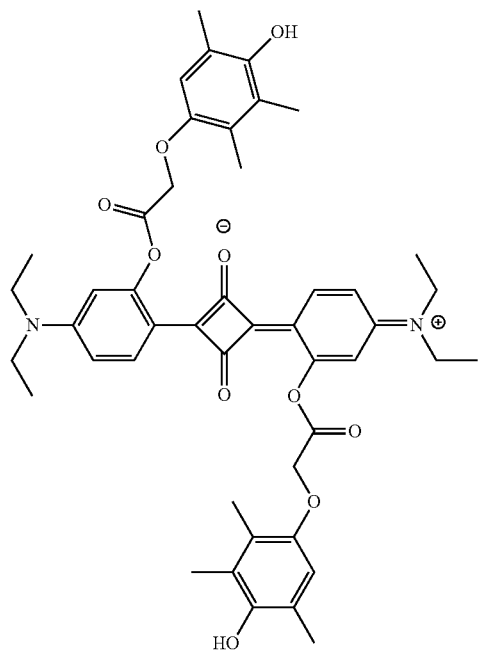
AA-16
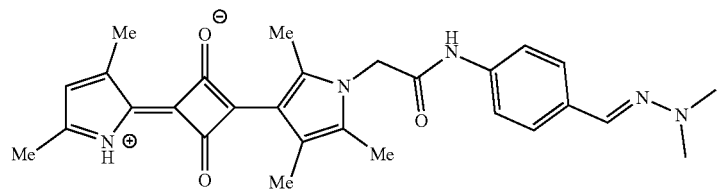
AA-17
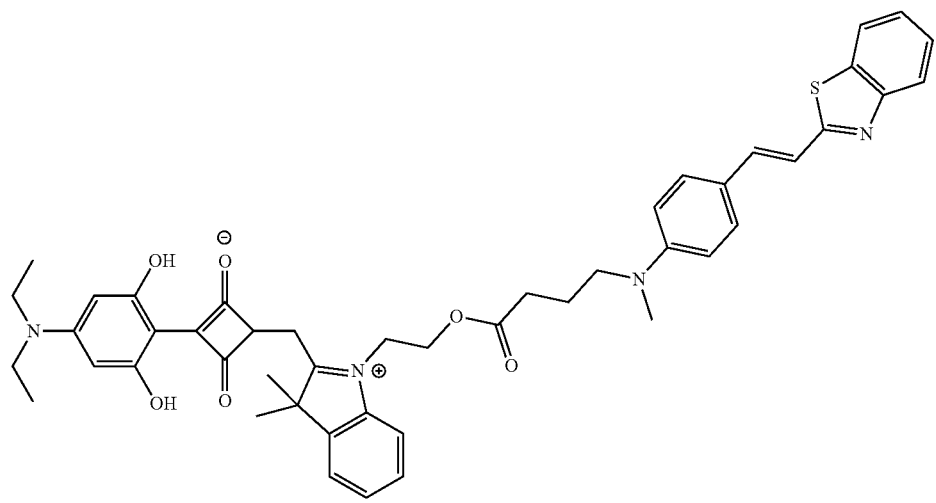

-continued
AA-18
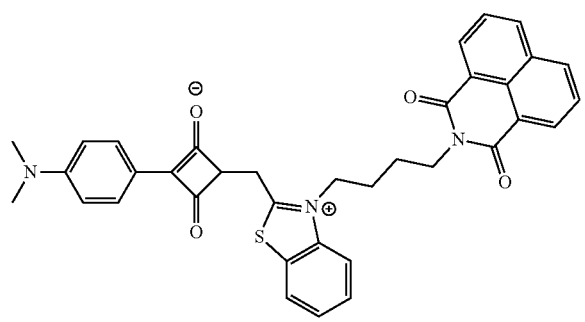
AA-19
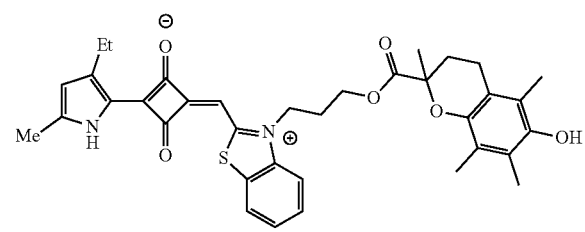
BB-1
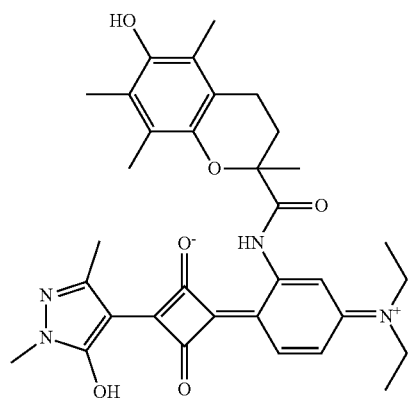
BB-2
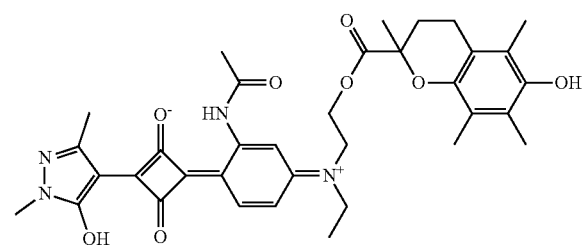
BB-3
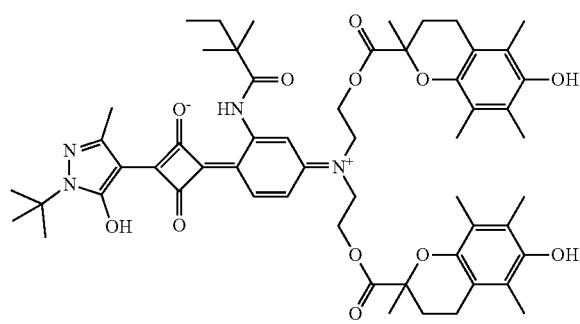
BB-4
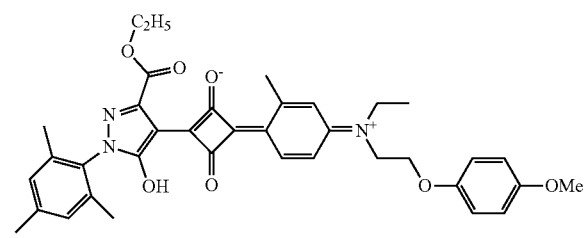
BB-5
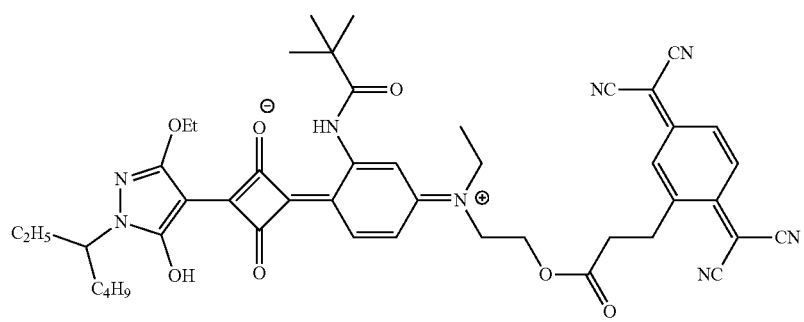

-continued
BB-6
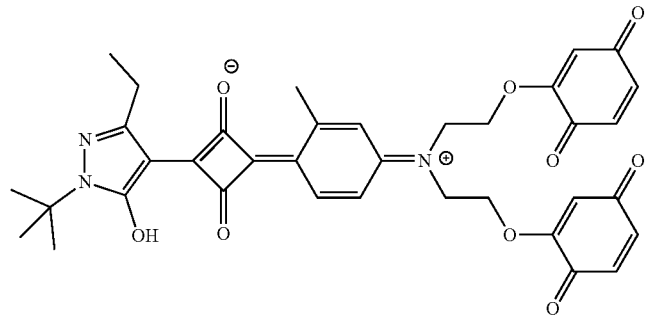
BB-7
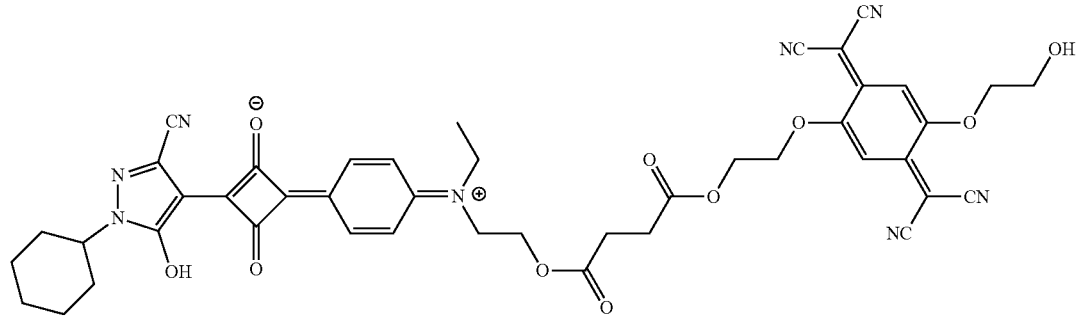
BB-8
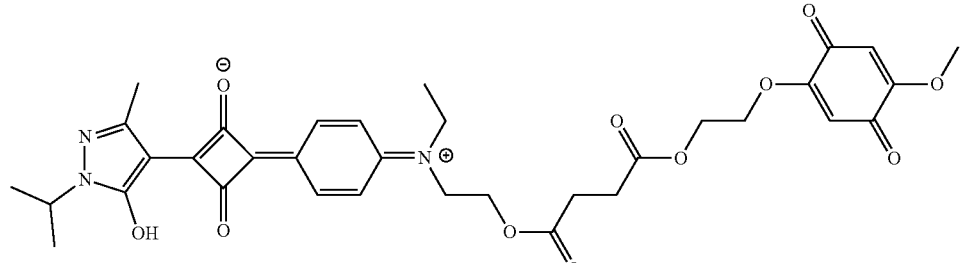
BB-9
BB-10
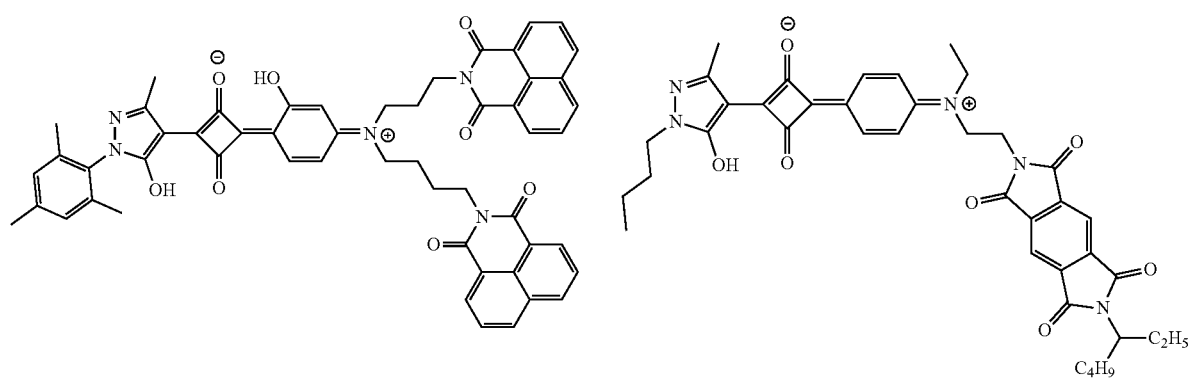
BB-11
BB-12
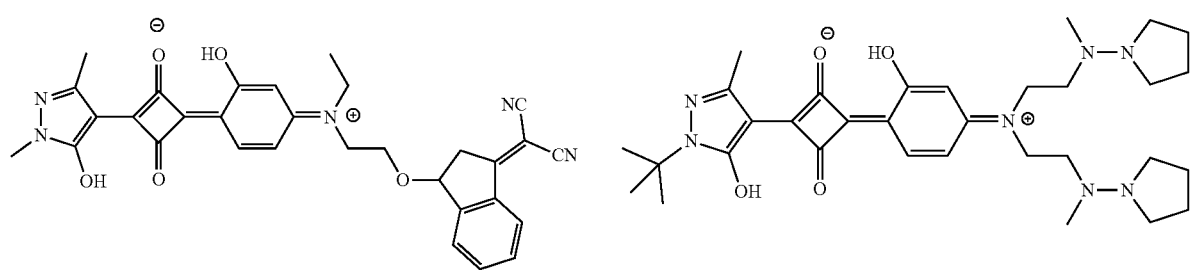

-continued
BB-13
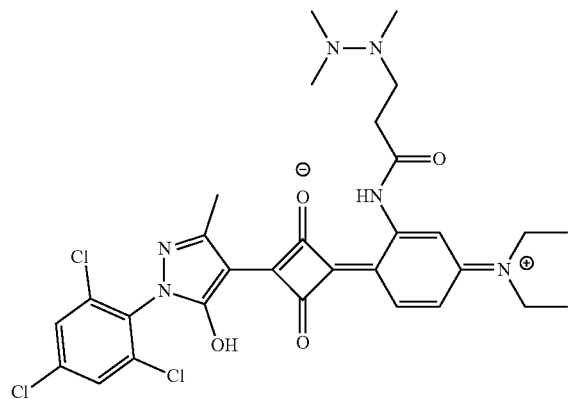
BB-14
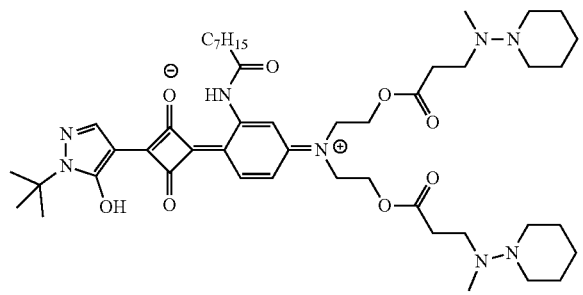
BB-15
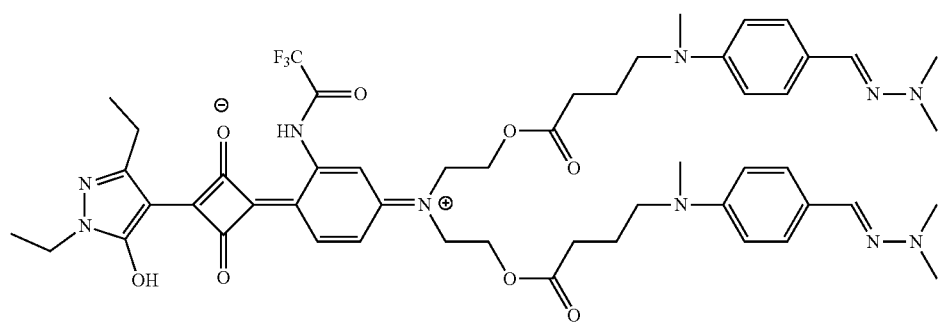
BB-16
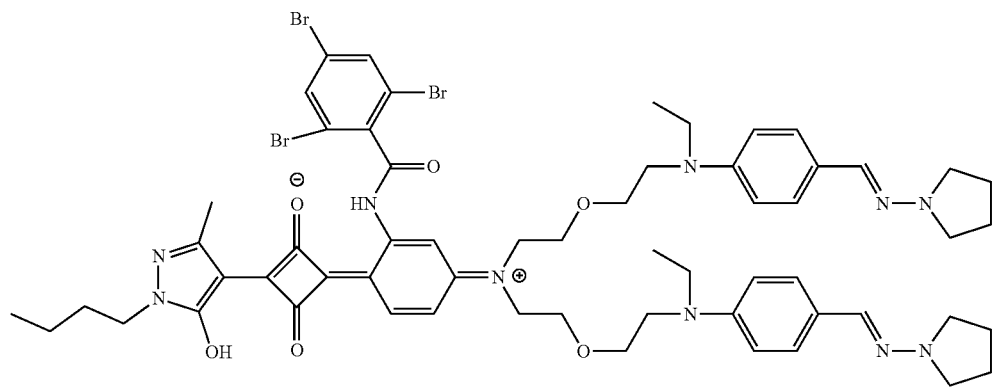
BB-17
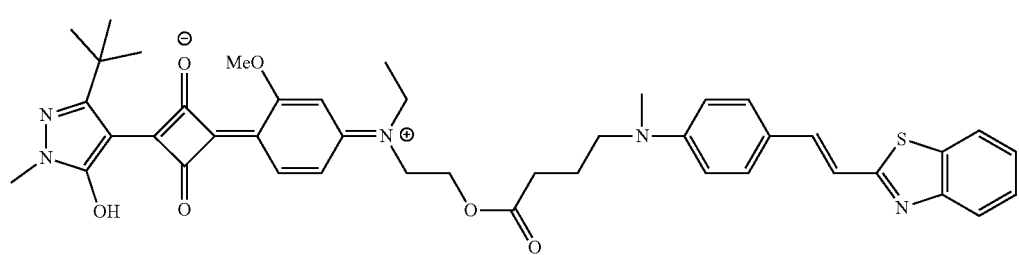

-continued
BB-18
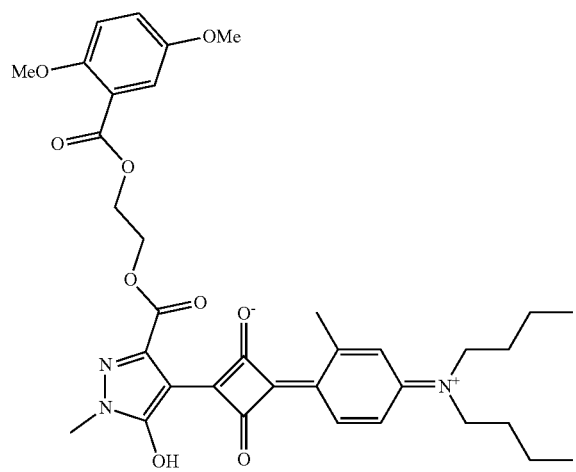
BB-19
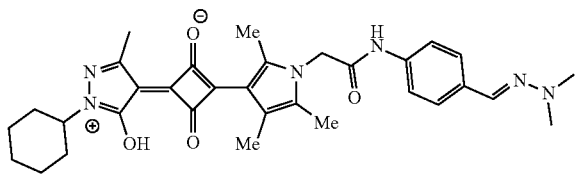
BB-20
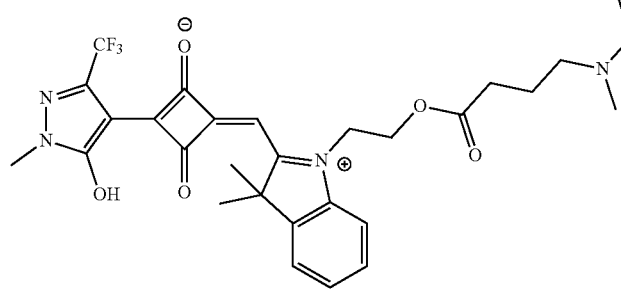
BB-21
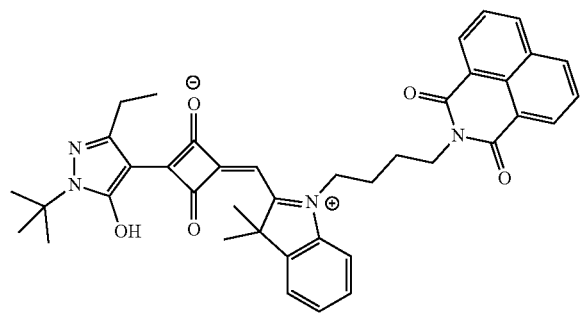
BB-22
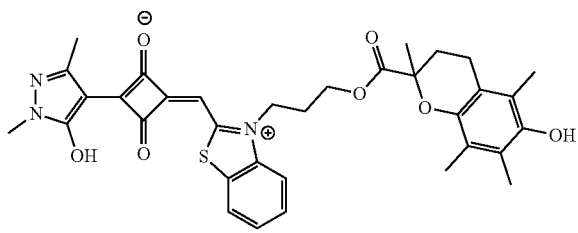
BB-23
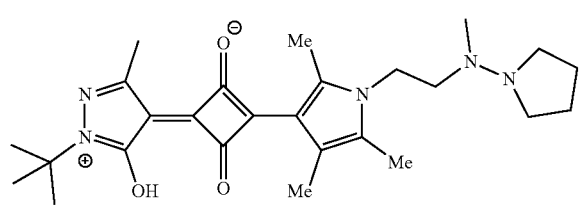

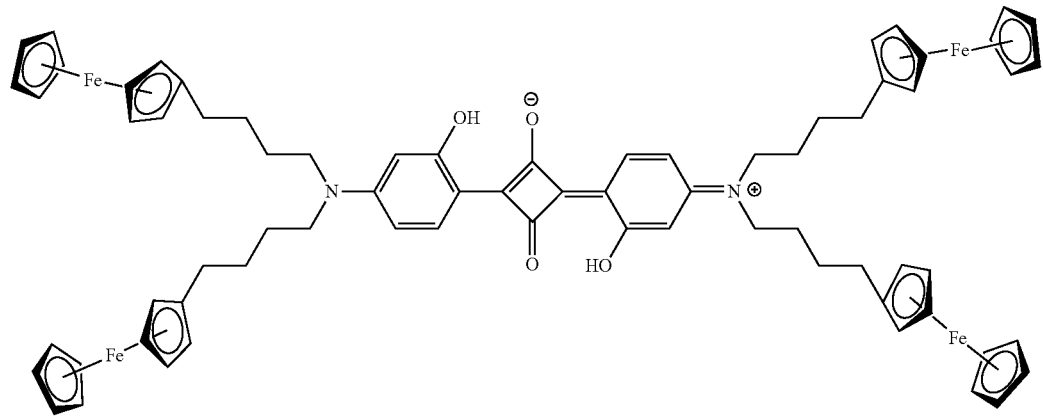
C-1
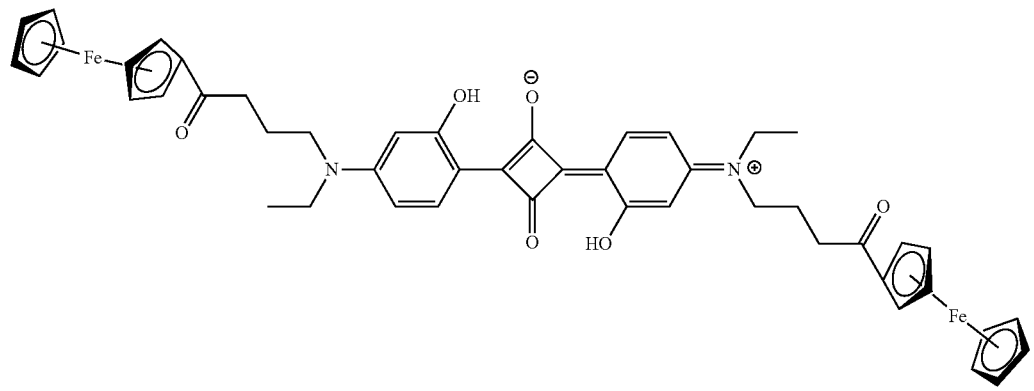
C-2
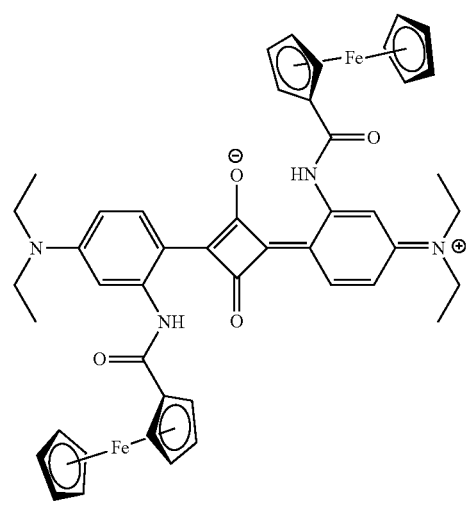
C-3
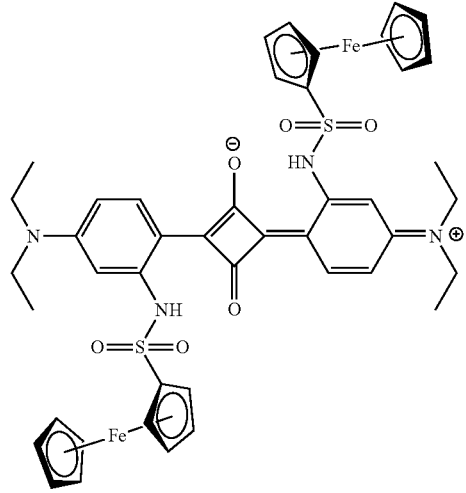
C-4

-continued
C-5
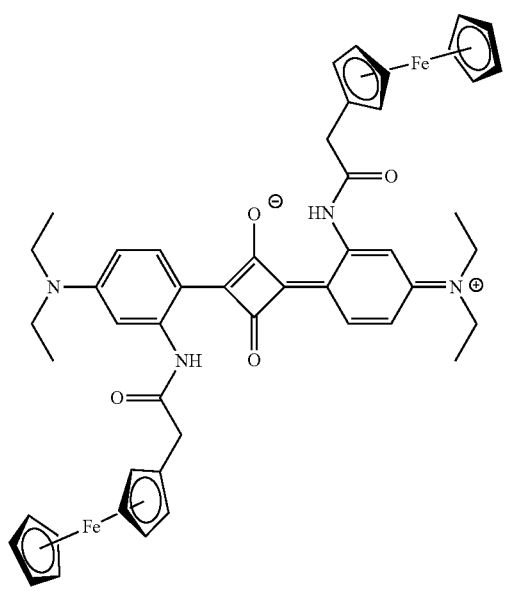
C-6
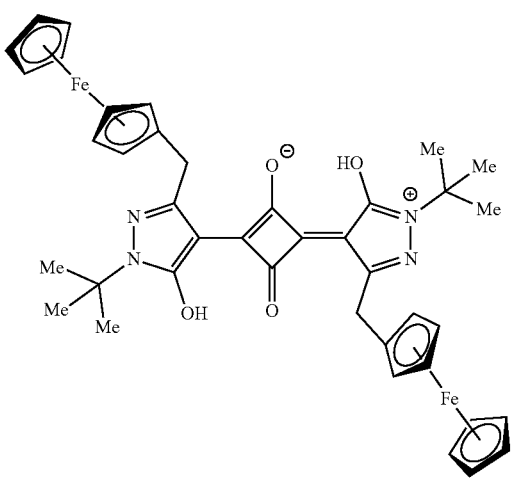
C-7
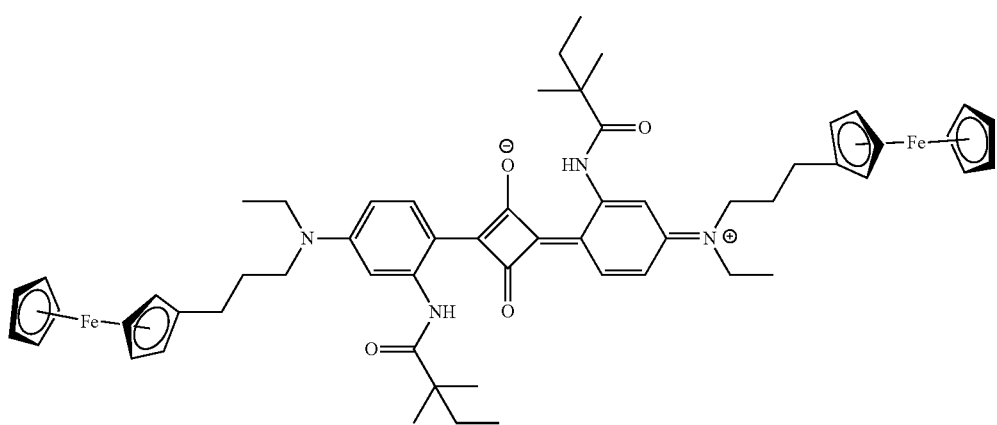
C-8
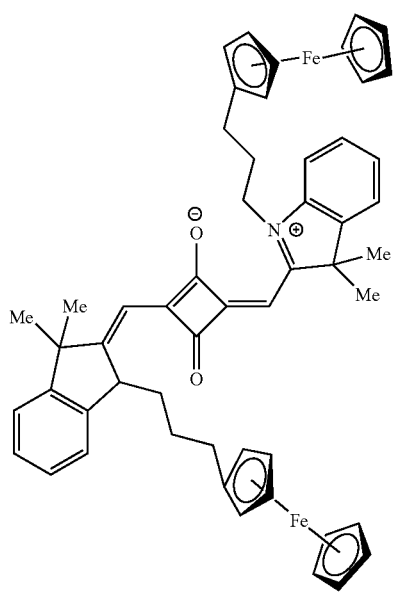

C-9
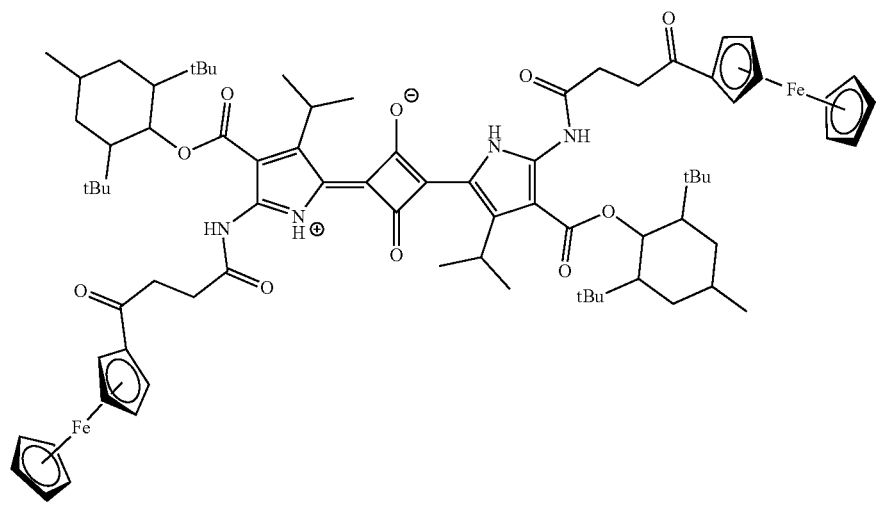
C-10
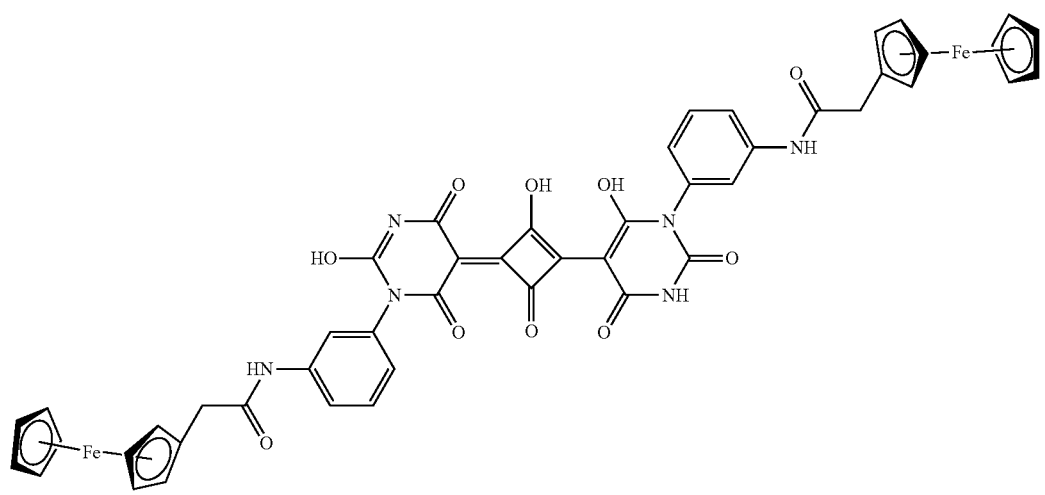
C-11 C-12
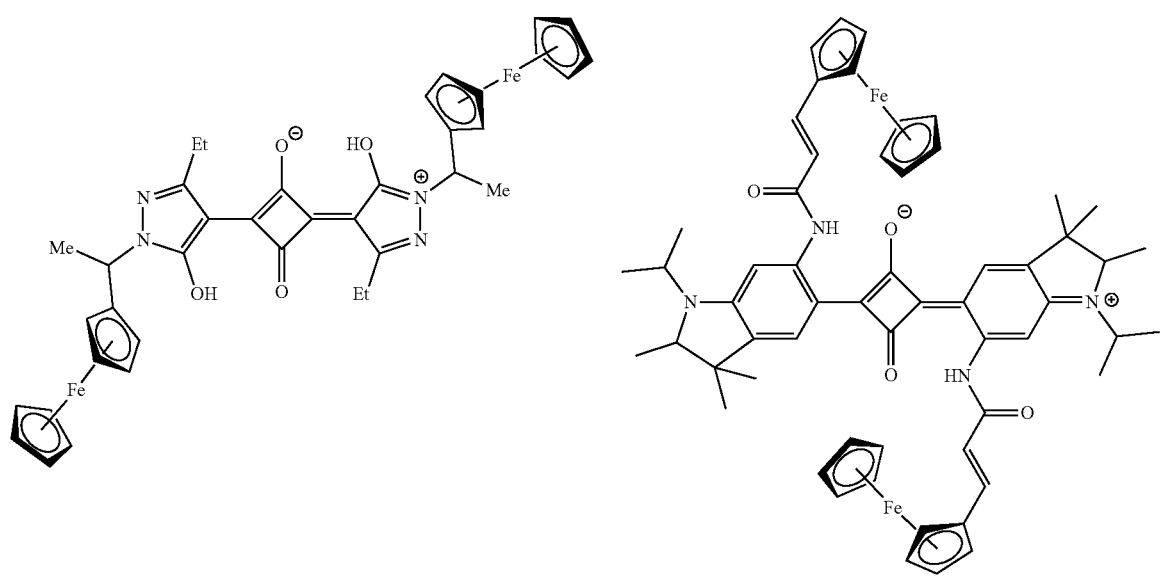

C-13
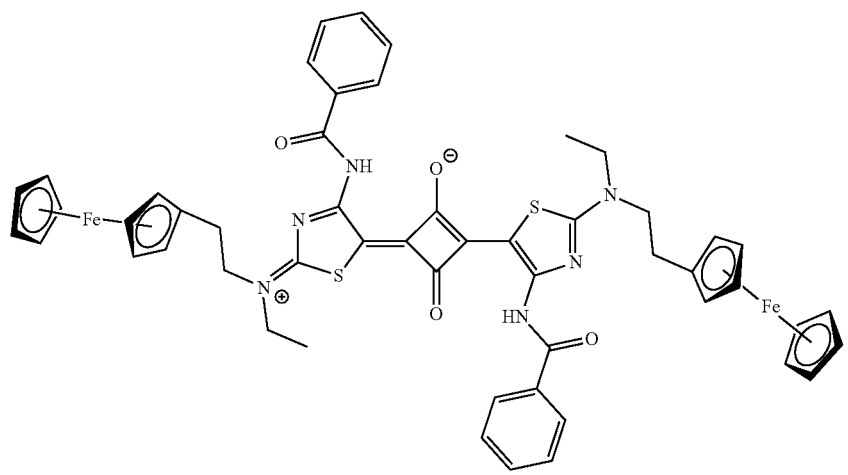
C-14
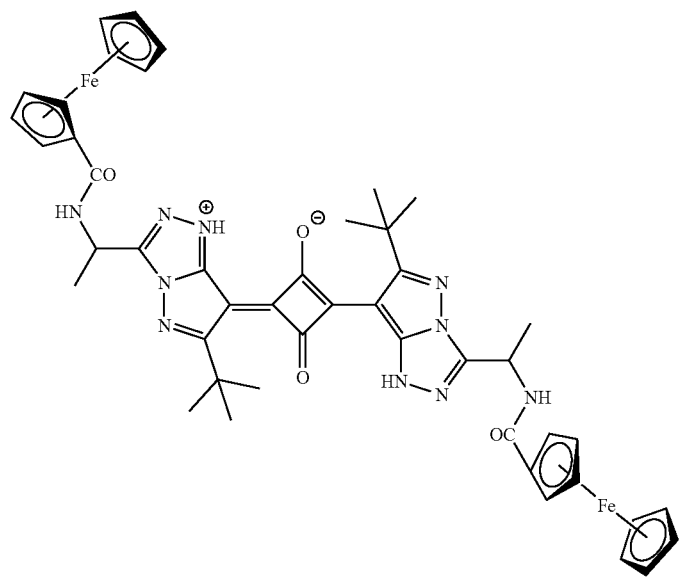
C-15
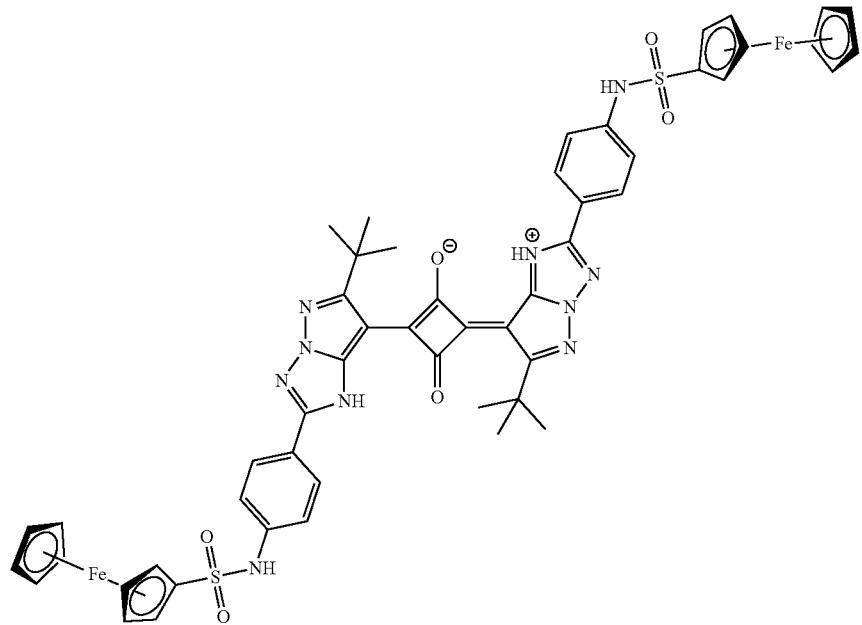

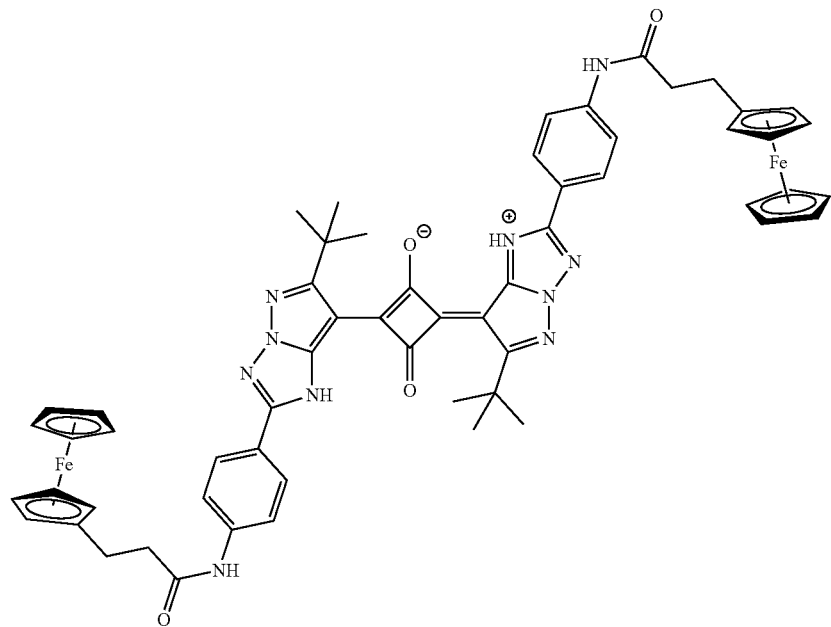
C-16
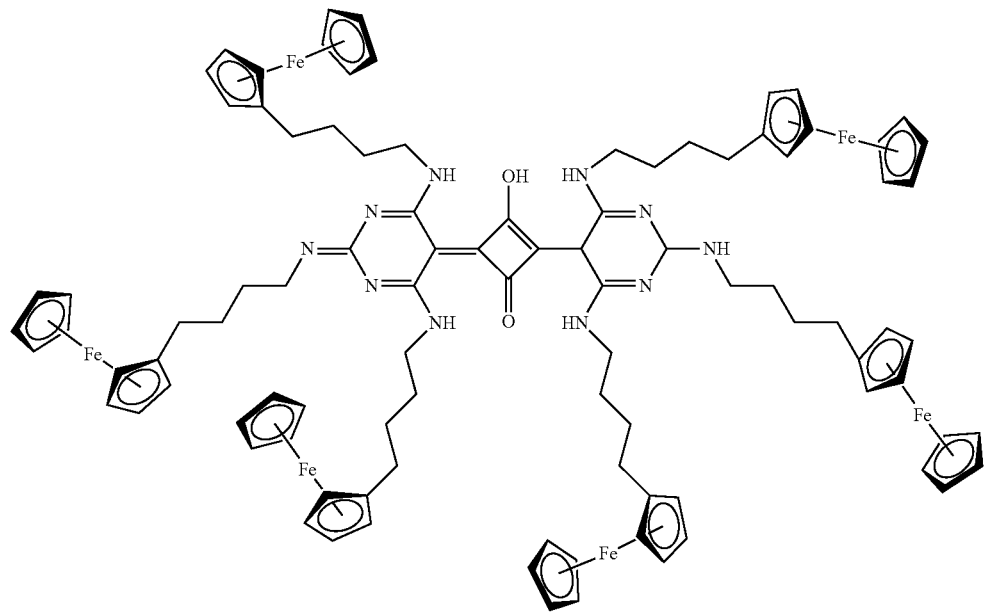
C-17

-continued
C-18
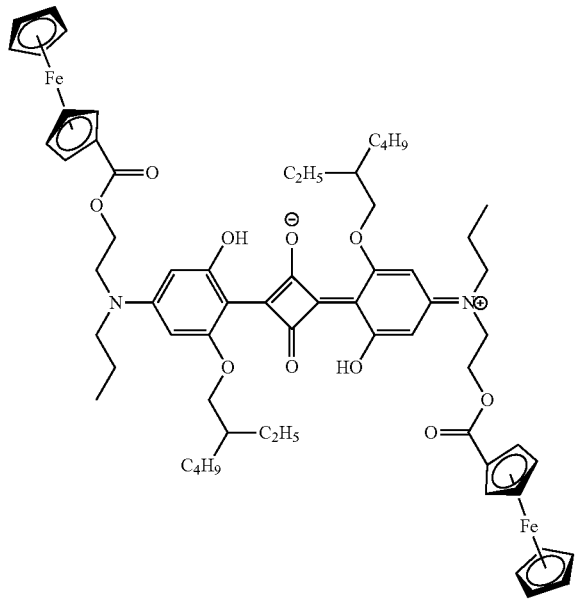
C-19
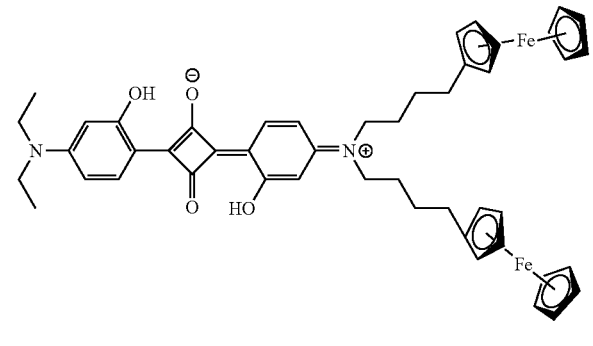
C-20
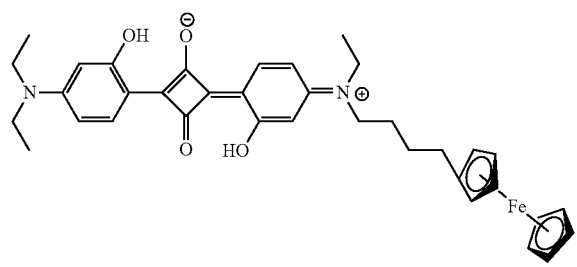
C-21
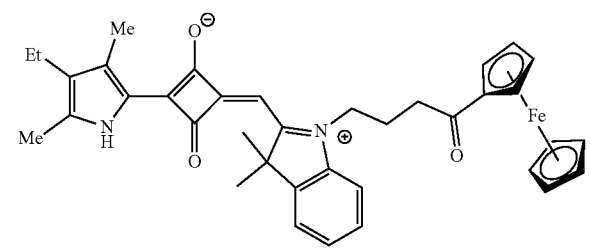
C-22
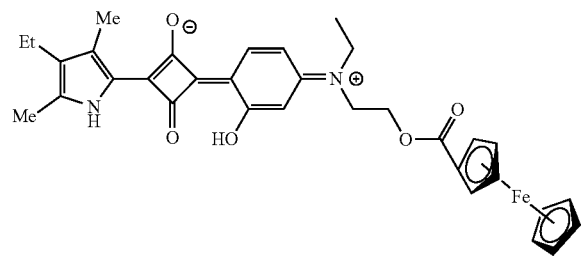
C-23
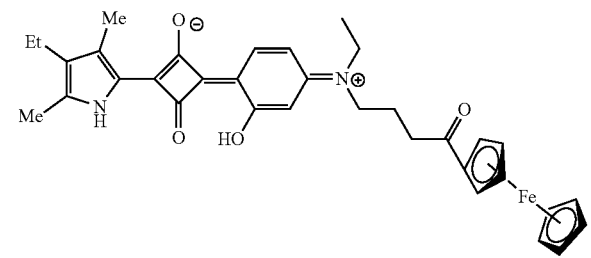
C-24
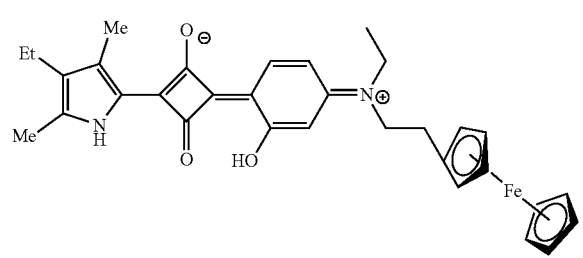
C-25
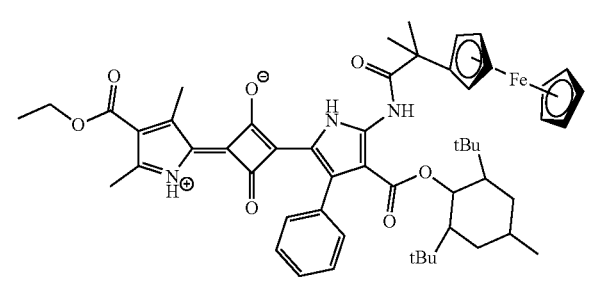

-continued
C-26
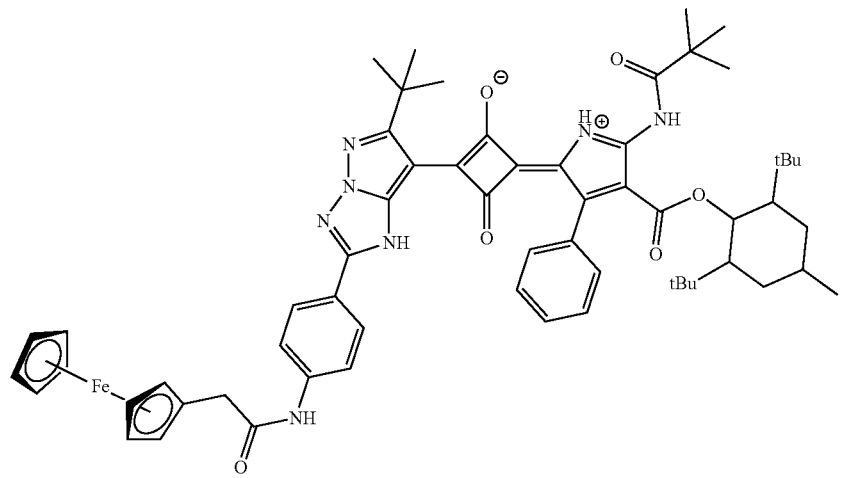
C-27
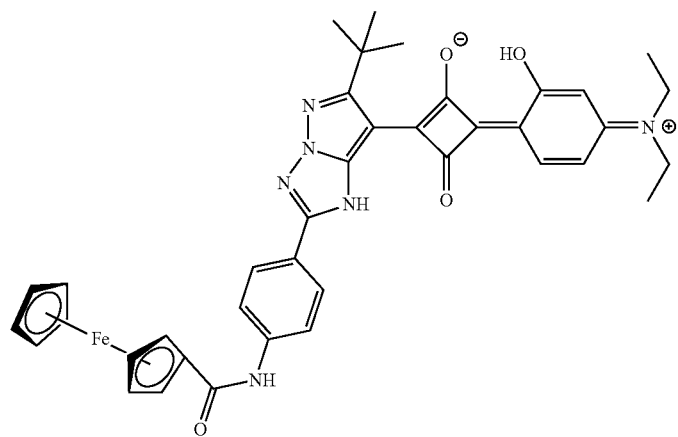
C-28
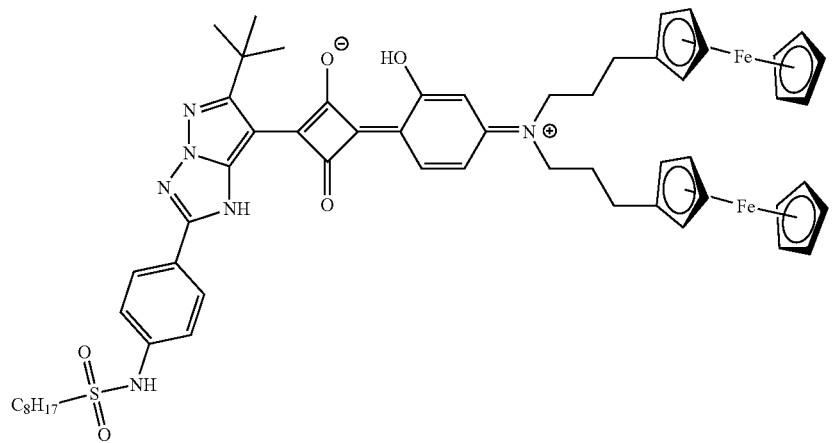

-continued
C-29
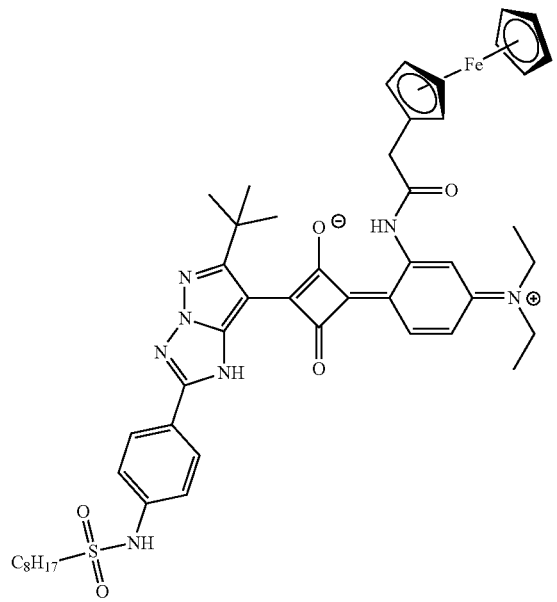
C-30
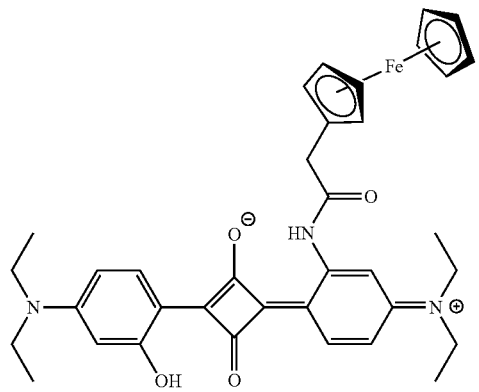
C-31
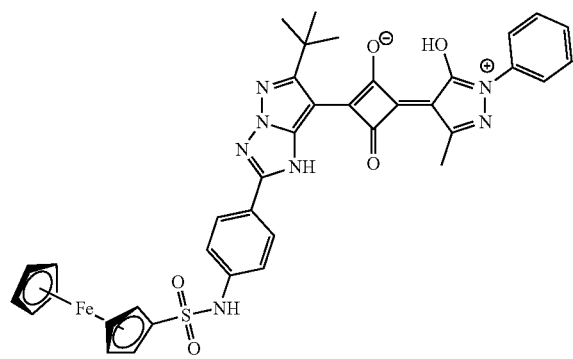
C-32
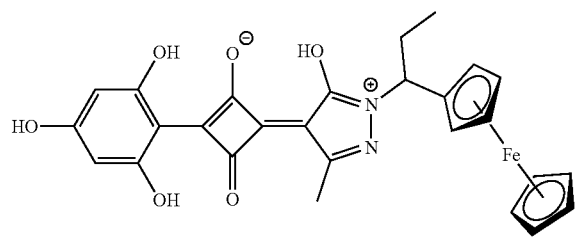
C-33
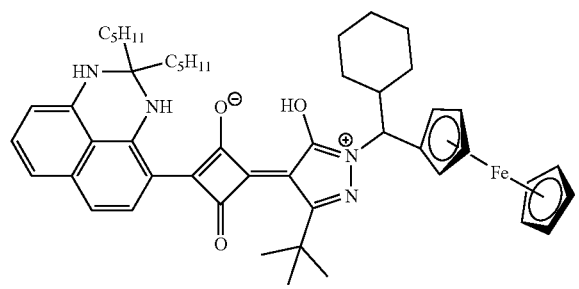
C-34
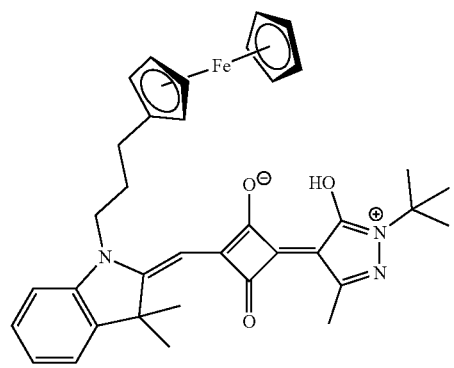

-continued
C-35
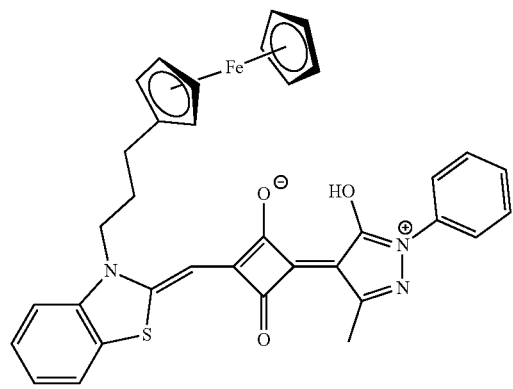
C-36
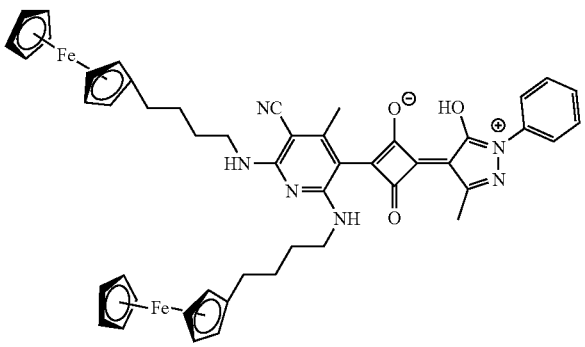
C-37
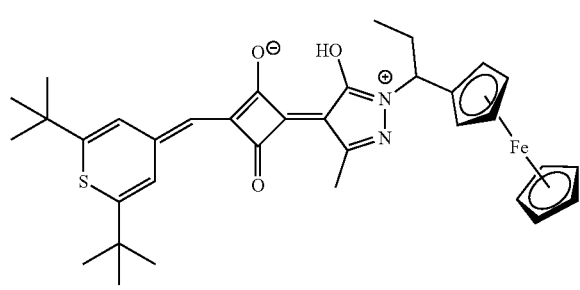
C-38
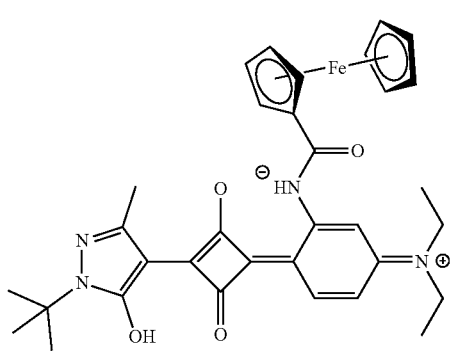
C-39
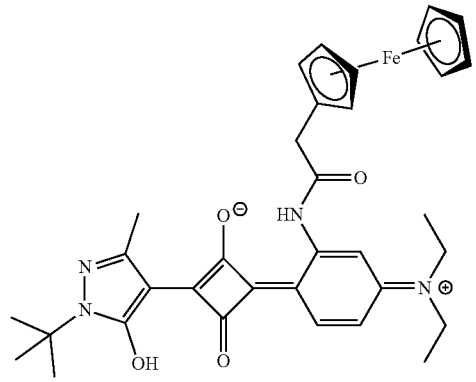
C-40
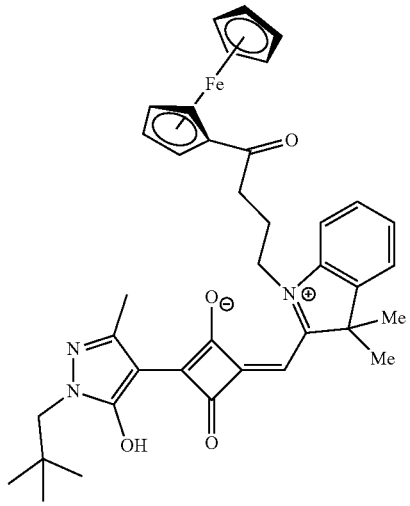

-continued
C-39
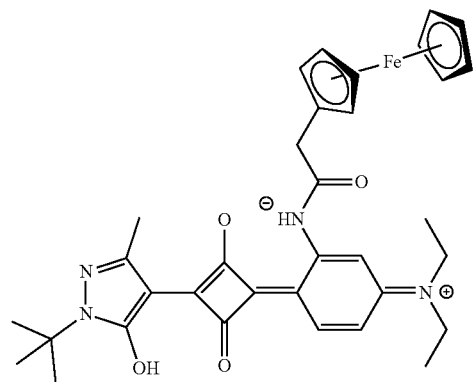
C-40
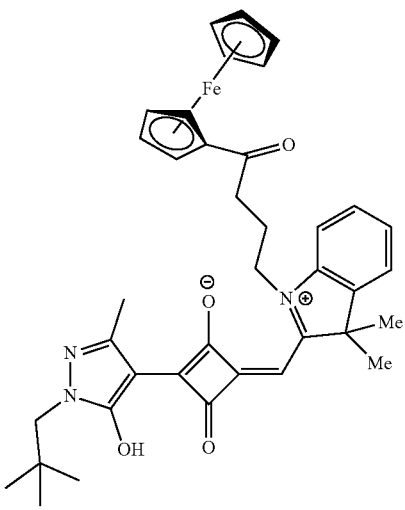
C-41
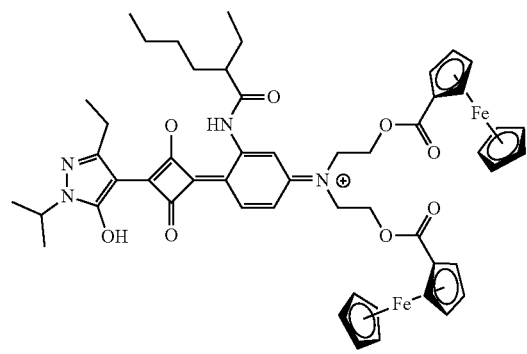
C-42
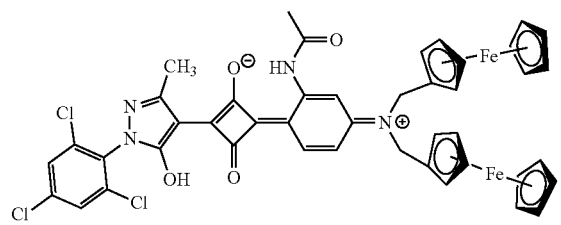
C-43
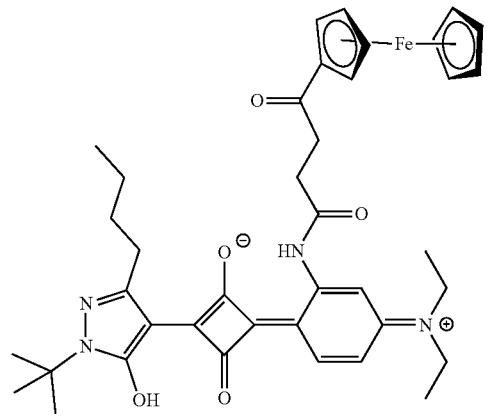
C-44
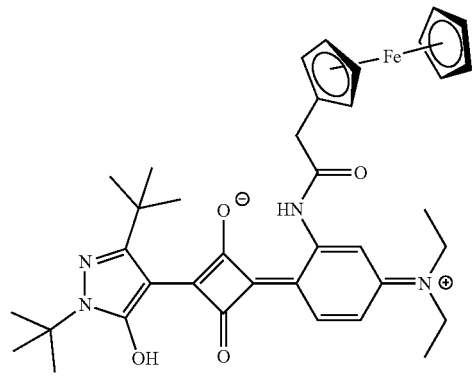

-continued
C-45
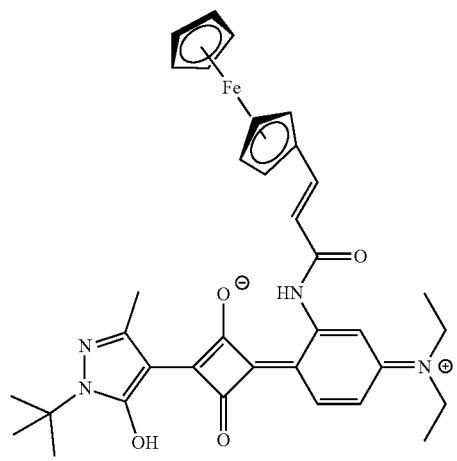
C-46
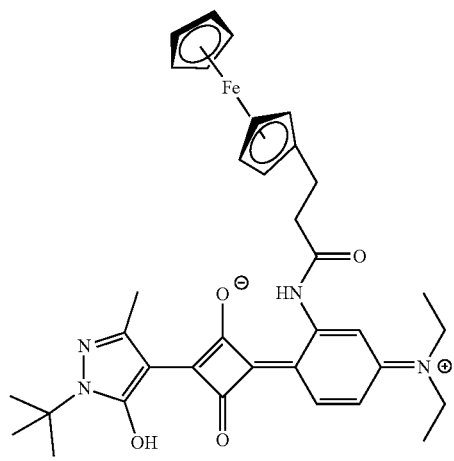
C-47
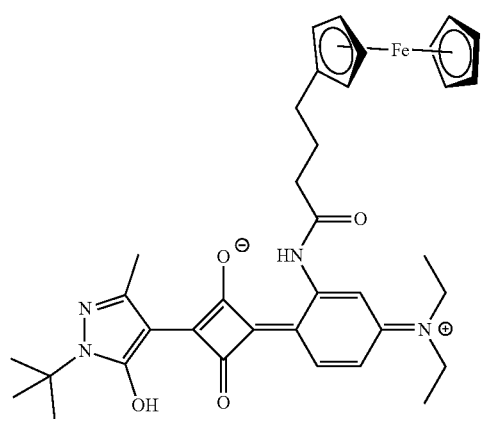
C-48
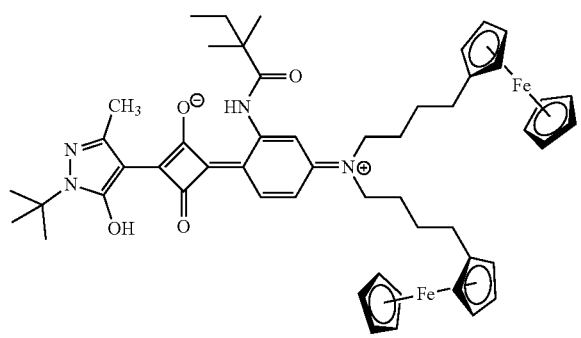
C-49
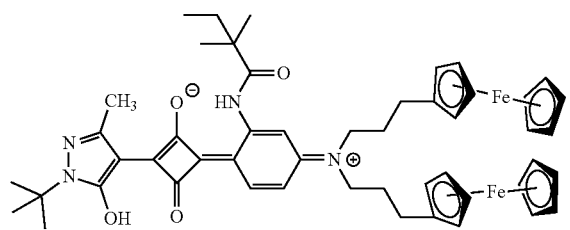
C-50
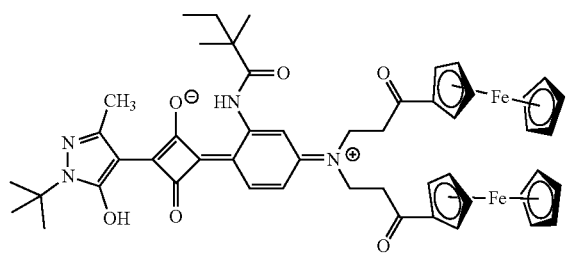
C-51
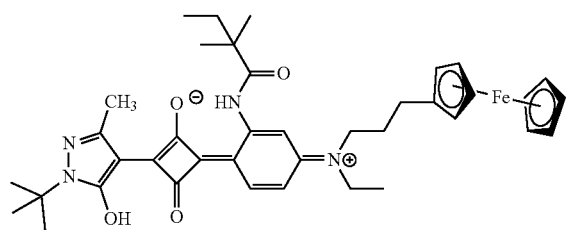
C-52
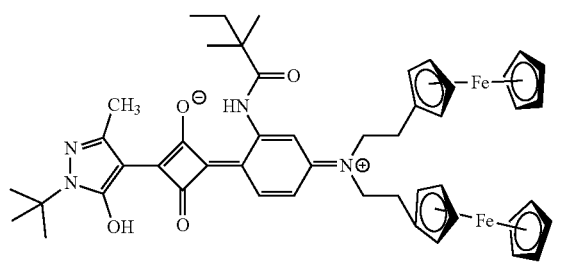

-continued
C-53
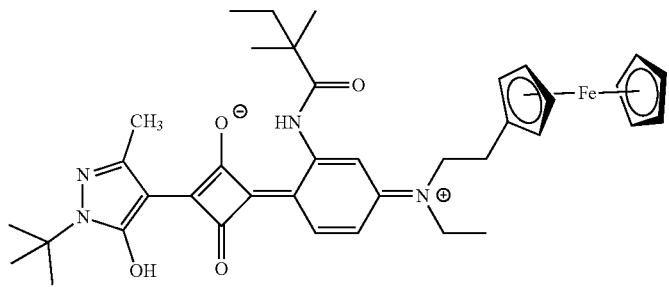
C-54
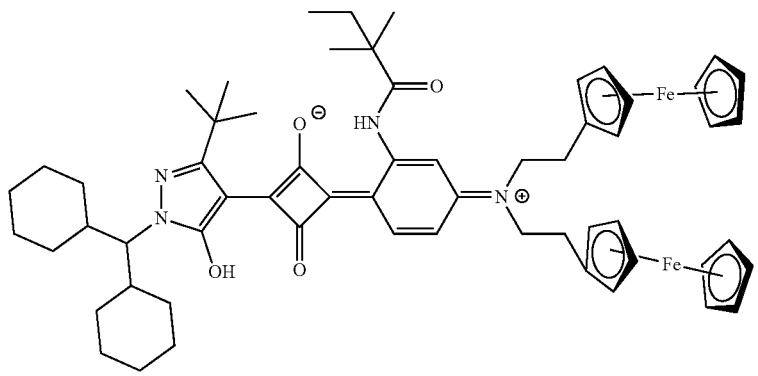
C-55
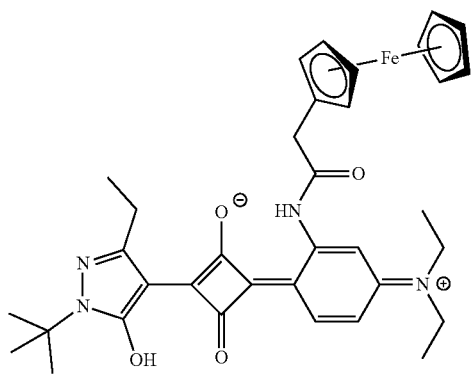
C-56
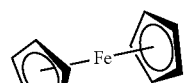
C-57
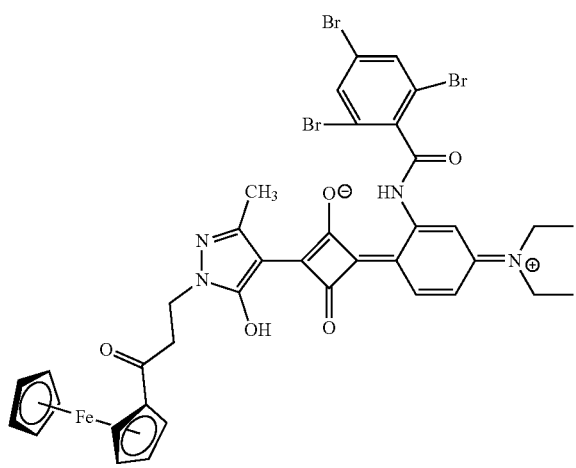
C-58
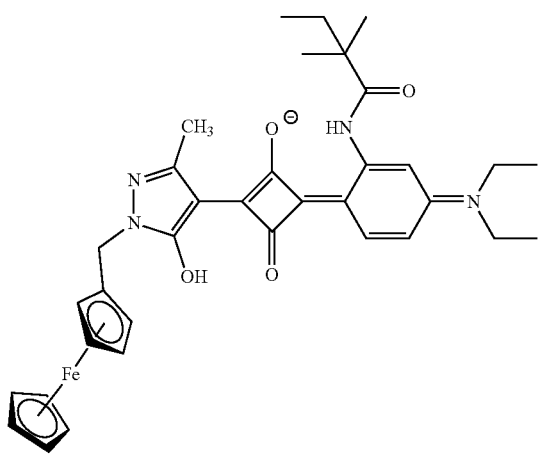

C-59
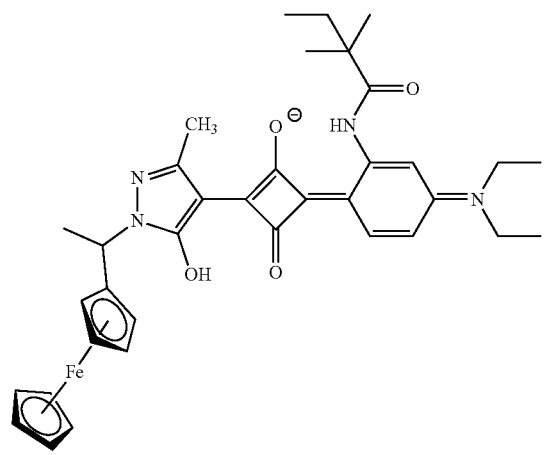
C-60
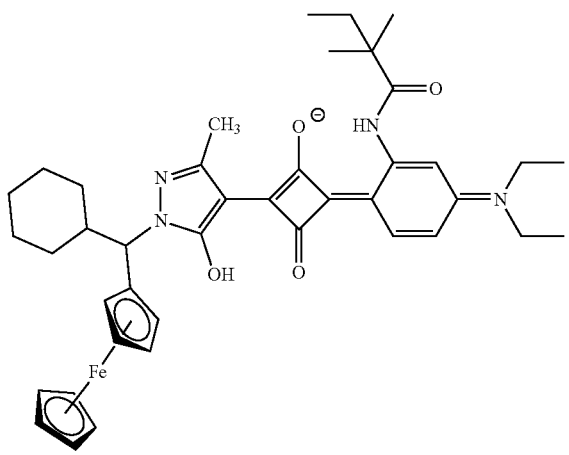
C-61
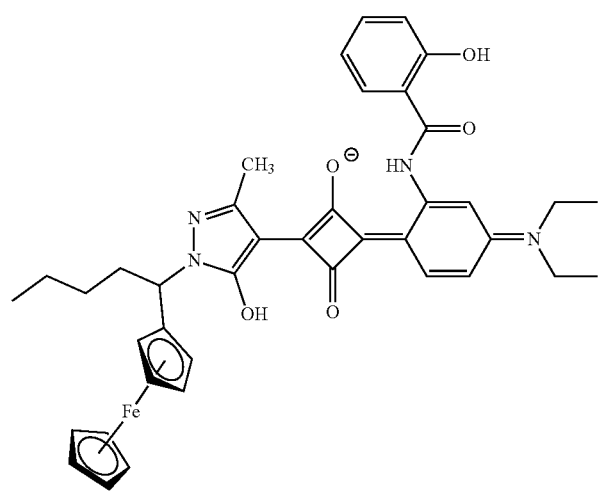
C-62
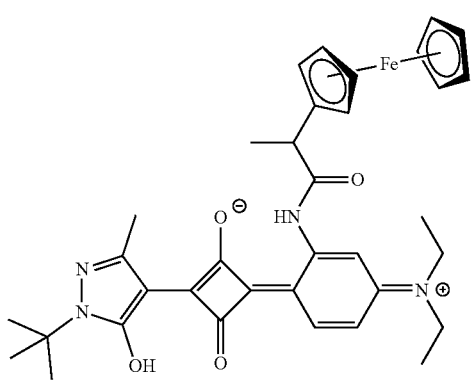
C-63
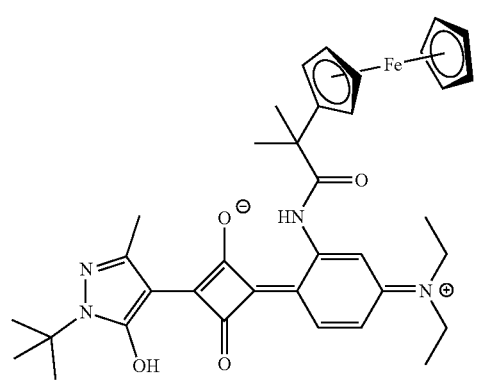
C-64
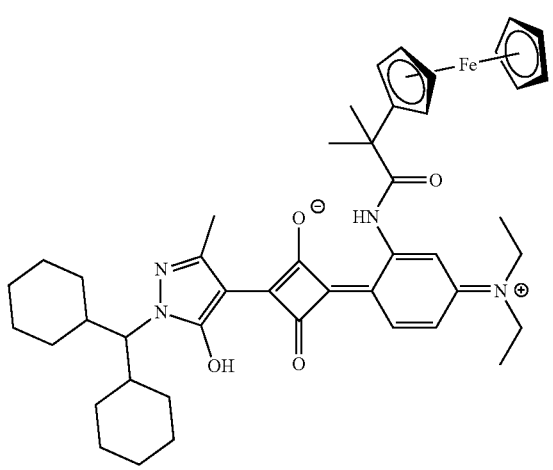

-continued
C-65
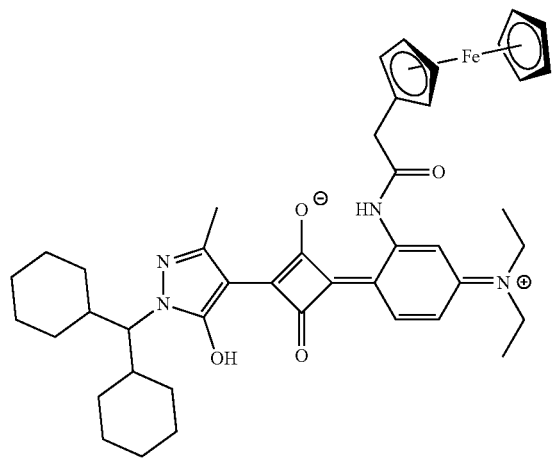
C-66
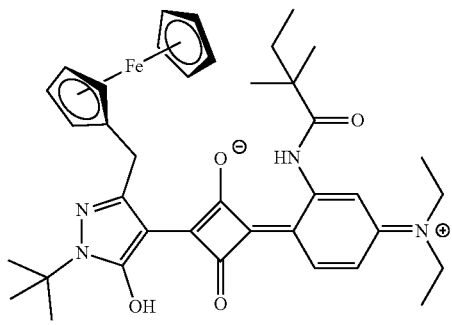
C-67
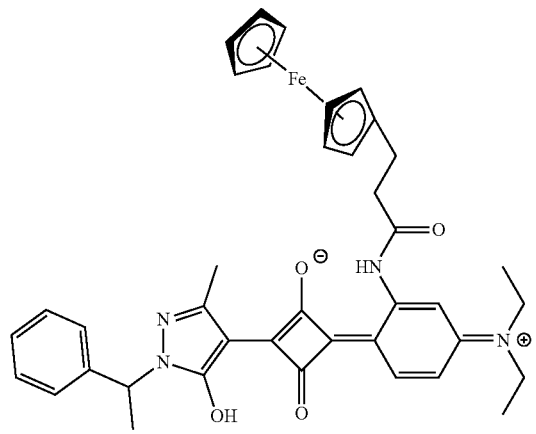
C-68
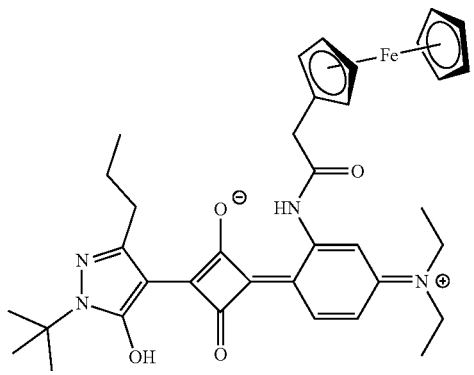
C-69
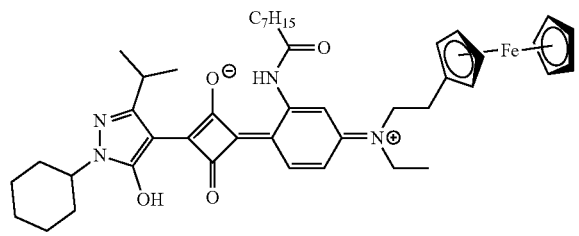
C-70
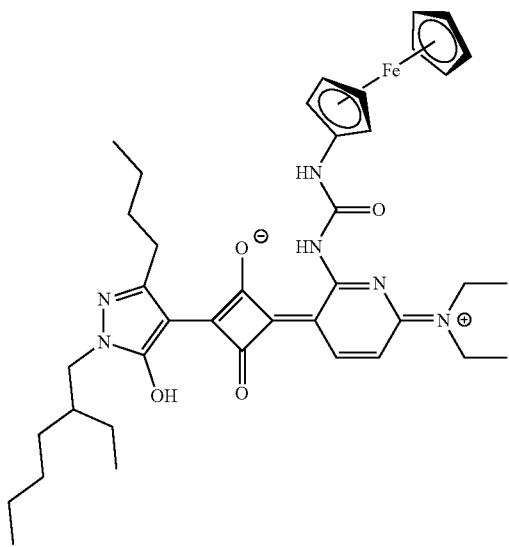

-continued

C-71

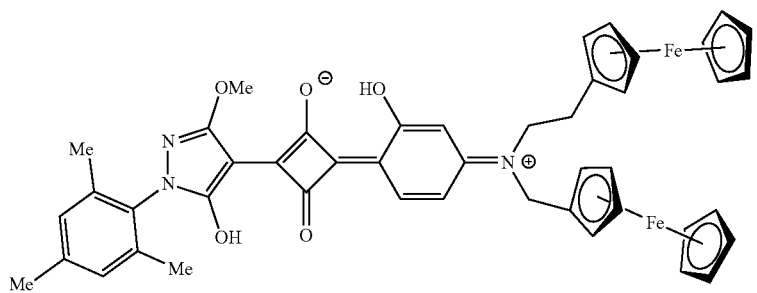

C-72

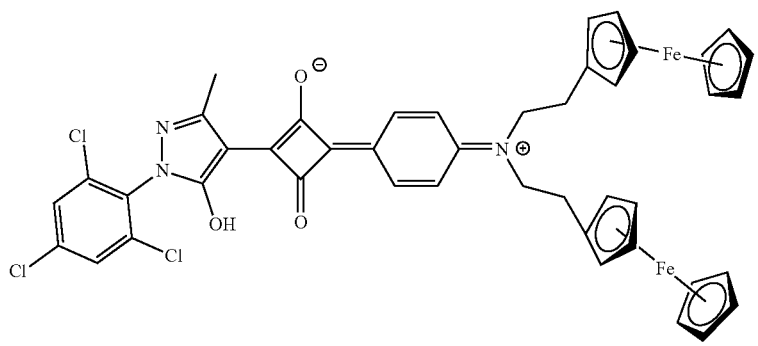

In a case of using the colorant with a built-in polarization-improving agent, the content of the colorant with a built-in polarization-improving agent in the colorant filter according to the embodiment of the present invention is defined as the content of the colorant in the colorant filter according to the embodiment of the present invention, the colorant having an absorption maximum wavelength in a range of 560 to 620 nm or 460 to 520 nm.

(Discoloration Preventer)

The colorant filter according to the embodiment of the present invention preferably contains a discoloration preventer. As the discoloration preventer used in the present invention, antioxidants described in paragraphs "0143" to "0165" of WO2015/005398A, radical scavengers described in paragraphs "0166" to "0199" of WO2015/005398A, and deterioration inhibitors described in paragraphs "0205" and "0206" of WO2015/005398A are can be used.

A compound represented by Formula (IV) can be preferably used as the discoloration preventer used in the colorant filter according to the embodiment of the present invention.

Formula (IV)

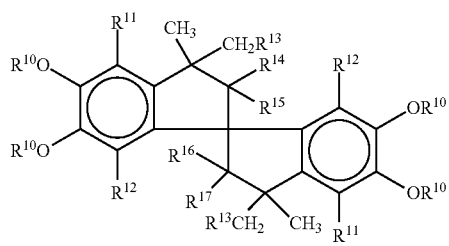

In Formula (IV), $R^{10}$ represents an alkyl group, an alkenyl group, an aryl group, an aralkyl group, a heterocyclic group, or a group represented by $R^{18}CO-$, $R^{19}SO_2-$, or $R^{20}NHCO-$. Here, each of $R^{18}$, $R^{19}$, and $R^{20}$ represents an alkyl group, an alkenyl group, an aryl group, or a heterocyclic group. $R^{11}$ and $R^{12}$ each independently represent a hydrogen atom, a halogen atom, an alkyl group, an alkenyl group, an alkoxy group, or an alkenoxy group, and $R^{13}$, $R^{14}$, $R^{15}$, $R^{16}$, and $R^{17}$ each independently represent a hydrogen atom, an alkyl group, an alkenyl group, or an aryl group.

Examples of $R^{10}$ in Formula (IV) include an alkyl group such as methyl, ethyl, propyl, and benzyl; an alkenyl group such as allyl; an aryl group such as phenyl; an aralkyl group such as benzyl; and a heterocyclic group such as tetrahydropyranyl and pyrimidyl. In addition, $R^{18}$, $R^{19}$, and $R^{20}$ each independently represent an alkyl group (such as methyl, ethyl, n-propyl, n-butyl, and benzyl), an alkenyl group (such as allyl), an aryl group (such as phenyl and methoxyphenyl), or a heterocyclic group (such as pyridyl and pyrimidyl).

Examples of R11 or R12 in Formula (IV) include a halogen atom such as chlorine and bromine; an alkyl group such as methyl, ethyl, n-butyl, and benzyl; an alkenyl group such as allyl; an alkoxy group such as methoxy, ethoxy, and benzyloxy; and an alkenoxy group such as 2-propenyloxy.

Examples of $R^{13}$, $R^{14}$, $R^{15}$, $R^{16}$, or $R^{17}$ in Formula (IV) include an alkyl group such as methyl, ethyl, n-butyl, and benzyl; an alkenyl group such as 2-propenyl; and an aryl group such as phenyl, methoxyphenyl, and chlorphenyl.

Specific examples of the compound represented by Formula (IV) are shown below.

Formula (IV)

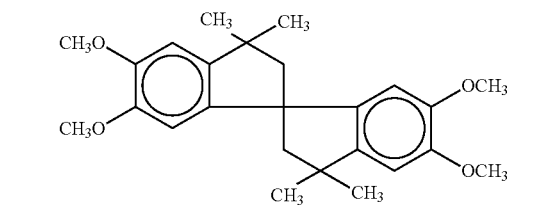
IV-1

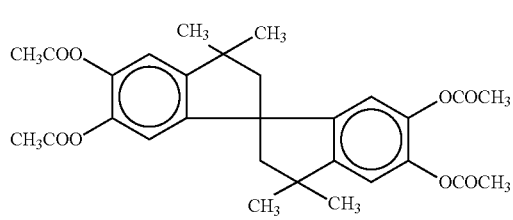
IV-2

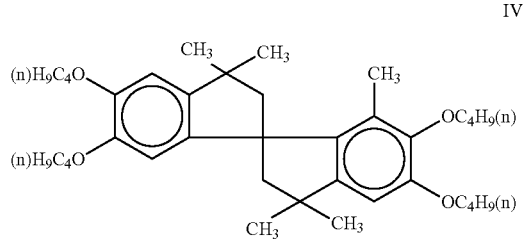
IV-3

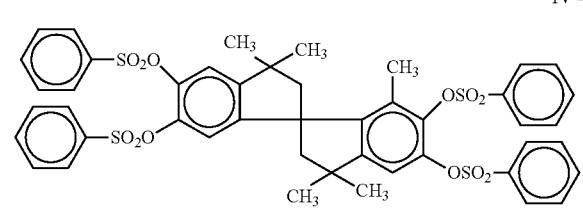
IV-4

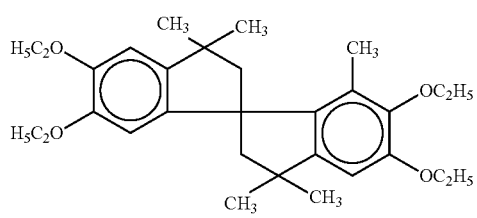
IV-5

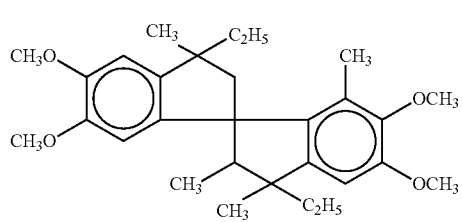
IV-6

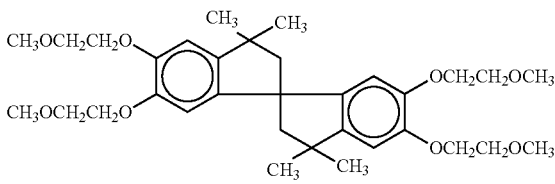
IV-7

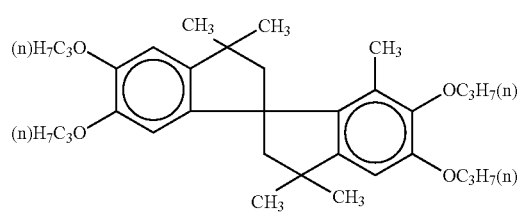
IV-8

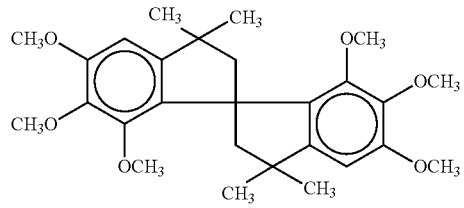
IV-9

A compound represented by Formula [III] can also be preferably used as the discoloration preventer used in the present invention.

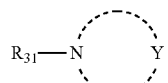

Formula [III]

In Formula [III], $R_{31}$ represents an aliphatic group or an aromatic group, and Y represents a non-metal atom group required to form a five- to seven-membered ring together with a nitrogen atom.

Next, in Formula [III], $R_{31}$ represents an aliphatic group or an aromatic group, but is preferably an alkyl group, an aryl group, or a heterocyclic group and most preferably an aryl group. Examples of the hetero ring formed by Y together with the nitrogen atom include a piperidine ring, a piperazine ring, a morpholine ring, a thiomorpholine ring, a thiomorpholine-1,1-dione ring, and a pyrrolidine ring.

Specific examples of the compound represented by Formula [III] are shown below.

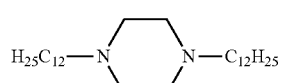
III-1

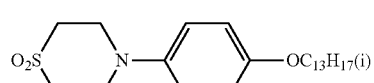
III-2

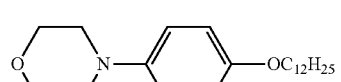
III-3

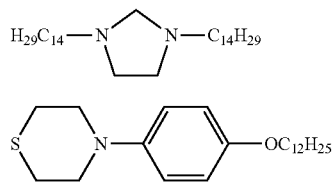

III-4

III-5

In addition to the above-described specific examples, specific examples of the compound represented by Formula [III] include exemplified compounds B-1 to B-65 described in pages 8 to 11 of JP1990-167543A (JP-H02-167543A), and exemplified compounds (1) to (120) described in pages 4 to 7 of JP1988-095439A (JP-S63-095439A).

The content of the discoloration preventer in the colorant filter according to the embodiment of the present invention is preferably 0% to 5% by mass, more preferably 0% to 3% by mass, and still more preferably 0% to 2% by mass. By controlling the addition amount of the discoloration preventer to the above-described upper limit value or less, fastness of the colorant can be improved without causing side effects such as discoloration of the colorant filter according to the embodiment of the present invention.

(Matting Agent)

It is preferable that fine particles are added to a surface of the colorant filter according to the embodiment of the present invention in order to impart slipperiness and present blocking. As the fine particles, silica (silicon dioxide, $SiO_2$), a surface of which is coated with a hydrophobic group and which is in a form of secondary particles, is preferably used. As the fine particles, in addition to or instead of silica, fine particles such as titanium dioxide, aluminum oxide, zirconium oxide, calcium carbonate, talc, clay, calcined kaolin, calcined calcium silicate, hydrous calcium silicate, aluminum silicate, magnesium silicate, and calcium phosphate may be used. Examples of a commercially available product include fine particles of trade name R972 or NX90S (both manufactured by Nippon Aerosil Co., Ltd.).

The fine particle function as a so-called matting agent, and by adding the fine particles, fine unevenness is formed on a film surface. Even in a case where films overlap with each other, the films do not stick to each other due to the unevenness, thereby securing slipperiness between the films. As the fine unevenness due to projections of fine particles protruding from the film surface, in a case where the number of projections having a height of 30 nm or more is $10^4$ or more per 1 $mm^2$, the effect of improving slipperiness and blocking property is particularly good.

In order to improve blocking property and slipperiness, it is preferable to particularly impart the fine particles of matting agent to a surface layer. Examples of a method of imparting fine particles to the surface layer include methods such as multilayer casting and coating.

The content of the matting agent in the colorant filter according to the embodiment of the present invention is appropriately adjusted depending on the purpose.

(Leveling Agent)

A leveling agent (surfactant) can be appropriately mixed with the colorant filter according to the embodiment of the present invention. Examples of the leveling agent include a known compound in the related art, but a fluorine-containing surfactant is particularly preferable. Specific examples thereof include compounds described in paragraphs "0028" to "0056" in the specification of JP2001-330725A.

The content of the leveling agent in the colorant filter according to the embodiment of the present invention is appropriately adjusted depending on the purpose.

The colorant filter according to the embodiment of the present invention may contain, in addition to the above-described respective components, a low molecular weight plasticizer, an oligomer-based plasticizer, a retardation modifier, an ultraviolet absorber, a deterioration inhibitor, a peeling accelerator, an infrared absorber, an antioxidant, a filler, a solubilizer, or the like.

<Method of Producing Colorant Filter>

Hereinafter, a method of producing a colorant filter will be described.

The colorant filter is not particularly limited, and can be appropriately produced by a known molding method.

Hereinafter, the method of producing a colorant filter will be described with reference to, as an example, an aspect in which the cycloolefin resin is used, but the colorant filter can be similarly produced by using other binder resins.

The colorant filter according to the embodiment of the present invention can be produced by, for example, a method of forming a solution casting film. In the method of forming a solution casting film, a film can be produced using a solution (dope) prepared by dissolving the binder resin in an organic solvent.

As the organic solvent, a solvent selected from an alcohol having 1 to 4 carbon atoms, an ether having 3 to 12 carbon atoms, a ketone having 3 to 12 carbon atoms, an ester having 3 to 12 carbon atoms, and a halogenated hydrocarbon having 1 to 6 carbon atoms is preferably included.

The above-described ether, ketone, and ester may have a cyclic structure. In addition, a compound having any two or more functional groups (that is, —O—, —CO—, and —COO—) of the above-described ether, ketone, and ester can also be used as the organic solvent. The above-described organic solvent may have another functional group such as an alcoholic hydroxyl group. In a case of an organic solvent having two or more kinds of functional groups, it is preferable that the number of carbon atoms of the organic solvent is within the above-described preferred range with regard to the number of carbon atoms of the solvent having any functional group.

In a case where the above-described halogenated hydrocarbon and alcohol are used, the mass ratio thereof is preferably 100:0 to 70:30 and more preferably 100:0 to 90:10.

The content of the cycloolefin resin in the cycloolefin resin solution is preferably adjusted to 10% to 40% by mass. The content of the cycloolefin resin is still more preferably 10% to 30% by mass. The above-described optional additive may be added to the organic solvent (main solvent).

With regard to a drying method in the method of forming a solution casting film, reference can be made to the description in U.S. Pat. Nos. 2,336,310A, 2,367,603A, 2,492,078A, 2,492,977A, 2,492,978A, 2,607,704A, 2,739,069A, 2,739,070A, GB640731B, GB736892B, JP1970-004554B (JP-S45-004554B), JP1974-005614B (JP-S49-005614B), JP1985-176834A (JP-S60-176834A), JP1985-203430A (JP-S60-203430A), and JP1987-115035A (JP-S62-115035A). Drying on a band can be performed by blowing air or an inert gas such as nitrogen.

It is also possible to cast two or more layers using the prepared cycloolefin resin solution (dope) to form a film. In this case, it is preferable to produce a cycloolefin resin film by the method of forming a solution casting film. It is preferable that the dope is cast onto the band and the solvent is evaporated to form a film. It is preferable that the concentration of the dope before casting is adjusted such that the solid content is in a range of 10% to 40% by mass. It is preferable that the surface of the band is polished off in a state of mirror surface.

In a case of casting two or more layers of a plurality of cycloolefin resin solutions, a film may be produced while casting each of the solutions including the cycloolefin resin from a plurality of casting ports provided at intervals in a traveling direction of a support, and laminating the solutions. With regard to the method, for example, methods described in JP1986-158414A (JP-S61-158414A), JP1989-122419A (JP-H01-122419A), and JP1999-198285A (JP-H11-198285A) can be used. In addition, it is also possible to cast the cycloolefin resin solution from two casting ports to form a film. With regard to the method, for example, methods described in JP1985-027562A (JP-S60-027562A), JP1986-094724A (JP-S61-094724A), JP1986-947245A (JP-S61-947245A), JP1986-104813A (JP-S61-104813A), JP1986-158413A (JP-S61-158413A), and JP1994-134933A (JP-H06-134933A) can be used. Furthermore, a casting method of a resin film described in JP1981-162617A (JP-S56-162617A), in which a flow of a high-viscosity resin solution is wrapped with a low-viscosity resin solution and the high-viscosity resin solution and low-viscosity resin solution are extruded at the same time, can also be used.

In addition, a film can be produced by, using two casting ports, peeling off a film formed on a support by a first casting port and performing second casting on a side which is in contact with the support surface. Examples thereof include a method described in JP1969-020235B (JP-S44-020235B).

As the cycloolefin resin solution to be cast, the same solution may be used or two or more different cycloolefin resin solutions may be used. It is sufficient that, in order to allow a plurality of cycloolefin resin layers to have a function, a cycloolefin resin solution corresponding to the function is extruded from each casting port. Furthermore, as the cycloolefin resin solution in the present invention, an aspect in which other functional layers (for example, an adhesive layer, a dye layer, an antistatic layer, an antihalation layer, an ultraviolet absorbing layer, a polarizing layer, and the like) are cast at the same time can be used.

—Addition of Colorant—

The timing of adding the colorant to the cycloolefin resin solution which is an example of the resin raw material of the colorant filter is not particularly limited as long as the colorant is added in a case of forming a film. For example, the colorant may be mixed with the cycloolefin resin at the time of preparing the dope.

—Drying Treatment—

Steps from casting of the dope to post-drying may be performed under an atmosphere of air or under an atmosphere of inert gas such as nitrogen. A winding machine used for producing the colorant filter according to the embodiment of the present invention and the polarizing plate protective film in the present invention (in a case where the colorant filter according to the embodiment of the present invention additionally serves as a polarizing plate protective film of a liquid crystal display device, the colorant filter may be referred to as the polarizing plate protective film) may be a commonly used winding machine, and the winding can be performed by a constant tension method, a constant torque method, a taper tension method, a program tension control method with a constant internal stress, and the like.

—Stretching Treatment—

The above-described colorant filter can be also be subjected to a stretching treatment. It is possible to impart a desired retardation to the colorant filter by the stretching treatment. As a stretching direction of the colorant filter, any of a width direction or a longitudinal direction is preferable.

The stretching method in the width direction is described in, for example, JP1987-115035A (JP-S62-115035A), JP1992-152125A (JP-H04-152125A), JP1992-284211A (JP-H04-284211A), JP1992-298310A (JP-H04-298310A), JP1999-048271A (JP-H11-048271A), and the like.

The stretching of the film (colorant filter) is performed under heating conditions. The film can be stretched during the treatment of drying, which is particularly effective in a case where the solvent remains. In a case of stretching in the longitudinal direction, for example, the film is stretched by adjusting a speed of a film transport roller so that a film winding speed is faster than a film peeling speed. In a case of stretching in the width direction, the film can be stretched by transporting the film while holding a width of the film by a tenter and gradually widening a width of the tenter. It is also possible to stretch the film using a stretching machine (preferably monoaxial stretching using a long stretching machine) after drying the film.

The method for forming the colorant filter is not particularly limited, and the colorant filter can be formed as described above. Furthermore, any of a heat melting molding method or a solution casting method can be used. The heat melting molding method can be classified in more detail into an extrusion molding method, a press molding method, an inflation molding method, an injection molding method, a blow molding method, a stretch molding method, and the like. Among these methods, in order to obtain a film having excellent mechanical strength, surface accuracy, and the like, an extrusion molding method, an inflation molding method, or a press molding method is preferable and an extrusion molding method is most preferable. The molding conditions are appropriately selected depending on the purpose of use and the molding method, and in a case of the heat melting molding method, the cylinder temperature is appropriately set in a range of usually 150° C. to 400° C., preferably 200° C. to 350° C., and more preferably 230° C. to 330° C. In a case where the polymer temperature is too low, the fluidity deteriorates, which may cause sink marks and distortion in the film, and in a case where the polymer temperature is too high, voids or silver streaks may be generated due to thermal decomposition of the polymer, or molding defects such as yellowing of the film may occur.

(Physical Properties or Characteristics of Colorant Filter)

Preferred physical properties or characteristics of the colorant filter according to the embodiment of the present invention will be described.

The thickness of the colorant filter is usually in a range of 0.2 to 300 μm, and is preferably in a range of 0.5 to 200 μm and more preferably in a range of 1 to 100 μm. In a case where the thickness is too thin, handling during lamination is difficult, and in a case where the thickness is too thick, the drying time after lamination is long, which decreases the productivity.

The wetting tension of the surface of the colorant filter is preferably 40 mN/m or more, more preferably 50 mN/m or more, and still more preferably 55 mN/m or more. In a case where the wetting tension of the surface is within the above-described range, the adhesive strength between the colorant filter and the polarizer is improved. In order to adjust the wetting tension of the surface, a known surface treatment such as a corona discharge treatment, an ozone spraying, an ultraviolet irradiation, a flame treatment, and a chemical treatment can be performed.

The phase difference (retardation) of the colorant filter according to the embodiment of the present invention will be described. The in-plane phase difference value Ro at 589 nm of the colorant filter according to the embodiment of the present invention is preferably 0 to 20 nm and more preferably 0 to 10 nm. In addition, the phase difference value Rth in the thickness direction is preferably −20 to 50 nm and more preferably −10 to 20 nm.

Generally, the retardation can be controlled by a retardation of the film before stretching, a stretching ratio, a stretching temperature, and a thickness of a stretched alignment film. In a case where the film before stretching has a constant thickness, since the absolute value of retardation tends to increase as the stretching ratio increases, a stretched alignment film having a desired retardation can be obtained by changing the stretching ratio.

In a case where the colorant filter is subjected to the stretching treatment, the thickness of the colorant filter before stretching is preferably approximately 50 to 500 μm, and it is preferable that the uneven thickness is small, which is within ±8%, preferably within ±6%, and more preferably within ±4%.

The stretching ratio is preferably 1.1 to 10 times and more preferably 1.3 to 8 times, and it is sufficient to set a stretching ratio within the range to be a desired retardation.

In the obtained colorant filter as described above, the molecules are aligned by stretching so that the colorant filter can have a desired retardation value.

It is preferable that the variation of retardation is small, in which, in the colorant filter according to the embodiment of the present invention, the variation of retardation at a wavelength of 589 nm in any retardation of the in-plane direction or the thickness direction is usually within ±50 nm, preferably ±30 nm or less, and more preferably ±20 nm or less.

The variations of retardation in the in-plane direction and the thickness direction or the uneven thickness of the colorant filter can be reduced by using a film before stretching which has a smaller variation or uneven thickness, or by applying stress evenly to the film during stretching. For the purpose, it is desirable to stretch the film under an environment in which the temperature is controlled in a uniform temperature distribution, preferably within ±5° C., still more preferably within ±2° C., and particularly preferably within ±0.5° C.

[Backlight Unit]

The backlight unit according to an embodiment of the present invention includes the colorant filter according to the embodiment of the present invention, a light guide plate, and a light source. The colorant filter is disposed on a downstream of a light emitted from the light source than the light guide plate. That is, the light source, the light guide plate, and the colorant filter are arranged in this order from upstream to downstream of the light emitted from the light source.

It is sufficient that the backlight unit according to the embodiment of the present invention have the colorant filter, the light guide plate, and the light source in the above-described arrangement, and other configurations are the same as those of the backlight unit normally used in the liquid crystal display device. As the light guide plate, an ordinary light guide plate can be used without any particular limitation, and the description thereof will be omitted.

As the light source of the backlight unit, a light emitting diode (LED), a laser diode, an electroluminescent element, or the like can be used, and from the viewpoint of luminance, a light emitting diode is preferable. Among these, from the viewpoint of improving color reproducibility in combination with the colorant filter according to the embodiment of the present invention, 1) a white LED in which a blue LED is combined with a yellow fluorescent body or 2) a white LED in which a blue LED is combined with a green fluorescent body and a red fluorescent body is preferable. In addition, a light source in which a blue LED is combined with an optical member containing a quantum dot is also preferable. The fluorescent body may be incorporated in the LED light source, or may be installed, as a wavelength conversion sheet, at a position other than the light source.

(Yellow Fluorescent Body)

The yellow fluorescent body absorbs a part of the emitted light of the blue LED, and emits yellow light having an emission peak in a wavelength region of 510 to 600 nm. As the yellow fluorescent body, for example, $Y_3Al_5O_{12}:Ce^{3+}$, $Tb_3Al_5O_{12}:Ce^{3+}$, $(Y_{0.8}Gd_{0.2})_3Al_5O_{12}:Ce$, $BaY_2SiAl_4O_{12}:Ce^{3+}$, $M_2SiO_4:Eu^{2+}$ (M is at least one selected from Ca, Sr, Ba, Mg, and Zn), $Lu_3Al_5O_{12}:Ce^{3+}$ (LAG), or the like can be used. In addition, a red fluorescent body such as CASN and SCASN may be added as necessary.

(Green Fluorescent Body)

The green fluorescent body absorbs a part of the emitted light of the blue LED, and emits green light having an emission peak in a wavelength region of 500 to 595 nm. Examples of the green fluorescent body include $Y_3Al_5O_{12}:Ce^{3+}$, $Tb_3Al_5O_{12}:Ce^{3+}$, $BaY_2SiAl_4O_{12}:Ce^{3+}$, $Ca_3Sc_2Si_3O_{12}:Ce^{3+}$, $(Ba,Sr)_2SiO_4:Eu^{2+}$, $CaSc_2O_4:CE^{3+}$, $Ba_3Si_6O_{12}N_2:Eu^{2+}$, β-SiAlON:$Eu^{2+}$, $SrGa_2S_4:Eu^{2+}$, $LaSiN:Ce^{3+}$, $CaSi_2O_2N_2:Eu^{2+}$, $Lu_3Al_5O_{12}:Ce^{3+}$ (LAG), and $SrSi_2O_2N_2:Eu^{2+}$.

(Red Fluorescent Body)

The red fluorescent body absorbs at least one of a part of the emitted light of the blue LED and a part of the emitted light of the green fluorescent body, and emits red light having an emission peak in a wavelength region of 600 to 690 nm. Examples of the red fluorescent body include Ca-α-SiAlON:$Eu^{2+}$, $CaAlSiN_3:Eu^{2+}$, $(Sr,Ca)AlSiN_3:Eu^{2+}$, $Sr_2Si_5N_8:Eu^{2+}$, $Sr_2(Si,Al)_5(N,O)_8:Eu^{2+}$, $CaS:Eu^{2+}$, $La_2O_2S:Eu^{3+}$, and $K_2SiF_6:Mn^{4+}$.

(Blue Fluorescent Body)

As a blue fluorescent body, a fluorescent body having an emission peak in a wavelength range of 430 to 460 nm is used, and it is particularly preferable to use the europium-activated chlorophosphate fluorescent body having composition represented by Formula (1).

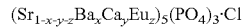

$(Sr_{1-x-y-z}Ba_xCa_yEu_z)_5(PO_4)_3Cl$      Formula (1):

In the formula, x, y, and z are numbers which satisfy $0 \leq x < 0.5$, $0 \leq y < 0.1$, and $0.005 < z < 0.1$.

From the blue fluorescent body having the composition represented by Formula (1), blue light having excellent luminous efficiency can be obtained.

(Quantum Dot)

The above-described various fluorescent body (green, red, and blue) may be quantum dots. The quantum dots are particles having a major axis of approximately 1 to 100 nm, and have discrete energy levels. Since the energy state of a quantum dot depends on the size of the quantum dot, the emission wavelength can be freely selected by changing the size. Examples of the quantum dot include a compound of a Group 12 element and a Group 16 element, a compound of a Group 13 element and a Group 16 element, and a compound of a Group 14 element and a Group 16 element, and include CdSe, CdTe, ZnS, CdS, InP, PbS, PbSe, and CdHgTe. As quantum nanomaterials, quantum rods and the like can be used in addition to the quantum dot.

[Liquid Crystal Display Device]

Next, the liquid crystal display device according to an embodiment of the present invention will be described.

The liquid crystal display device according to the embodiment of the present invention includes at least one colorant filter according to the embodiment of the present invention. The colorant filter according to the embodiment of the present invention may be used as a polarizing plate protective film and/or a pressure-sensitive adhesive layer as described later, or may be included in a backlight unit used in a liquid crystal display device.

It is preferable that the liquid crystal display device includes a colorant filter, polarizing plates including a polarizer and a polarizing plate protective film, a pressure-sensitive adhesive layer, and a liquid crystal cell, and it is preferable that the polarizing plates are attached to the liquid crystal cell through the pressure-sensitive adhesive layer. In the liquid crystal display device, the colorant filter may additionally serve as the polarizing plate protective film or the pressure-sensitive adhesive layer. That is, it is divided into a case where the liquid crystal display device includes polarizing plates including a polarizer and a colorant filter (polarizing plate protective film), a pressure-sensitive adhesive layer, and a liquid crystal cell, and a case where the liquid crystal display device includes polarizing plates including a polarizer and a polarizing plate protective film, a colorant filter (pressure-sensitive adhesive layer), and a liquid crystal cell.

FIG. 1 is a schematic view showing an example of the liquid crystal display device according to the embodiment of the present invention. In FIG. 1, a liquid crystal display device 10 consists of a liquid crystal cell having a liquid crystal layer 5 and a liquid crystal cell upper electrode substrate 3 and a liquid crystal cell lower electrode substrate 6 disposed above and below the liquid crystal layer 5, and an upper polarizing plate 1 and a lower polarizing plate 8 disposed on both sides of the liquid crystal cell. A color filter layer may be laminated on the upper electrode substrate 3 or the lower electrode substrate 6. On a rear surface of the liquid crystal display device 10, a backlight is disposed. As a light source of the backlight, those described in the above backlight unit can be used.

It is preferable that each of the upper polarizing plate 1 and the lower polarizing plate 8 has a configuration in which two polarizing plate protective films and a polarizer are laminated so as to sandwich the polarizer with the polarizing plate protective films, and in the liquid crystal display device 10, at least one polarizing plate is a polarizing plate including the colorant filter according to the embodiment of the present invention.

In addition, in the liquid crystal display device 10, the liquid crystal cell and the polarizing plate (upper polarizing plate 1 and/or lower polarizing plate 8) may be bonded together through a pressure-sensitive adhesive layer (not shown). In this case, the colorant filter according to the embodiment of the present invention may additionally serve as the above-described pressure-sensitive adhesive layer.

The liquid crystal display device 10 includes an image direct vision-type liquid crystal display device, an image projection-type liquid crystal display device, and a light modulation-type liquid crystal display device. An active matrix liquid crystal display device in which a three-terminal or two-terminal semiconductor element such as TFT or MIM is used is effective for the present invention. In addition, a passive matrix liquid crystal display device represented by an STN mode which is called as time division driving is also effective.

In a case where the colorant filter according to the embodiment of the present invention is included in the backlight unit, the polarizing plate of the liquid crystal display device may be a normal polarizing plate (polarizing plate not including the colorant filter according to the embodiment of the present invention), or may be a polarizing plate including the colorant filter according to the embodiment of the present invention. In addition, the pressure-sensitive adhesive layer may be a normal pressure-sensitive adhesive layer (not the colorant filter according to the embodiment of the present invention), or may be a pressure-sensitive adhesive layer formed of the colorant filter according to the embodiment of the present invention.

An IPS mode liquid crystal display device described in paragraphs 0128 to 0136 of JP2010-102296A is preferable as the liquid crystal display device of the present invention.

(Polarizing Plate)

The polarizing plate used in the present invention includes a polarizer and at least one polarizing plate protective film.

The polarizing plate used in the present invention is preferably a polarizing plate having a polarizer and polarizing plate protective films on both surfaces of the polarizer, and it is preferable that at least one surface of the polarizer includes the colorant filter according to the embodiment of the present invention as the polarizing plate protective film. The opposite surface of the polarizer to the surface having the colorant filter according to the embodiment of the present invention (polarizing plate protective film of the present invention) may have a normal polarizing plate protective film.

The film thickness of the polarizing plate protective film is 5 μm to 120 μm and more preferably 10 μm to 100 μm. A thinner film is preferable in that, in a case of being incorporated in the liquid crystal display device, display unevenness over time in high temperature and high humidity is less likely to occur. On the other hand, in a case where the film is too thin, it is difficult to transport the film stably in a case of producing the film and producing the polarizing plate. In a case where the colorant filter according to the embodiment of the present invention additionally serves as the polarizing plate protective film, it is preferable that the thickness of the colorant filter satisfies the above-described range.

—Performance of Polarizing Plate—

The polarizing plate used in the present invention has a degree of polarization of preferably 99.950% or more, more preferably 99.970% or more, and most preferably 99.990% or more.

In the present invention, the degree of polarization of the polarizing plate is calculated by the following expression from an orthogonal transmittance and a parallel transmittance measured at a wavelength of 380 to 700 nm using an automatic polarizing film measurement instrument: VAP-7070 (manufactured by JASCO Corporation).

$$\text{Degree of polarization (\%)} = [(\text{parallel transmittance} - \text{orthogonal transmittance})/(\text{parallel transmittance} + \text{orthogonal transmittance})]^{1/2} \times 100$$

The degree of polarization can be measured as follows. Two samples (5 cm×5 cm) in which a polarizing plate is attached to glass through a pressure sensitive adhesive are prepared. The orthogonal transmittance and the parallel transmittance are measured by setting a glass side of the sample toward a light source. The two samples are measured, and the average values thereof are defined as the orthogonal transmittance and the parallel transmittance, respectively. In a case of investigating the influence on the degree of polarization with the polarizing plate protective film, usually, the polarizing plate protective film to be evaluated is attached to the glass while being disposed on the glass side.

Other preferred optical properties of the polarizing plate used in the present invention are described in "0238" to "0255" of JP2007-086748A, and it is preferable to satisfy these properties.

—Shape and Configuration—

The shape of the polarizing plate used in the present invention includes not only a polarizing plate of an aspect of a film piece cut into a size so as to be incorporated in the liquid crystal display device as it is, but also a polarizing plate of an aspect in which the polarizing plate is produced in a longitudinal shape by a continuous production and wound up in a rolled shape (for example, an aspect having a roll length of 2500 m or more or 3900 m or more). In order to use the polarizing plate as a large-sized screen liquid crystal display device, the width of the polarizing plate is preferably 1470 mm or more.

The polarizing plate used in the present invention is configured of a polarizer and at least one polarizing plate protective film, but it is also preferable that the polarizing plate is further configured by attaching a separate film on one surface of the polarizing plate.

The separate film is used for the purpose of protecting the polarizing plate during the shipping of the polarizing plate and the inspection of product. The separate film is used for the purpose of covering an adhesive layer which is attached to a liquid crystal plate, and used on a surface where the polarizing plate is attached to the liquid crystal plate.

(Polarizer)

The polarizer used for the polarizing plate used in the present invention will be described.

The polarizer which can be used for the polarizing plate used in the present invention is preferably configured of polyvinyl alcohol (PVA) and a dichroic molecule, but as described in JP1999-248937A (JP-H11-248937A), a polyvinylene-based polarizer in which a polyene structure is generated by dehydrating PVA or dechlorinating polyvinyl chloride and aligning the polyene structure can also be used.

—Film Thickness of Polarizer—

The film thickness of the polarizer before stretching is not particularly limited, but from the viewpoint of stability of retaining film and homogeneity of stretching, is preferably 1 μm to 1 mm and particularly preferably 5 to 200 μm. In addition, as described in JP2002-236212A, a thin PVA film in which the stress generated in a case of being stretched 4 to 6 times in water is 10 N or less may be used.

—Method of Producing Polarizer—

The method of producing a polarizer is not particularly limited, and for example, it is preferable that the polarizer is configured by form PVA into a film and introducing the dichroic molecule to the film. The PVA film can be produced by the method described in paragraphs "0213" to "0237" of JP2007-086748A and by the description of—JP3342516B, JP1997-328593A (JP-H09-328593A), JP2001-302817A, JP2002-144401A, and the like.

(Method of Laminating Polarizer and Polarizing Plate Protective Film)

The polarizing plate used in the present invention is produced by adhering (laminating) at least one polarizing plate protective film (preferably the colorant filter according to the embodiment of the present invention) on at least one surface of the above-described polarizer.

The polarizing plate used in the present invention is preferably produced by a method in which a polarizing plate protective film is subjected to an alkali treatment, and is attached, using a completely saponified polyvinyl alcohol aqueous solution, to both surfaces of a polarizer produced by dipping and stretching a polyvinyl alcohol film in an iodine solution.

Examples of an adhesive used to attach the treated surface of the polarizing plate protective film to the polarizer include polyvinyl alcohol-based adhesives such as polyvinyl alcohol and polyvinyl butyral and vinyl-based latex such as butyl acrylate.

In the polarizing plate used in the present invention, a method of attaching the polarizing plate protective film to the polarizer is preferably a method in which the polarizing plate protective film is attached to the polarizer so that a transmission axis of the polarizer and a slow axis of the polarizing plate protective film are substantially parallel, orthogonal, or 45°.

The slow axis can be measured by various known methods, for example, using a birefringence meter (KOBRADH, manufactured by Oji Scientific Instruments).

Here, "substantially parallel" refers to that the direction of the main refractive index nx of the polarizing plate protective film and the direction of the transmission axis of the polarizing plate intersect at an angle within ±5°, preferably at an angle within ±1°, and more preferably angle within ±0.5°. In a case where the intersecting angle is within ±1°, polarization performance under polarizing plate crossed nicols is less likely to be deteriorated and light leakage does not easily occur, which is preferable.

The description in which the direction of the main refractive index nx and the direction of the transmission axis are orthogonal or 45° means that the angle at which the direction of the main refractive index nx and the direction of the transmission axis intersect is within a range of ±5° with respect to an exact angle of being orthogonal and 45°, and the difference with respect to the exact angle is preferably within a range of ±1° and more preferably within a range of ±0.5°.

(Functionalization of Polarizing Plate)

The polarizing plate used in the present invention is preferably used as a functionalized polarizing plate complexed with an antireflection film for improving visibility of a display, a luminance improving film, or an optical film having a functional layer such as a hard coat layer, a forward scattering layer, an antiglare layer, an antifouling layer, and an antistatic layer. The antireflection film for functionalization, the luminance improving film, other functional optical films, the hard coat layer, the forward scattering layer, and the antiglare layer are described in paragraphs "0257" to "0276" of JP2007-086748A, and a functionalized polarizing plate can be produced based on the description.

(Pressure-Sensitive Adhesive Layer)

In the liquid crystal display device of the present invention, the polarizing plate is preferably attached to the liquid crystal cell through a pressure-sensitive adhesive layer. The colorant filter according to the embodiment of the present invention may additionally serve as the pressure-sensitive adhesive layer. In a case where the colorant filter according to the embodiment of the present invention does not serve as the pressure-sensitive adhesive layer, a normal pressure-sensitive adhesive layer can be used as the pressure-sensitive adhesive layer.

The pressure-sensitive adhesive layer is not particularly limited as long as the pressure-sensitive adhesive layer can attach the polarizing plate to the liquid crystal cell, and for example, an acrylic type, a urethane type, polyisobutylene, or the like is preferable.

In a case where the colorant filter according to the embodiment of the present invention additionally serves as a pressure-sensitive adhesive layer, the pressure-sensitive adhesive layer includes the above-described colorant and binder resin, and further contains a cross-linking agent, a coupling agent, or the like to impart adhesiveness.

In a case where the colorant filter additionally serves as a pressure-sensitive adhesive layer, the pressure-sensitive adhesive layer includes the binder resin in an amount of preferably 90% to 100% by mass and preferably 95% to 100% by mass. The content of the colorant is as described above.

The thickness of the pressure-sensitive adhesive layer is not particularly limited, but is preferably 1 to 50 μm and more preferably 3 to 30 μm.

(Liquid Crystal Cell)

The liquid crystal cell is not particularly limited, and a normal liquid crystal cell can be used.

EXAMPLES

Hereinafter, the present invention will be described in detail using examples. The materials, reagents, amounts and proportions of substances, operations, and the like described in the following examples can be appropriately modified as long as the gist of the present invention is maintained. Therefore, the scope of the present invention is not limited to the specific examples described below.

Example 101

<Preparation of Polystyrene Resin—Colorant Solution 101>

The following materials were put in a mixing tank and stirred to dissolve respective components in a solvent, thereby preparing a polystyrene resin—colorant solution 101 (dope).

| Composition of polystyrene resin - colorant solution 101 | |
|---|---|
| PSJ-polystyrene SGP-10 (trade name) manufactured by PS Japan Corporation | 100.0 parts by mass |
| Colorant-1 | 0.026 parts by mass |
| Methylene chloride (solvent) | 447.9 parts by mass |

<Production of Colorant Filter 101>

(Casting)

Using a band casting device, the polystyrene resin—colorant solution 101 (dope) prepared above was cast on a stainless casting support (support temperature: 22° C.). The film was peeled off in a state where the residual solvent amount in the dope was approximately 20% by mass, and dried at 100° C. while being transported between rolls of a heat treatment apparatus, thereby obtaining a colorant filter 101 (Example 101) of Examples. The obtained colorant filter had a thickness of 52 μm and a width of 1480 mm. In the colorant filter, the polystyrene resin is the binder resin.

Examples 102 to 106 and Comparative Examples 201 to 203

Colorant filters 102 to 106 (Examples 102 to 106) of Examples and colorant filters 201 to 203 (Comparative Examples 201 to 203) of Comparative Examples were produced in the same manner as in Example 101, except that, in Example 101, the type of colorant and the addition amount were changed as shown in Table 1.

Colorant-1

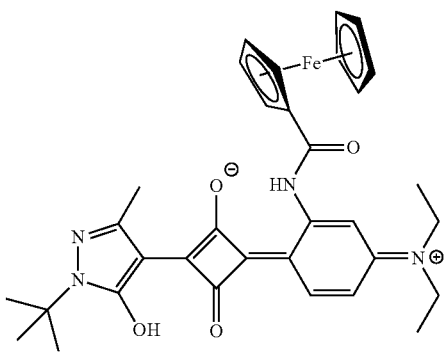

Colorant-2

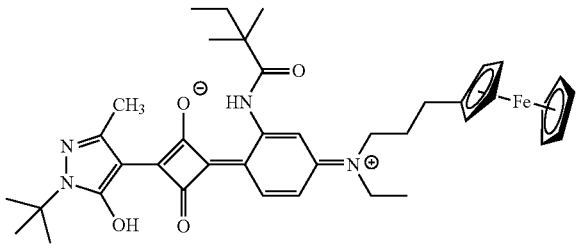

Colorant-3

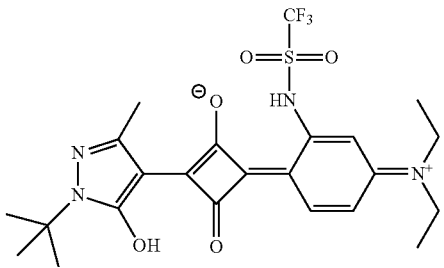

Colorant-4

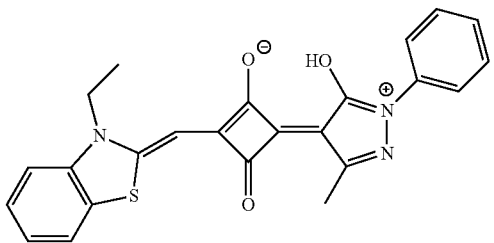

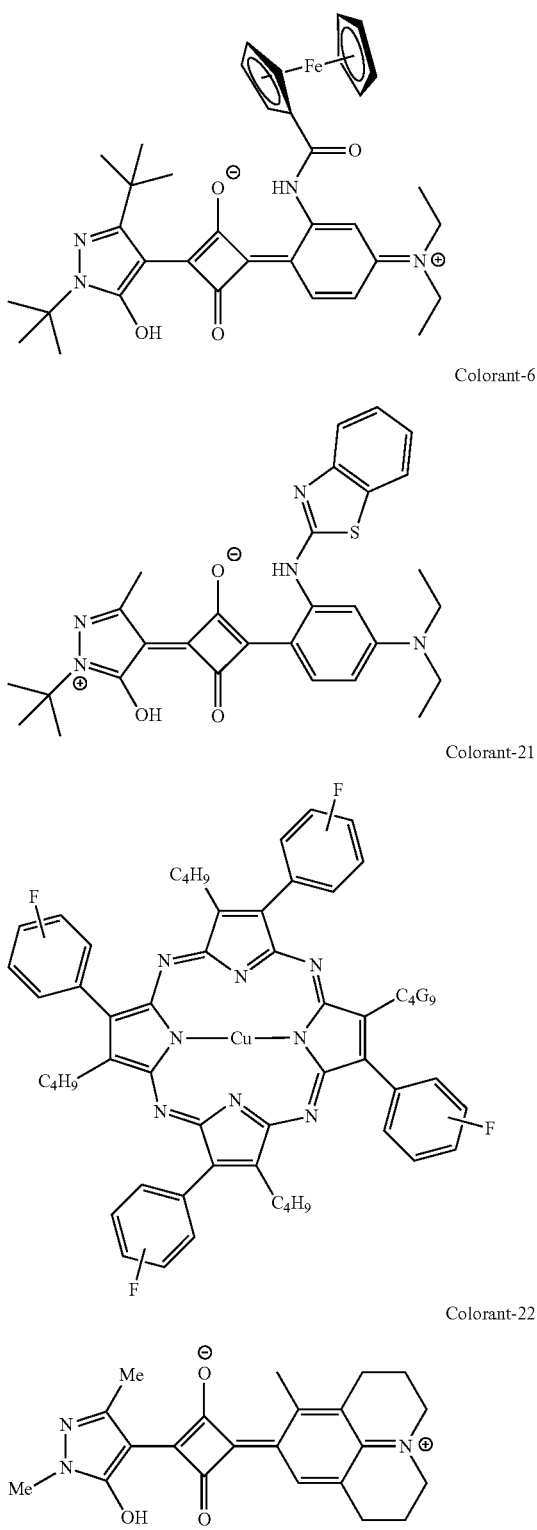

[Measurement of Absorption Maximum Wavelength, Half-Width (D2), and 10% Value Width (D1) of Colorant Filter]

The absorbance of the colorant filters of 101 to 106 and 201 to 203 in a wavelength range of 400 nm to 800 nm was measured every 1 nm using a UV3150 spectrophotometer manufactured by Shimadzu Corporation, to obtain an absorption spectrum of each colorant filter. The difference in absorbance between the absorbance at each wavelength of the obtained absorption spectrum and the absorbance of a filter not containing the colorant was calculated, and a wavelength at which the difference in absorbance was maximum was defined as the absorption maximum wavelength. Furthermore, the maximum value of the above-described difference in absorbance was set to 100%, and the difference (half-width, D2) between two wavelengths of the absorption spectrum giving a 50% difference in absorbance and the difference (10% value width, D1) between two wavelengths of the absorption spectrum giving a 10% difference in absorbance were read.

[Production of Polarizing Plate]

<Surface Treatment of Colorant Filter>

Regarding the colorant filters 101 to 106 and 201 to 203, a surface in contact with the casting support during film formation were subjected to a corona treatment, thereby producing surface-treated colorant filters 101 to 106 and 201 to 203.

<Production of Polarizer (Polarizing Layer)>

According to Example 1 of JP2001-141926A, a circumferential speed difference was imparted between two pairs of nip rollers to stretch a film in the longitudinal direction, thereby producing a polarizing layer including a 12 μm-thick polyvinyl alcohol resin.

<Production of Front-Side Polarizing Plate Protective Film (Outer Polarizing Plate Protective Film)>

(Preparation of Acrylic Resin)

8000 g of methyl methacrylate (MMA), 2000 g of methyl 2-(hydroxymethyl)acrylate (MHMA), and 10000 g of toluene as a polymerization solvent were charged in a reactor having an inner volume of 30 L which was equipped with a stirrer, a temperature sensor, a cooling pipe, and a nitrogen introduction pipe, and heated up to 107° C. while passing nitrogen through the solution. In a case of beginning a reflux caused by the heating, 10 g of t-amyl peroxyisononanoate was added thereto as a polymerization initiator, solution polymerization was progressed under reflux at approximately 105° C. to 110° C. while adding a solution consisting of 20 g of t-amyl peroxyisononanoate and 100 g of toluene dropwise for 2 hours, and aging was further performed for 4 hours. The polymerization reaction rate was 95%, and the content rate (weight ratio) of MHMA in the obtained polymer was 20%.

Next, 10 g of a stearyl phosphate/distearyl phosphate mixture (manufactured by Sakai Chemical Industry Co., Ltd., Phoslex A-18) was added to the obtained polymerization solution as a cyclization catalyst, and a cyclization condensation reaction was progressed under reflux at approximately 80° C. to 100° C. for 5.5 hours.

Next, the obtained polymerization solution was introduced into a vent-type screw twin-screw extruder (φ=29.75 mm, L/D=30) having a barrel temperature of 260° C., a rotation speed of 100 rpm, a degree of pressure reduction of 13 to 400 hPa (10 to 300 mmHg), and one rear vent and four fore-vents at a treatment rate of 2.0 kg/hour in terms of resin amount, and a cyclization condensation reaction and devolatilization were performed in the extruder. Next, after completion of the devolatilization, the resin in a hot-melt state remaining in the extruder was discharged from a front end of the extruder and pelletized using a pelletizer, thereby obtaining an acrylic resin A. The acrylic resin A had a lactone ring structure. The weight-average molecular weight of the resin was 110000, and the glass transition temperature was 125° C.

(Production of Outer Polarizing Plate Protective Film)

100 parts by mass of the acrylic resin A and 10 parts by mass of a rubber elastic body C-1 were supplied to a twin-screw extruder, melted and extruded in a sheet shape at approximately 280° C., thereby producing a 40 μm-thick long outer polarizing plate protective film. As the rubber elastic body C-1, KANE ACE M-210 (manufactured by Kaneka) was used.

(Attachment)

The polarizing layer and the surface-treated colorant filter were laminated together using a 3% by mass aqueous solution of polyvinyl alcohol (manufactured by Kuraray Co., Ltd., PVA-117H) in a roll-to-roll manner so that the corona-treated surface of the colorant filter was located on the polarizing layer side and the absorption axis of the polarizing layer and the longitudinal direction of the colorant filter was parallel to each other.

Next, an adhesive M having the following composition was applied to the outer polarizing plate protective film using a microgravure coater (gravure roll: #300, rotation speed: 140%/line speed) so that the thickness was 5 μm, thereby producing an adhesive-attached outer polarizing plate protective film. Next, the adhesive-attached outer polarizing plate protective film and the polarizing layer were attached together such that a surface of the adhesive-attached outer polarizing plate protective film, to which the adhesive was attached, and a surface of the polarizing layer, to which the colorant filter was not attached, were attached together, and irradiated with ultraviolet rays from the colorant filter side, thereby producing a polarizing plate. The line speed was set to 20 m/min, and the accumulated light amount of ultraviolet rays was set to 300 mJ/cm². Here, the polarizer and the outer polarizing plate protective film were disposed such that the transmission axis of the polarizer and the transportation direction of the outer polarizing plate protective film were orthogonal to each other.

—Composition of Adhesive M—

100 parts by mass of 2-hydroxyethyl acrylate 10 parts by mass of tolylene diisocyanate 3 parts by mass of photopolymerization initiator (Irgacure 907, manufactured by BASF)

Next, the polarizing plate was dried at 70° C., and a commercially available acrylate-based pressure sensitive adhesive was applied to the polarizing plate, thereby producing a polarizing plate (pressure sensitive adhesive/colorant filter/polarizing layer/outer polarizing plate protective film).

[Production of Liquid Crystal Display Device]

A liquid crystal panel of a commercially available liquid crystal display device (SJ8500 55V manufactured by LG Electronics) was taken out, a polarizing plate on the front side (viewer side) was peeled off, and instead of the polarizing plate, the polarizing plate prepared above was attached to the liquid crystal panel through a pressure sensitive adhesive. Thus, liquid crystal display devices 101 to 106 and 201 to 203, which had the colorant filters 101 to 106 and 201 to 203, were produced. In the light source of SJ8500 55V, a white LED in which a blue LED was combined with a green fluorescent body and a red fluorescent body was used. In addition, the colorant filter was located downstream of a light emitted from the light source than a light guide plate.

[Evaluation of Color Reproduction Range and Luminance]

White, red, green, and blue were displayed on a full screen of the liquid crystal display device produced as described above, and the luminance of white display and the chromaticity of each of red, green, and blue were measured using a spectroradiometer (SR-UL2 manufactured by TOPCON TECHNOHOUSE CORPORATION). The area of a portion in which a triangle obtained by connecting chromaticity points of the measured red, green, and blue on an xy color diagram of the CIE color system and a triangle obtained by connecting three primary color points of the DCI-P3 standard overlapped with each other was obtained, and the area was divided by the area of the triangle obtained by connecting the three primary color points of the DCI-P3 standard, thereby calculating a cover ratio to the DCI-P3 standard. The results are shown in Table 1.

In addition, the relative luminance was calculated by the following expression.

Relative luminance (%)=[(luminance of liquid crystal display device to be evaluated)/(luminance of liquid crystal display device 203)]×100

TABLE 1

|  | fd value of binder | Colorant | Thickness of colorant filter (μm) | Concentration of colorant[a] | Absorption maximum wavelength (nm) | 10% value width D1 (nm) | Half-width D2 (nm) | D1/D2 | DCI-P3 cover ratio (%) | Relative luminance[b] (%) |
|---|---|---|---|---|---|---|---|---|---|---|
| Example 101 | 0.86 | Colorant-1 | 52 | 0.026 | 595 | 80 | 31 | 2.6 | 86 | 77.0 |
| Example 102 | 0.86 | Colorant-2 | 53 | 0.029 | 592 | 71 | 28 | 2.5 | 86 | 79.8 |
| Example 103 | 0.86 | Colorant-3 | 59 | 0.024 | 586 | 79 | 29 | 2.7 | 86 | 75.9 |
| Example 104 | 0.86 | Colorant-4 | 46 | 0.034 | 590 | 90 | 36 | 2.5 | 86 | 73.5 |
| Example 105 | 0.86 | Colorant-5 | 56 | 0.034 | 599 | 86 | 30 | 2.9 | 86 | 76.5 |
| Example 106 | 0.86 | Colorant-6 | 54 | 0.033 | 603 | 80 | 31 | 2.6 | 86 | 75.9 |
| Comparative Example 201 | 0.86 | Colorant-21 | 53 | 0.107 | 594 | 79 | 19 | 4.2 | 86 | 73.3 |
| Comparative Example 202 | 0.86 | Colorant-22 | 54 | 0.025 | 593 | 106 | 36 | 2.9 | 86 | 70.3 |
| Comparative Example 203 | 0.86 | None | 55 | 0.000 |  |  |  |  | 76 | 100 |

[a]parts by mass with respect to 100 parts by mass of binder

[b]representing relative luminance in a case where the luminance of Comparative Example 203 is set to 100%

As shown in Table 1, it is found that, in a case where the filter does not contain a colorant, the liquid crystal display device has inferior color reproducibility (Comparative Example 203). In addition, it is found that, even in a case where the filter is a colorant filter containing a colorant, the luminance decreases in a case where D1/D2 of the colorant filter is larger than the requirements of the present invention (Comparative Examples 201 and 202).

Example 301

<Preparation of Cycloolefin Resin—Colorant Solution 301>

The respective materials were mixed as described below to prepare a cycloolefin resin—colorant solution (dope) Ba-1.

| Composition of cycloolefin resin - colorant solution Ba-1 | |
| --- | --- |
| TOPAS8007S-4 manufactured by Polyplastics Co., Ltd. | 40 parts by mass |
| TOPAS6013 manufactured by Polyplastics Co., Ltd. | 60 parts by mass |
| Colorant-7 | 0.540 parts by mass |
| Toluene (solvent) | 574 parts by mass |

Next, the cycloolefin resin—colorant solution Ba-1 was filtered using a filter paper having an absolute filtration accuracy of 10 μm (#63, manufactured by Toyo Roshi Kaisha, Ltd.) and further filtered using a metal-sintered filter having an absolute filtration accuracy of 2.5 μm (FH025, manufactured by Pall Corporation).

<Production of Colorant Filter 301 with Base Material>

The cycloolefin resin—colorant solution Ba-1 after the filtration treatment was applied onto a base material (polyethylene terephthalate film) using a bar coater so that the film thickness after drying was 5.0 and dried at 100° C., thereby producing a colorant filter 301 with a base material (Example 301).

Examples 302 to 306 and Comparative Examples 401 to 404

Colorant filters 302 to 306 with a base material (Examples 302 to 306) of Examples and colorant filters 401 to 404 with a base material (Comparative Examples 401 to 404) of Comparative Examples were obtained in the same manner as the colorant filter 301 with a base material, except that the type of resin used for the dope, the type of solvent, the type of colorant, and the addition amount, and the film thickness of the colorant filter were changed as shown in the table below.

Colorant-7

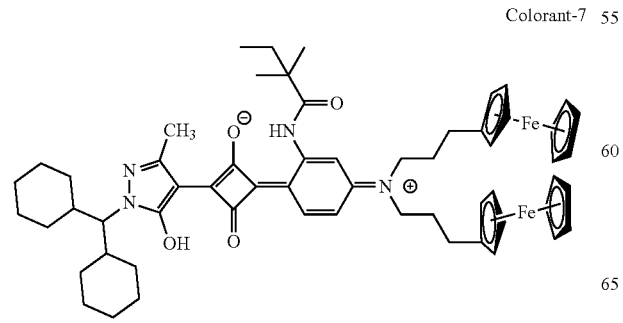

Colorant-8

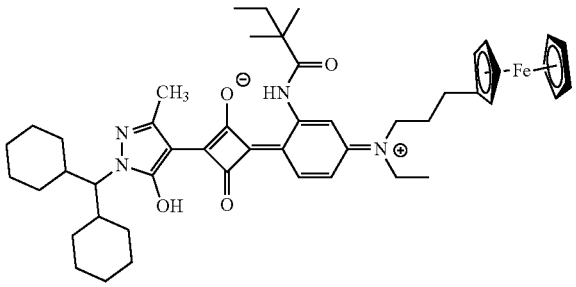

Colorant-9

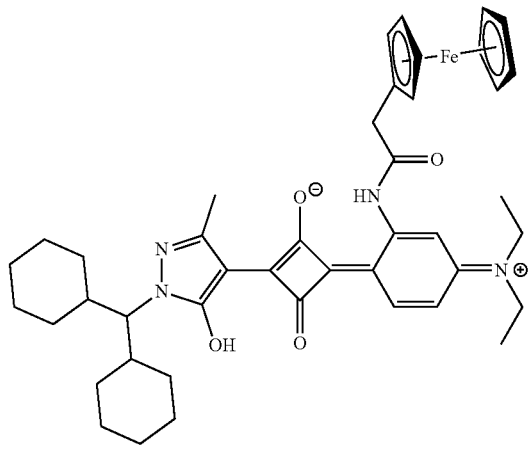

Colorant-10

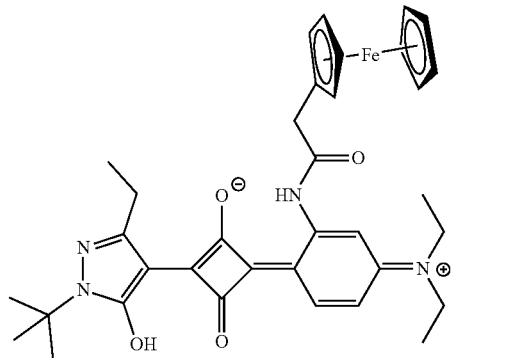

[Production of Polarizing Plate]

<Surface Treatment of Colorant Filter>

Regarding the colorant filters 301 to 306 and 401 to 404 with a base material, a surface opposite to the base material film was subjected to a corona treatment, thereby producing surface-treated colorant filters 301 to 306 and 401 to 404 with a base material.

<Production of Polarizer (Polarizing Layer)>

According to Example 1 of JP2001-141926A, a circumferential speed difference was imparted between two pairs of nip rollers to stretch a film in the longitudinal direction, thereby producing a polarizing layer including a 12 μm-thick polyvinyl alcohol resin.

(Attachment)

The polarizing layer and the surface-treated colorant filter with a base material were laminated together using a 3% by mass aqueous solution of polyvinyl alcohol (manufactured by Kuraray Co., Ltd., PVA-117H) in a roll-to-roll manner so that the corona-treated surface of the colorant filter was located on the polarizing layer side and the absorption axis of the polarizing layer and the longitudinal direction of the colorant filter with a base material was parallel to each other.

Next, the adhesive M having the above composition was applied to the outer polarizing plate protective film prepared above using a microgravure coater (gravure roll: #300, rotation speed: 140%/line speed) so that the thickness was 5 μm, thereby producing an adhesive-attached outer polarizing plate protective film. Next, the adhesive-attached outer polarizing plate protective film and the polarizing layer were attached together such that a surface of the adhesive-attached outer polarizing plate protective film, to which the adhesive was attached, and a surface of the polarizing layer, to which the colorant filter with a base material was not attached, were attached together, and irradiated with ultraviolet rays from the side of the colorant filter with a base material, thereby producing a polarizing plate. The line speed was set to 20 m/min, and the accumulated light amount of ultraviolet rays was set to 300 mJ/cm$^2$. Here, the polarizer and the outer polarizing plate protective film were disposed such that the transmission axis of the polarizer and the transportation direction of the outer polarizing plate protective film were orthogonal to each other.

Next, the polarizing plate was dried at 70° C., polyethylene terephthalate, which was the base material film of the colorant filter with a base material, was continuously peeled off using the same device as a separator-peeling device having a peeling roller, and a commercially available acrylate-based pressure sensitive adhesive was applied to the peeled surface, thereby producing a polarizing plate.

The degree of polarization of the obtained polarizing plate (5 cm×5 cm) was measured. The polarizing plate was attached onto a glass through the above-described acrylate-based pressure sensitive adhesive so that the colorant filters 301 to 306 and 401 to 404 were on the glass side. The sample was set in an automatic polarizing film measurement instrument VAP-7070 manufactured by JASCO Corporation such that the glass side of the sample faced a light source, and the orthogonal transmittance and the parallel transmittance in a wavelength range of 380 nm to 700 nm were measured. A polarization degree spectrum was calculated from the measurement values of the orthogonal transmittance and the parallel transmittance using the following expression, and the weighted average of the light source (auxiliary illuminant C) and the CIE luminosity factor (Y) was computed, thereby calculating the degree of polarization. The results are shown in the table below.

Degree of polarization (%)=[(parallel transmittance−orthogonal transmittance)/(parallel transmittance+orthogonal transmittance)]$^{1/2}$×100

[Production of Liquid Crystal Display Device]

A liquid crystal panel of a commercially available liquid crystal display device (SJ8500 55V manufactured by LG Electronics) was taken out, a polarizing plate on the front side (viewer side) was peeled off, and instead of the polarizing plate, the polarizing plate prepared above was attached to the liquid crystal panel through the above-described acrylate-based pressure sensitive adhesive. Thus, a liquid crystal display device was produced.

[Evaluation of Contrast]

Using the liquid crystal display device, a cover ratio to the DCI-P3 standard was calculated in the same manner as described above. Furthermore, from the luminance value in white display and the luminance value in black display, the contrast was calculated by the following expression. Regarding Examples 301 to 304, the contrast of each liquid crystal display device in a case where the contrast of Comparative Example 401 was set to 100% is shown in the following table, and regarding Examples 305 and 306 and Comparative Examples 403 and 404, the contrast of each liquid crystal display device in a case where the contrast of Comparative Example 402 was set to 100% is shown in the following table.

(Contrast)=(luminance value in white display)/(luminance value in black display)

TABLE 2

| | Resin | | | Thickness of colorant filter (μm) | Concentration of colorant(a) | Solvent of dope | Absorption maximum wavelength (nm) | 10% value width D1 (nm) | Half-width D2 (nm) | D1/D2 | Degree of polarization | DCI-P3 cover ratio (%) | Relative luminance[b] (%) | Contrast[c] (%) |
|---|---|---|---|---|---|---|---|---|---|---|---|---|---|---|
| | Type | fd value | Colorant | | | | | | | | | | | |
| Example 301 | TOPAS[d] | 0.92 | Colorant-7 | 5 | 0.540 | Toluene | 590 | 72 | 27 | 2.7 | 99.99 | 87 | 78 | 100 |
| Example 302 | TOPAS[d] | 0.92 | Colorant-7 | 2 | 1.350 | Toluene | 590 | 72 | 27 | 2.7 | 99.99 | 87 | 78 | 100 |
| Example 303 | TOPAS[d] | 0.92 | Colorant-7 | 1 | 2.700 | Toluene | 590 | 72 | 27 | 2.7 | 99.99 | 87 | 78 | 100 |
| Example 304 | TOPAS[d] | 0.86 | Colorant-8 | 5 | 0.427 | Toluene | 590 | 73 | 27 | 2.7 | 99.99 | 87 | 77 | 100 |
| Example 305 | PS[e] | 0.86 | Colorant-9 | 5 | 0.397 | Ethyl acetate | 592 | 72 | 27 | 2.7 | 99.99 | 87 | 78 | 100 |
| Example 306 | PS[e] | 0.86 | Colorant-10 | 5 | 0.339 | Ethyl acetate | 594 | 74 | 28 | 2.6 | 99.99 | 87 | 77 | 100 |
| Comparative Example 401 | TOPAS[d] | 0.92 | None | 5 | 0.000 | Toluene | | | | | 99.99 | 76 | 100 | 100 |
| Comparative Example 402 | PS[e] | 0.86 | None | 5 | 0.000 | Ethyl acetate | | | | | 99.99 | 76 | 100 | 100 |
| Comparative Example 403 | PS[e] | 0.86 | Colorant-22 | 5 | 0.201 | Ethyl acetate | 595 | 102 | 38 | 2.7 | 99.85 | 87 | 66 | 70 |
| Comparative Example 404 | PS[e] | 0.86 | Colorant-21 | 5 | 1.45 | Ethyl acetate | 594 | 80 | 19 | 4.2 | 99.99 | 87 | 69 | 100 |

(a)parts by mass with respect to 100 parts by mass of binder
[b]representing relative luminance in a case where the luminance of Comparative Example 401 or Comparative Example 402 is set to 100%
[c]representing relative contrast in a case where the contrast of Comparative Example 401 or Comparative Example 402 is set to 100%
[d]TOPAS8007S-4/TOPAS6013 (manufactured by Polyplastics Co., Ltd.) = 40/60 (mass ratio)
[e]PSJ-polystyrene SGP-10 (manufactured by PS Japan Corporation)

From the results in Table 2, it is found that, in a case of using, as a polarizing plate protective film, the colorant filters (colorant filters 301 to 306) of Examples 301 to 306, in which a colorant having a structure of electron-donating quencher in the colorant is used, a high degree of polarization can be realized as compared with the polarizing plate using the colorant filter (colorant filter 403) of Comparative Example 403, in which a colorant not having a structure of quencher is used. In addition, it is found that the colorant filters of Examples 301 to 306 have excellent color reproducibility, have little decrease in luminance, and are excellent in contrast.

Example 501

<Preparation of Cycloolefin Resin—Colorant Solution 501>

The following materials were put in a mixing tank and stirred to dissolve respective components in a solvent, thereby preparing a cycloolefin resin—colorant solution 501 (dope).

| Composition of cycloolefin resin - colorant solution 501 | |
|---|---|
| Arton G7810 (trade name) manufactured by JSR Corporation | 100.0 parts by mass |
| Colorant 8 | 0.051 parts by mass |
| Methylene chloride (solvent) | 447.9 parts by mass |

<Production of Colorant Filter 501>

(Casting)

Using a band casting device, the dope prepared above was cast on a stainless casting support (support temperature: 22° C.). The film was peeled off in a state where the residual solvent amount in the dope was approximately 20% by mass, both ends in a width direction of the film were held by a tenter, and in a state where the residual solvent amount was 5% to 10% by mass, the film was dried at a temperature of 120° C. while being stretched by 1.80 times (80%) in the width direction. Thereafter, the film was further dried at 130° C. while being transported between rolls of a heat treatment apparatus, thereby obtaining a colorant filter 501 (Example 501) of Examples. The obtained colorant filter 501 had a thickness of 45 μm and a width of 1480 mm.

Examples 502 and 503 and Comparative Examples 601 and 602

Colorant filters 502 and 503 (Examples 502 and 503) of Examples and colorant filters 601 and 602 (Comparative Examples 601 and 602) of Comparative Examples were produced in the same manner as in Example 501, except that, in Example 501, the type of colorant, the addition amount, and the stretching ratio were changed to those shown in Table 3.

Polarizing plate were produced in the same manner as the above-described polarizing plate using the colorant filter 101, except that the colorant filters 501 to 503, 601, and 602 were used instead of the colorant filter 101. The degree of polarization of each obtained polarizing plate was measured in the same manner as described above.

Furthermore, liquid crystal display devices were produced in the same manner as the above-described liquid crystal display device incorporating the polarizing plate using the colorant filter 101, except that the polarizing plates using the colorant filters 501 to 503, 601, and 602 were used instead of the polarizing plate using the colorant filter 101. The DCI-P3 cover ratio, relative luminance, and panel contrast were measured for each obtained liquid crystal display device. The results are shown in the following table.

TABLE 3

| | fd value | Colorant | Thickness of colorant filter (μm) | Concentration of colorant[a] | Absorption maximum wavelength (nm) | 10% value width D1 (nm) | Half-width D2 (nm) | D1/D2 | Stretching ratio | Degree of polarization | DCI-P3 cover ratio (%) | Relative luminance[b] (%) | Contrast[c] (%) |
|---|---|---|---|---|---|---|---|---|---|---|---|---|---|
| Example 501 | 0.81 | Colorant-8 | 40 | 0.051 | 590 | 71 | 27 | 2.7 | 80 | 99.99 | 86 | 75 | 100 |
| Example 502 | 0.81 | Colorant-8 | 40 | 0.051 | 590 | 71 | 27 | 2.7 | 40 | 99.99 | 86 | 75 | 100 |
| Example 503 | 0.81 | Colorant-8 | 40 | 0.051 | 590 | 71 | 27 | 2.7 | 0 | 99.99 | 86 | 75 | 100 |
| Comparative Example 601 | 0.81 | None | 40 | 0.000 | | | | | 40 | 99.99 | 76 | 100 | 100 |
| Comparative Example 602 | 0.81 | Colorant-21 | 40 | 0.081 | 592 | 79 | 19 | 4.2 | 40 | 99.99 | 86 | 69 | 100 |

[a]parts by mass with respect to 100 parts by mass of binder

[b]representing relative luminance in a case where the luminance of Comparative Example 601 is set to 100%

[c]representing relative contrast in a case where the contrast of Comparative Example 601 is set to 100%

From the results in Table 3, it is found that, by using the polarizing plate protective film of the present invention, color reproducibility of the liquid crystal display device is improved.

The present invention has been described with the embodiments thereof, any details of the description of the present invention are not limited unless described otherwise, and it is obvious that the present invention is widely construed without departing from the gist and scope of the present invention described in the accompanying claims.

EXPLANATION OF REFERENCES

1: upper polarizing plate
2: direction of absorption axis of upper polarizing plate
3: liquid crystal cell upper electrode substrate
4: alignment control direction of upper substrate
5: liquid crystal layer
6: liquid crystal cell lower electrode substrate
7: alignment control direction of lower substrate
8: lower polarizing plate
9: direction of absorption axis of lower polarizing plate
B: backlight unit
10: liquid crystal display device
101: absorbance at absorption maximum wavelength
102: 10% absorbance with respect to absorbance at absorption maximum wavelength
103: difference between two wavelengths which give 10% absorbance with respect to absorbance at absorption maximum wavelength

What is claimed is:

1. A colorant filter comprising:
at least one colorant; and
at least one binder resin,
wherein the colorant filter has an absorption spectrum having an absorption maximum in a wavelength region of 585 nm to 620 nm, and
in the absorption spectrum, a difference D1 between two wavelengths which give 10% absorbance with respect to an absorbance at the absorption maximum and a difference D2 between two wavelengths which give 50% absorbance with respect to the absorbance at the absorption maximum satisfy Expressions (a) and (b), $D1 \leq 90$ nm (a)

$D1/D2 \leq 4.0$, and (b)

wherein a colorant included in the colorant filter is represented by Formula (2):

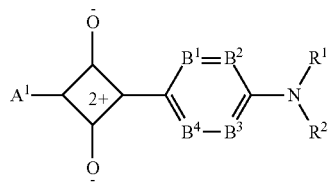

Formula (2)

wherein, in Formula (2), $A^1$ is a heterocyclic group selected from a furan ring, a thiophene ring, an imidazole ring, a pyrazole ring, a thiazole ring, an oxazole ring, a triazole ring, an indole ring, an indolenine ring, an indoline ring, a pyridine ring, a pyrimidine ring, a quinoline ring, a benzothiazole ring, a benzoxazole ring, or a pyrazolotriazole ring, $R^1$ and $R^2$ each independently represent a hydrogen atom or a substituent; and $B^1$, $B^2$, $B^3$, and $B^4$ each independently represent a carbon atom or a nitrogen atom, wherein the colorant represented by Formula (2) is a colorant represented by any one of Formulae (3) to (5):

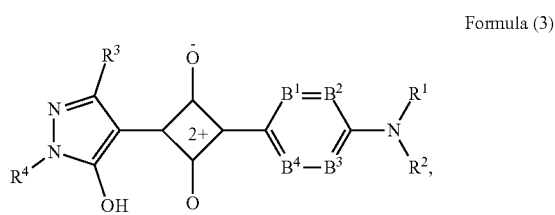

Formula (3)

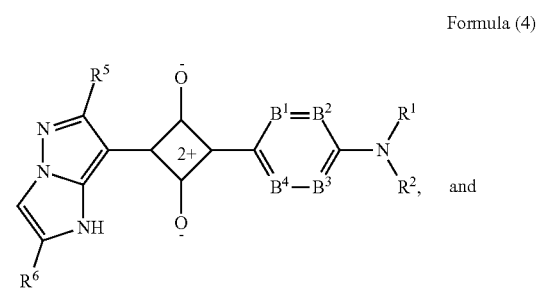

Formula (4)

and

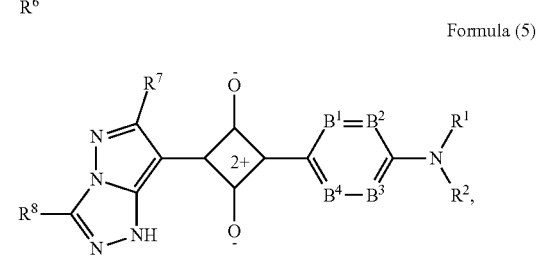

Formula (5)

wherein in Formula (3) $R^1$ and $R^2$ each independently represent a hydrogen atom or a substituent; and $B^1$, $B^2$, $B^3$, and $B^4$ each independently represent a carbon atom or a nitrogen atom, and $R^3$ and $R^4$ each independently represent a hydrogen atom or a substituent, wherein in Formula (4) $R^1$ and $R^2$ each independently represent a hydrogen atom or a substituent; and $B^1$, $B^2$, $B^3$, and $B^4$ each independently represent a carbon atom, and $R^5$ and $R^6$ each independently represent a hydrogen atom or a substituent, and wherein in Formula (5) $R^1$ and $R^2$ each independently represent a hydrogen atom or a substituent; and $B^1$, $B^2$, $B^3$, and $B^4$ each independently represent a carbon atom, and $R^7$ and $R^8$ each independently represent a hydrogen atom or a substituent.

2. The colorant filter according to claim 1, wherein the binder resin satisfies Relational expression [A], $0.80 \leq fd \leq 0.95$ Relational expression [A]:

where, the fd value is defined by Expression I, $fd = \delta d/(\delta d + \delta p + \delta h)$ Expression I:

in Expression I, $\delta d$, $\delta p$, and $\delta h$ respectively represent, in a solubility parameter $\delta t$ calculated by Hoy method, a term corresponding to London dispersion force, a term corresponding to dipole-dipole force, and a term corresponding to hydrogen bonding force.

3. The colorant filter according to claim 1, wherein the binder resin includes a cycloolefin resin and/or a polystyrene resin.

4. The colorant filter according to claim 1, wherein the absorption maximum of the colorant filter in the wavelength region of 585 nm to 620 nm is in a wavelength region of 585 nm to 610 nm.

5. A backlight unit comprising:
the colorant filter according to claim 1;
a light guide plate; and
a light source,
wherein the colorant filter is arranged on a downstream side of a light emitted from the light source than the light guide plate.

6. A liquid crystal display device comprising:
the colorant filter according to claim 1;
polarizing plates including a polarizer and a polarizing plate protective film; and
a liquid crystal cell to which the polarizing plates are attached through a pressure-sensitive adhesive layer,
wherein the colorant filter additionally serves as the polarizing plate protective film or the pressure-sensitive adhesive layer.

7. A liquid crystal display device comprising:
the colorant filter according to claim 1 in a backlight unit.

* * * * *